United States Patent
Kaga

(10) Patent No.: US 12,124,114 B2
(45) Date of Patent: Oct. 22, 2024

(54) SYSTEM OF PROGRESSIVE ADDITION LENS, DESIGN METHOD OF PROGRESSIVE ADDITION LENS, AND PROGRESSIVE ADDITION LENS GROUP

(71) Applicant: HOYA LENS THAILAND LTD., Pathumthani (TH)

(72) Inventor: Tadashi Kaga, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 805 days.

(21) Appl. No.: 17/281,126

(22) PCT Filed: Sep. 27, 2019

(86) PCT No.: PCT/JP2019/038392
§ 371 (c)(1),
(2) Date: Mar. 29, 2021

(87) PCT Pub. No.: WO2020/067524
PCT Pub. Date: Apr. 2, 2020

(65) Prior Publication Data
US 2021/0356764 A1   Nov. 18, 2021

(30) Foreign Application Priority Data

Sep. 28, 2018 (JP) .................. 2018-186038
Mar. 15, 2019 (JP) .................. 2019-048646
Mar. 15, 2019 (JP) .................. 2019-048647

(51) Int. Cl.
*G02C 7/06* (2006.01)
*G02C 7/02* (2006.01)

(52) U.S. Cl.
CPC ............. *G02C 7/061* (2013.01); *G02C 7/028* (2013.01)

(58) Field of Classification Search
CPC ........ G02C 7/063; G02C 7/027; G02C 7/065; G02C 7/066; G02C 7/024; G02C 7/061;
(Continued)

(56) References Cited

U.S. PATENT DOCUMENTS 5,708,492 A    1/1998 Kitani
2004/0109134 A1*  6/2004 Sato ................. G02C 7/061
                                                       351/159.42

(Continued)

FOREIGN PATENT DOCUMENTS

EP   0872755 A1   10/1998
EP   1429172 A1    6/2004
(Continued)

OTHER PUBLICATIONS

Mar. 23, 2021 International Preliminary Report on Patentability issued in International Patent Application No. PCT/JP2019/038392.
(Continued)

*Primary Examiner* — Travis S Fissel
(74) *Attorney, Agent, or Firm* — Oliff PLC

(57) ABSTRACT

A design system of a progressive addition lens including a near portion for viewing a near distance, a distance portion for viewing a distance farther than the near distance, and an intermediate portion provided between the near portion and the distance portion and having a progressive refraction function, the design system of a progressive addition lens includes an aberration amount setting unit that sets an amount of transmission astigmatism $\Delta_\beta[D]$ added to a progressive addition lens in such a way that when a wearer of the progressive addition lens α to which transmission astigmatism of an aberration amount $\Delta_\alpha[D]$ is added is provided with the progressive addition lens β having different param-
(Continued)

eters, visual performance when the progressive addition lens β is worn approaches visual performance when the progressive addition lens α is worn.

9 Claims, 45 Drawing Sheets

(58) Field of Classification Search
CPC . G02C 7/028; G02C 7/08; G02C 7/06; G02C 7/081; G02C 7/086; G02C 7/088; G02C 2202/08; G02C 2202/22; G02C 2202/04
USPC ............ 351/159.42, 159.43, 159.46, 159.73, 351/159.74, 159.76, 159.77
See application file for complete search history.

(56) References Cited

U.S. PATENT DOCUMENTS

| | | |
|---|---|---|
| 2006/0203193 A1 | 9/2006 | Kato |
| 2007/0182923 A1 | 8/2007 | Kitani et al. |
| 2013/0083288 A1 | 4/2013 | Shinohara et al. |
| 2017/0293159 A1 | 10/2017 | Kozu et al. |
| 2018/0157063 A1 | 6/2018 | Wahl et al. |

FOREIGN PATENT DOCUMENTS

| | | |
|---|---|---|
| JP | H09-90291 A | 4/1997 |
| JP | 2001-209012 A | 8/2001 |
| JP | 2004-138794 A | 5/2004 |
| JP | 2005-201992 A | 7/2005 |
| JP | 2005-201993 A | 7/2005 |
| JP | 2006-285200 A | 10/2006 |
| JP | 2006-350381 A | 12/2006 |
| JP | 2013-076850 A | 4/2013 |
| JP | 5784418 B2 | 9/2015 |
| WO | 99/13374 A1 | 3/1999 |
| WO | 01/25837 A1 | 4/2001 |
| WO | 2016/056649 A1 | 4/2016 |

OTHER PUBLICATIONS

Jul. 27, 2022 Search Report issued in European Patent Application No. 19685108.5.

Dec. 24, 2019 Search Report issued in International Patent Application No. PCT/JP2019/038392.

* cited by examiner

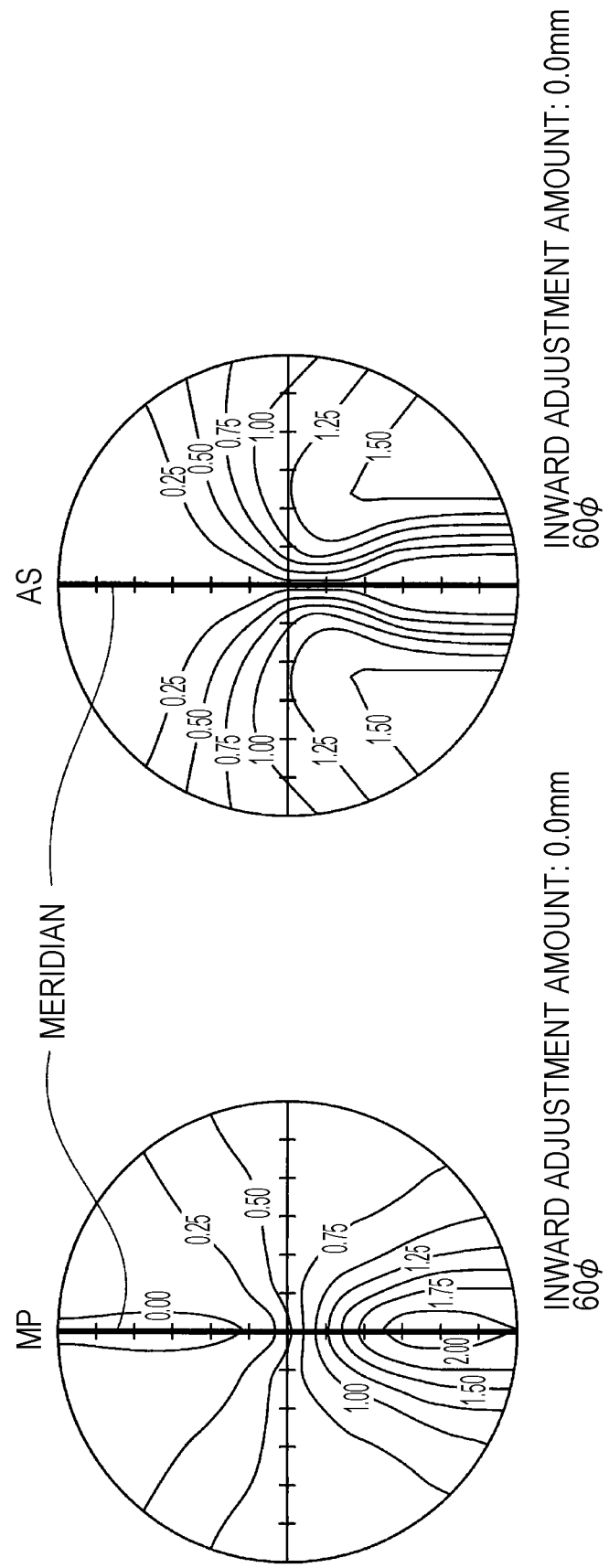

DISTRIBUTION MAP OF TRANSMISSION AVERAGE REFRACTIVE POWER OF CONVENTIONAL EXAMPLE

CONVENTIONAL EXAMPLE (ADD = 3.00 [D])
(ADDITIONAL AMOUNT OF TRANSMISSION ASTIGMATISM: NO)

DISTRIBUTION MAP OF TRANSMISSION REFRACTIVE POWER ON MERIDIAN OF CONVENTIONAL EXAMPLE

CONVENTIONAL EXAMPLE (ADD = 3.00 [D])
(ADDITIONAL AMOUNT OF TRANSMISSION ASTIGMATISM: NO)

DISTRIBUTION MAP OF TRANSMISSION REFRACTIVE
POWER OF y = −4.0mm OF CONVENTIONAL EXAMPLE

CONVENTIONAL EXAMPLE (ADD = 3.00 [D])
(ADDITIONAL AMOUNT OF TRANSMISSION ASTIGMATISM: NO)

DISTRIBUTION MAP OF TRANSMISSION REFRACTIVE
POWER OF y = −14.0mm OF CONVENTIONAL EXAMPLE

CONVENTIONAL EXAMPLE (ADD = 3.00 [D])
(ADDITIONAL AMOUNT OF TRANSMISSION ASTIGMATISM: NO)

DISTRIBUTION MAP OF TRANSMISSION
ASTIGMATISM OF CONVENTIONAL EXAMPLE

CONVENTIONAL EXAMPLE (ADD = 3.00 [D])
(ADDITIONAL AMOUNT OF TRANSMISSION ASTIGMATISM: NO)

CONVENTIONAL EXAMPLE (ADD = 3.00 [D])
(ADDITIONAL AMOUNT OF TRANSMISSION ASTIGMATISM: NO)

DISTRIBUTION MAP OF TRANSMISSION ASTIGMATISM
OF y = −4.0mm OF CONVENTIONAL EXAMPLE

CONVENTIONAL EXAMPLE (ADD = 3.00 [D])
(ADDITIONAL AMOUNT OF TRANSMISSION ASTIGMATISM: NO)

DISTRIBUTION MAP OF TRANSMISSION ASTIGMATISM
OF y = −14.0mm OF CONVENTIONAL EXAMPLE

CONVENTIONAL EXAMPLE (ADD = 3.00 [D])
(ADDITIONAL AMOUNT OF TRANSMISSION ASTIGMATISM: NO)

DISTRIBUTION MAP OF TRANSMISSION AVERAGE REFRACTIVE POWER OF CONVENTIONAL EXAMPLE

CONVENTIONAL EXAMPLE (ADD = 2.00 [D])
(ADDITIONAL AMOUNT OF TRANSMISSION ASTIGMATISM: NO)

DISTRIBUTION MAP OF TRANSMISSION ASTIGMATISM OF CONVENTIONAL EXAMPLE

CONVENTIONAL EXAMPLE (ADD = 2.00 [D])
(ADDITIONAL AMOUNT OF TRANSMISSION ASTIGMATISM: NO)

DISTRIBUTION MAP OF TRANSMISSION AVERAGE
REFRACTIVE POWER OF CONVENTIONAL EXAMPLE

CONVENTIONAL EXAMPLE (ADD = 1.00 [D])
(ADDITIONAL AMOUNT OF TRANSMISSION ASTIGMATISM: NO)

DISTRIBUTION MAP OF TRANSMISSION
ASTIGMATISM OF CONVENTIONAL EXAMPLE

CONVENTIONAL EXAMPLE (ADD = 1.00 [D])
(ADDITIONAL AMOUNT OF TRANSMISSION ASTIGMATISM: NO)

DISTRIBUTION MAP OF TRANSMISSION AVERAGE
REFRACTIVE POWER OF EMBODIMENT 1

EMBODIMENT 1 (ADD = 3.00 [D])
(ADDITIONAL AMOUNT OF TRANSMISSION ASTIGMATISM: 0.30 [D])

DISTRIBUTION MAP OF TRANSMISSION REFRACTIVE
POWER ON MERIDIAN OF EMBODIMENT 1

EMBODIMENT 1 (ADD=3.00 [D])
(ADDITIONAL AMOUNT OF TRANSMISSION ASTIGMATISM: 0.30 [D])

DISTRIBUTION MAP OF TRANSMISSION REFRACTIVE
POWER OF y = −4.0mm OF EMBODIMENT 1

EMBODIMENT 1 (ADD = 3.00 [D])
(ADDITIONAL AMOUNT OF TRANSMISSION ASTIGMATISM: 0.30 [D])

DISTRIBUTION MAP OF TRANSMISSION REFRACTIVE
POWER OF y = −14.0mm OF EMBODIMENT 1

EMBODIMENT 1 (ADD = 3.00 [D])
(ADDITIONAL AMOUNT OF TRANSMISSION ASTIGMATISM: 0.30 [D])

DISTRIBUTION MAP OF TRANSMISSION ASTIGMATISM OF EMBODIMENT 1

EMBODIMENT 1 (ADD = 3.00 [D])
(ADDITIONAL AMOUNT OF TRANSMISSION ASTIGMATISM: 0.30 [D])

DISTRIBUTION MAP OF TRANSMISSION ASTIGMATISM ON MERIDIAN OF EMBODIMENT 1

EMBODIMENT 1 (ADD = 3.00 [D])
(ADDITIONAL AMOUNT OF TRANSMISSION ASTIGMATISM: 0.30 [D])

DISTRIBUTION MAP OF TRANSMISSION ASTIGMATISM
OF y = −4.0mm OF EMBODIMENT 1

EMBODIMENT 1 (ADD = 3.00 [D])
(ADDITIONAL AMOUNT OF TRANSMISSION ASTIGMATISM: 0.30 [D])

DISTRIBUTION MAP OF TRANSMISSION ASTIGMATISM
OF y = −14.0mm OF EMBODIMENT 1

EMBODIMENT 1 (ADD = 3.00 [D])
(ADDITIONAL AMOUNT OF TRANSMISSION ASTIGMATISM: 0.30 [D])

DISTRIBUTION MAP OF TRANSMISSION AVERAGE REFRACTIVE POWER OF EMBODIMENT 1

EMBODIMENT 1 (ADD = 2.00 [D])
(ADDITIONAL AMOUNT OF TRANSMISSION ASTIGMATISM: 0.20 [D])

DISTRIBUTION MAP OF TRANSMISSION ASTIGMATISM OF EMBODIMENT 1

EMBODIMENT 1 (ADD = 2.00 [D])
(ADDITIONAL AMOUNT OF TRANSMISSION ASTIGMATISM: 0.20 [D])

DISTRIBUTION MAP OF TRANSMISSION AVERAGE REFRACTIVE POWER OF EMBODIMENT 1

EMBODIMENT 1 (ADD = 1.00 [D])
(ADDITIONAL AMOUNT OF TRANSMISSION ASTIGMATISM: 0.10 [D])

DISTRIBUTION MAP OF TRANSMISSION ASTIGMATISM OF EMBODIMENT 1

EMBODIMENT 1 (ADD = 1.00 [D])
(ADDITIONAL AMOUNT OF TRANSMISSION ASTIGMATISM: 0.10 [D])

DISTRIBUTION MAP OF TRANSMISSION AVERAGE REFRACTIVE POWER OF EMBODIMENT 1a

EMBODIMENT 1a (ADD=3.00 [D])
(ADDITIONAL AMOUNT OF TRANSMISSION ASTIGMATISM: 0.50 [D])

DISTRIBUTION MAP OF TRANSMISSION ASTIGMATISM OF EMBODIMENT 1a

EMBODIMENT 1a (ADD=3.00 [D])
(ADDITIONAL AMOUNT OF TRANSMISSION ASTIGMATISM: 0.50 [D])

DISTRIBUTION MAP OF TRANSMISSION AVERAGE REFRACTIVE POWER OF EMBODIMENT 1a

EMBODIMENT 1a (ADD=2.00 [D])
(ADDITIONAL AMOUNT OF TRANSMISSION ASTIGMATISM: 0.33 [D])

DISTRIBUTION MAP OF TRANSMISSION ASTIGMATISM OF EMBODIMENT 1a

EMBODIMENT 1a (ADD=2.00 [D])
(ADDITIONAL AMOUNT OF TRANSMISSION ASTIGMATISM: 0.33 [D])

DISTRIBUTION MAP OF TRANSMISSION AVERAGE REFRACTIVE POWER OF EMBODIMENT 1a

EMBODIMENT 1a (ADD = 1.00 [D])
(ADDITIONAL AMOUNT OF TRANSMISSION ASTIGMATISM: 0.17 [D])

DISTRIBUTION MAP OF TRANSMISSION ASTIGMATISM OF EMBODIMENT 1a

EMBODIMENT 1a (ADD = 1.00 [D])
(ADDITIONAL AMOUNT OF TRANSMISSION ASTIGMATISM: 0.17 [D])

DISTRIBUTION MAP OF TRANSMISSION AVERAGE
REFRACTIVE POWER OF REFERENCE EMBODIMENT 1

REFERENCE EMBODIMENT 1 (ADD = 3.00 [D])
(ADDITIONAL AMOUNT OF TRANSMISSION ASTIGMATISM: 0.50 [D])

DISTRIBUTION MAP OF TRANSMISSION
ASTIGMATISM OF REFERENCE EMBODIMENT 1

REFERENCE EMBODIMENT 1 (ADD = 3.00 [D])
(ADDITIONAL AMOUNT OF TRANSMISSION ASTIGMATISM: 0.50 [D])

DISTRIBUTION MAP OF TRANSMISSION AVERAGE
REFRACTIVE POWER OF REFERENCE EMBODIMENT 1

REFERENCE EMBODIMENT 1 (ADD = 2.00 [D])
(ADDITIONAL AMOUNT OF TRANSMISSION ASTIGMATISM: 0.50 [D])

DISTRIBUTION MAP OF TRANSMISSION
ASTIGMATISM OF REFERENCE EMBODIMENT 1

REFERENCE EMBODIMENT 1 (ADD = 2.00 [D])
(ADDITIONAL AMOUNT OF TRANSMISSION ASTIGMATISM: 0.50 [D])

DISTRIBUTION MAP OF TRANSMISSION AVERAGE
REFRACTIVE POWER OF REFERENCE EMBODIMENT 1

REFERENCE EMBODIMENT 1 (ADD = 1.00 [D])
(ADDITIONAL AMOUNT OF TRANSMISSION ASTIGMATISM: 0.50 [D])

DISTRIBUTION MAP OF TRANSMISSION
ASTIGMATISM OF REFERENCE EMBODIMENT 1

REFERENCE EMBODIMENT 1 (ADD = 1.00 [D])
(ADDITIONAL AMOUNT OF TRANSMISSION ASTIGMATISM: 0.50 [D])

DISTRIBUTION MAP OF TRANSMISSION AVERAGE REFRACTIVE POWER OF EMBODIMENT 2

EMBODIMENT 2 (ADD = 3.00 [D])
(ADDITIONAL AMOUNT OF TRANSMISSION ASTIGMATISM: −0.375 [D])

DISTRIBUTION MAP OF TRANSMISSION REFRACTIVE POWER ON MERIDIAN OF EMBODIMENT 2

EMBODIMENT 2 (ADD = 3.00 [D])
(ADDITIONAL AMOUNT OF TRANSMISSION ASTIGMATISM: −0.375 [D])

DISTRIBUTION MAP OF TRANSMISSION REFRACTIVE POWER OF y = −4.0mm OF EMBODIMENT 2

EMBODIMENT 2 (ADD = 3.00 [D])
(ADDITIONAL AMOUNT OF TRANSMISSION ASTIGMATISM: −0.375 [D])

DISTRIBUTION MAP OF TRANSMISSION REFRACTIVE POWER OF y = −14.0mm OF EMBODIMENT 2

EMBODIMENT 2 (ADD = 3.00 [D])
(ADDITIONAL AMOUNT OF TRANSMISSION ASTIGMATISM: −0.375 [D])

DISTRIBUTION MAP OF TRANSMISSION ASTIGMATISM OF EMBODIMENT 2

EMBODIMENT 2 (ADD = 3.00 [D])
(ADDITIONAL AMOUNT OF TRANSMISSION ASTIGMATISM: −0.375 [D])

DISTRIBUTION MAP OF TRANSMISSION ASTIGMATISM
OF y = −4.0mm OF EMBODIMENT 2

EMBODIMENT 1 (ADD = 3.00 [D])
(ADDITIONAL AMOUNT OF TRANSMISSION ASTIGMATISM: −0.375 [D])

DISTRIBUTION MAP OF TRANSMISSION ASTIGMATISM
OF y = −14.0mm OF EMBODIMENT 2

EMBODIMENT 2 (ADD = 3.00 [D])
(ADDITIONAL AMOUNT OF TRANSMISSION ASTIGMATISM: −0.375 [D])

DISTRIBUTION MAP OF TRANSMISSION AVERAGE
REFRACTIVE POWER OF EMBODIMENT 2

EMBODIMENT 2 (ADD = 2.00 [D])
(ADDITIONAL AMOUNT OF TRANSMISSION ASTIGMATISM: −0.25 [D])

DISTRIBUTION MAP OF TRANSMISSION
ASTIGMATISM OF EMBODIMENT 2

EMBODIMENT 2 (ADD = 2.00 [D])
(ADDITIONAL AMOUNT OF TRANSMISSION ASTIGMATISM: −0.25 [D])

DISTRIBUTION MAP OF TRANSMISSION AVERAGE REFRACTIVE POWER OF EMBODIMENT 2

EMBODIMENT 2 (ADD = 1.00 [D])
(ADDITIONAL AMOUNT OF TRANSMISSION ASTIGMATISM: −0.125 [D])

DISTRIBUTION MAP OF TRANSMISSION ASTIGMATISM OF EMBODIMENT 2

EMBODIMENT 2 (ADD = 1.00 [D])
(ADDITIONAL AMOUNT OF TRANSMISSION ASTIGMATISM: −0.125 [D])

DISTRIBUTION MAP OF TRANSMISSION AVERAGE
REFRACTIVE POWER OF EMBODIMENT 2a

EMBODIMENT 2a (ADD=3.00 [D])
(ADDITIONAL AMOUNT OF TRANSMISSION ASTIGMATISM: −0.50 [D])

DISTRIBUTION MAP OF TRANSMISSION
ASTIGMATISM OF EMBODIMENT 2a

EMBODIMENT 2a (ADD=3.00 [D])
(ADDITIONAL AMOUNT OF TRANSMISSION ASTIGMATISM: −0.50 [D])

DISTRIBUTION MAP OF TRANSMISSION AVERAGE
REFRACTIVE POWER OF EMBODIMENT 2a

EMBODIMENT 2a (ADD=2.00 [D])
(ADDITIONAL AMOUNT OF TRANSMISSION ASTIGMATISM: −0.33 [D])

DISTRIBUTION MAP OF TRANSMISSION
ASTIGMATISM OF EMBODIMENT 2a

EMBODIMENT 2a (ADD=2.00 [D])
(ADDITIONAL AMOUNT OF TRANSMISSION ASTIGMATISM: −0.33 [D])

DISTRIBUTION MAP OF TRANSMISSION AVERAGE
REFRACTIVE POWER OF EMBODIMENT 2a

EMBODIMENT 2a (ADD = 1.00 [D])
(ADDITIONAL AMOUNT OF TRANSMISSION ASTIGMATISM: −0.17 [D])

DISTRIBUTION MAP OF TRANSMISSION
ASTIGMATISM OF EMBODIMENT 2a

EMBODIMENT 2a (ADD = 1.00 [D])
(ADDITIONAL AMOUNT OF TRANSMISSION ASTIGMATISM: −0.17 [D])

DISTRIBUTION MAP OF TRANSMISSION AVERAGE
REFRACTIVE POWER OF REFERENCE EMBODIMENT 2

REFERENCE EMBODIMENT 2 (ADD = 3.00 [D])
(ADDITIONAL AMOUNT OF TRANSMISSION ASTIGMATISM: −0.50 [D])

DISTRIBUTION MAP OF TRANSMISSION
ASTIGMATISM OF REFERENCE EMBODIMENT 2

REFERENCE EMBODIMENT 2 (ADD = 3.00 [D])
(ADDITIONAL AMOUNT OF TRANSMISSION ASTIGMATISM: −0.50 [D])

DISTRIBUTION MAP OF TRANSMISSION AVERAGE
REFRACTIVE POWER OF REFERENCE EMBODIMENT 2

REFERENCE EMBODIMENT 2 (ADD = 2.00 [D])
(ADDITIONAL AMOUNT OF TRANSMISSION ASTIGMATISM: −0.50 [D])

DISTRIBUTION MAP OF TRANSMISSION
ASTIGMATISM OF REFERENCE EMBODIMENT 2

REFERENCE EMBODIMENT 2 (ADD = 2.00 [D])
(ADDITIONAL AMOUNT OF TRANSMISSION ASTIGMATISM: −0.50 [D])

DISTRIBUTION MAP OF TRANSMISSION AVERAGE
REFRACTIVE POWER OF REFERENCE EMBODIMENT 2

REFERENCE EMBODIMENT 2 (ADD = 1.00 [D])
(ADDITIONAL AMOUNT OF TRANSMISSION ASTIGMATISM: −0.50 [D])

DISTRIBUTION MAP OF TRANSMISSION
ASTIGMATISM OF REFERENCE EMBODIMENT 2

REFERENCE EMBODIMENT 2 (ADD = 1.00 [D])
(ADDITIONAL AMOUNT OF TRANSMISSION ASTIGMATISM: −0.50 [D])

SYSTEM OF PROGRESSIVE ADDITION LENS, DESIGN METHOD OF PROGRESSIVE ADDITION LENS, AND PROGRESSIVE ADDITION LENS GROUP

TECHNICAL FIELD

The present invention relates to a design system of a progressive addition lens, a design method of a progressive addition lens, and a progressive addition lens group. The contents of Japanese Patent Application No. 2018-186038, Japanese Patent Application No. 2019-48646, and Japanese Patent Application No. 2019-48647, which are the basis of priority, are all referred to in this specification.

BACKGROUND ART

FIG. 1A is a diagram illustrating a schematic configuration of a progressive addition lens.

As illustrated on the left side of FIG. 1A, a progressive addition lens is a lens that has, as an area, a portion of a lens provided in an upper portion of the figure and having a refractive power to view a distance object, that is, a distance portion having a refractive power used for distance vision, a portion of a lens provided in a lower portion of the figure and having a refractive power to view a near object, that is, a near portion having a refractive power used for near vision, and an intermediate portion provided between the distance portion and the near portion, and has the refractive power gradually changing between the distance portion and the near portion.

The area where the refractive power gradually changes is called a corridor. A corridor length is defined as a distance between a progressive start point where the change in the refractive power starts and a progressive end point where the change in the refractive power ends.

The distance portion is the area of the progressive addition lens that is the progressive start point and above the progressive start point. The near portion is the area of the progressive addition lens, which generally includes the progressive end point and is located below the progressive end point. The intermediate portion is the area between the distance portion and the near portion, and is the area where the refractive power changes progressively.

The diagram on the right side of FIG. 1A is a diagram illustrating the change in the refractive power along the meridian. In the distance portion, the refractive power is substantially constant. In the near portion, the refractive power is substantially constant to view the short distance object. In the intermediate portion, the refractive power is gradually changing. A difference between the refractive power that views the distance object and the refractive power that views the near object is called an addition power ADD (D).

FIG. 1B is a diagram illustrating an example of a distribution of transmission average refractive power MP and a distribution of transmission astigmatism AS. Note that the distribution on the left side of FIG. 1B, that is, the distribution of the transmission average refractive power MP is the same as the distribution illustrated in FIG. 3A. In addition, the distribution on the right side of FIG. 1B, that is, the distribution of the transmission astigmatism AS is the same as the distribution illustrated in FIG. 4A.

Here, in the current progressive addition lens technology, the astigmatism is substantially set to zero on a main line of sight not only in the distance portion and the near portion but also in the intermediate portion in which the refractive power changes. In other words, in the current progressive addition lens, the astigmatism is substantially zero along the main line of sight. A detailed definition of the main line of sight will be described later.

In such a progressive addition lens, the astigmatism is likely to occur because the distance portion and the near portion having different refractive powers exist in the same lens. Conventionally, it is designed to remove the astigmatism as much as possible along the meridian. Therefore, in areas other than the meridian, the average refractive power deviates from the target refractive power, and intrinsic astigmatism and distortion are likely to occur.

The intrinsic astigmatism is unavoidable astigmatism in the progressive addition lens that increases on both sides of the intermediate portion and near portion having the meridian therebetween, and a detailed definition thereof will be described later.

Meanwhile, in order to reduce the intrinsic astigmatism and distortion caused by the progressive addition lens, in recent years, a concept of a transmission design has been used in the design of the progressive addition lens. This design method takes into consideration actual light rays (ray tracing) that pass through the lens. The transmission design focuses on the distributions of the astigmatism and refractive power generated by light passing through the lens and entering an eye. The transmission design is disclosed in, for example, Patent Literature 1.

CITATION LIST

Patent Literature

Patent Literature 1: Japanese Patent No. 5784418

SUMMARY OF INVENTION

Technical Problem

Due to a change in an eye condition of a person wearing a progressive addition lens α, the replacement with a progressive addition lens β having different parameters is done frequently. When the wearer changes from the progressive addition lens α to the progressive addition lens β, the visual performance may greatly change from the visual performance when passing through the previous progressive addition lens α.

Therefore, an object of an embodiment of the present invention is to provide a technique for facilitating wearer's familiarity with a replaced progressive addition lens.

Solution to Problem

The present inventors examined factors that greatly change from the previous visual performance. As a result, the present inventors focused on the fact that as the factors, at least one of the distribution of the transmission average refractive power and the transmission astigmatism is greatly different from the progressive addition lens α.

As a result of further studies by the present inventors, if the progressive addition lens changes in the progressive addition lens group to which the transmission astigmatism is added, it became clear that a match rate of the distributions related to the refractive power between the progressive addition lens α and the progressive addition lens β approaches 100% by adjusting the amount of transmission astigmatism.

The following aspects are made based on the above findings.

A first aspect of the present invention is a design system of a progressive addition lens including a near portion for viewing a near distance, a distance portion for viewing a distance farther than the near distance, and an intermediate portion provided between the near portion and the distance portion and having a progressive refraction function, the design system of a progressive addition lens including an aberration amount setting unit that sets a transmission astigmatism amount $\Delta_\beta[D]$ added to a progressive addition lens β, in such a way that when a wearer of the progressive addition lens α to which transmission astigmatism of an aberration amount $\Delta_\alpha[D]$ is added is provided with the progressive addition lens β having different parameters, visual performance when the progressive addition lens β is worn approaches visual performance when the progressive addition lens α is worn.

In a second aspect of the present invention described in the first aspect, at least one of the different parameters is an addition power, the aberration amount setting unit sets the transmission astigmatism amount $\Delta_\beta[D]$ added to the progressive addition lens β so that a match rate of a distribution related to the refractive power between the progressive addition lens α and the progressive addition lens β approaches 100%, the distribution related to the refractive power is at least one of a distribution of transmission astigmatism in which a vertical axis y is a vertical direction of the lens, a horizontal axis x is a horizontal direction of the lens, and an origin is a prism reference point of the lens, and a distribution of transmission average refractive power, in the distribution of the transmission astigmatism, the aberration amount setting unit sets the aberration amount $\Delta_\beta[D]$ so that a match rate of a horizontal width of area a'1 where the transmission astigmatism is ADD/4 or less and y=−14.0 mm is 97 to 103%, and a match rate of a horizontal width of area a'2 where the transmission astigmatism is ADD/4 or less and y=−20.0 mm is 97 to 103%, and in the distribution of the transmission average refractive power, the aberration amount setting unit sets the aberration amount $\Delta_\beta[D]$ so that a match rate of a horizontal width of area A where the transmission average refractive power is equal to or more than half a value of near power and y=−14.0 mm is 97 to 103%, and a match rate of a horizontal width of area B where the transmission average refractive power is equal to or more than half the value of the near power and y=−20.0 mm is 97 to 103%.

In a third aspect of the present invention described in the first aspect or the second aspect, at least one of the different parameters is an addition power, and when the x axis is the horizontal direction of the lens, the y axis is the vertical direction of the lens, the origin is the prism reference point of the lens, and then a rotation angle from a positive direction of the x axis passing through the origin is the horizontal axis (unit: degree), and a meridianal refractive power, normalized by the addition power, at each point corresponding to a rotation angle on a circle having a radius of 14.0 mm centered on the origin of the progressive addition lens is the vertical axis (unit: dimensionless), the aberration amount setting unit sets the aberration amount $\Delta_\beta[D]$ so that a maximum width in a vertical axis direction between a plot of the progressive addition lens α and a plot of the progressive addition lens β is 0.1 or less.

In a fourth aspect of the present invention described in any one of the first aspect to the third aspect, the aberration amount $\Delta_\alpha$ is 0.07 to 0.24 times an addition power $ADD_\alpha[D]$, and the aberration amount $\Delta_\beta$ is 0.07 to 0.24 times an addition power $ADD_\beta[D]$.

In a fifth aspect of the present invention described in any one of the first aspect to the fourth aspect, in the progressive addition lens α and the progressive addition lens β, the transmission astigmatism is added to the near portion and the intermediate portion of the distance portion, the near portion, and the intermediate portion, in the near portion and the intermediate portion to which the transmission astigmatism is added, after the refractive power for astigmatism correction is subtracted, the progressive addition lens includes a portion where an amount of horizontal refractive power is greater than an amount of vertical refractive power, or a portion where the amount of vertical refractive power is greater than the amount of horizontal refractive power.

A Sixth Aspect of the Present Invention is a design method of a progressive addition lens including a near portion for viewing a near distance, a distance portion for viewing a distance farther than the near distance, and an intermediate portion provided between the near portion and the distance portion and having a progressive refraction function, the design method of a progressive addition lens including:

setting a transmission astigmatism amount $\Delta_\beta[D]$ added to a progressive addition lens β, in such a way that when a wearer of the progressive addition lens α to which transmission astigmatism of an aberration amount $\Delta_\alpha[D]$ is added is provided with the progressive addition lens β having different parameters, visual performance when the progressive addition lens β is worn approaches visual performance when the progressive addition lens α is worn.

A Seventh Aspect of the Present Invention is progressive addition lens group including a near portion for viewing a near distance, a distance portion for viewing a distance farther than the near distance, and an intermediate portion provided between the near portion and the distance portion and having a progressive refraction function, in which transmission astigmatism is added to all progressive addition lenses, and visual performances when worn are similar to each other.

In an eighth aspect of the present invention described in the seventh aspect, a progressive addition lens α and a progressive addition lens β, which are any two of the progressive addition lens groups, are set with different addition powers, a transmission astigmatism amount $\Delta_\beta[D]$ added to the progressive addition lens β is set so that a match rate of a distribution related to the refractive power between the progressive addition lens α and the progressive addition lens β approaches 100%, the distribution related to the refractive power is at least one of a distribution of transmission astigmatism in which a vertical axis y is a vertical direction of the lens, a horizontal axis x is a horizontal direction of the lens, and an origin is a prism reference point of the lens, and a distribution of transmission average refractive power, in the distribution of the transmission astigmatism, a match rate of a horizontal width of area a'1 where the transmission astigmatism is ADD/4 or less and y=−14.0 mm is 97 to 103%, and a match rate of a horizontal width of area a'2 where the transmission astigmatism is ADD/4 or less and y=−20.0 mm is 97 to 103%, and in the distribution of the transmission average refractive power, a match rate of a horizontal width of area A where the transmission average refractive power is equal to or more than half a value of near power and y=−14.0 mm is 97 to 103%, and a match rate of a horizontal width of area B where the transmission average refractive power is equal to or more than half the value of the near power and y=−20.0 mm is 97 to 103%.

In a ninth aspect of the present invention described in the seventh aspect or the eighth aspect, a progressive addition lens α and a progressive addition lens β, which are any two of the progressive addition lens groups, are set with different addition powers, when the x axis is the horizontal direction of the lens, the y axis is the vertical direction of the lens, the origin is the prism reference point of the lens, and then a rotation angle from a positive direction of the x axis passing through the origin is the horizontal axis (unit: degree), and a meridianal refractive power, normalized by the addition power, at each point corresponding to the rotation angle on a circle having a radius of 14.0 mm centered on the origin of the progressive addition lens is the vertical axis (unit: dimensionless), a maximum width in a vertical axis direction between a plot of the progressive addition lens α and a plot of the progressive addition lens β is 0.1 or less.

In a tenth aspect of the present invention described in any one of the seventh aspect to the ninth aspect, the transmission astigmatism added to each progressive addition lens is 0.07 to 0.24 times an amount of addition power $ADD_\alpha[D]$ in each progressive addition lens.

In an eleventh aspect of the present invention described in any one of the seventh aspect to the tenth aspect, the transmission astigmatism is added to the near portion and the intermediate portion of the distance portion, the near portion, and the intermediate portion, in the near portion and the intermediate portion to which the transmission astigmatism is added, after the refractive power for astigmatism correction is subtracted, the progressive addition lens further includes a portion where an amount of horizontal refractive power is greater than an amount of vertical refractive power, or a portion where the amount of vertical refractive power is greater than the amount of horizontal refractive power.

According to another aspect of the present invention, addition power ADD of at least one of a progressive addition lens α and a progressive addition lens β may be in a range of 1.5 to 3.0 D. The progressive addition lens α and the progressive addition lens β may be set with the addition power.

According to another aspect of the present invention, in the distribution of the transmission astigmatism, an aberration amount $\Delta_\beta[D]$ may be set so that a match rate of a horizontal width of area a'1 where the transmission astigmatism is ADD/4 or less and y=−14.0 mm is preferably 98 to 102%, and more preferably 99 to 101%, a match rate of a horizontal width of area a'2 where the transmission astigmatism is ADD/4 or less and y=−20.0 mm is preferably 98 to 102%, and more preferably 99 to 101%, and/or a match rate of a horizontal width of area A where the transmission average refractive power is equal to or more than half a value of near power and y=−14.0 mm is preferably 98 to 102%, and more preferably 99 to 101%, and a match rate of a horizontal width of area B where the transmission average refractive power is equal to or more than half a value of near power and y=−20.0 mm is preferably 98 to 102%, and more preferably 99 to 101%.

According to another aspect of the present invention, an absolute value of a change amount A[D] from a value of transmission astigmatism at a measurement reference point F of the distance portion to a value of transmission astigmatism at a measurement reference point N of the near portion is preferably 0.07 to 0.24 times the addition power ADD[D]. Note that the range of the change amount A[D] is more preferably 0.10 times to 0.20 times the amount of addition power ADD[D], and particularly preferably 0.12 to 0.15 times.

According to another aspect of the present invention,

The transmission astigmatism having an absolute value exceeding zero and 0.25 D or less is preferably added to the near portion and the intermediate portion.

According to another aspect of the present invention,

The absolute value of the value of the transmission astigmatism at the measurement reference point F of the distance portion after subtracting the refractive power for astigmatism correction is preferably 0.12 D or less.

According to another aspect of the present invention,

The transmission refractive power is preferably added together with the transmission astigmatism.

According to another aspect of the present invention, when viewed the lens from top to bottom, it is preferable that the amount of transmission astigmatism added is not reduced after the additional of the transmission astigmatism has started.

In addition, when viewed the lens from top to bottom, at least on a main line of sight from the progressive start point to the measurement reference point N (in the case of meridian, on the meridian up to an intersecting horizontal line), the additional amount is preferably 10% or less or 0.12 D or less even when the additional amount is monotonically increased after the addition of the transmission astigmatism has started and the monotonically increased additional amount is not reduced or is reduced.

According to another aspect of the present invention, a determination unit in the computer device may determine whether or not the match rate of the distribution of the transmission astigmatism in the progressive addition lens β and the distribution of the transmission astigmatism in the progressive addition lens α is within a predetermined threshold value. Further, the determination unit in the computer device may determine whether or not the absolute value of the above aberration amount $\Delta_\beta[D]$ is within 0.07 to 0.24 times the addition power ADD[D].

Another aspect of the present invention,
is a design system of a progressive addition lens including
a near portion for viewing a near distance, a distance portion for viewing a distance farther than the near distance, and an intermediate portion provided between the near portion and the distance portion and having a progressive refraction function,
in which the transmission astigmatism is added to the near portion and the intermediate portion of the distance portion, the near portion, and the intermediate portion,
in the near portion and the intermediate portion to which the transmission astigmatism is added, after the refractive power for astigmatism correction is subtracted,
the progressive addition lens further includes a portion where the amount of horizontal refractive power is greater than the amount of vertical refractive power,
or
a portion where the amount of vertical refractive power is greater than the amount of horizontal refractive power.

According to another aspect of the present invention,
between the progressive addition lens and the progressive addition lens β before the addition of transmission astigmatism,
the addition power of the progressive addition lens β is less than 3.00 [D] (preferably less than 2.00 [D]),
in the progressive addition lens α and the progressive addition lens β, the transmission astigmatism is added to the near portion and the intermediate portion of the distance portion, the near portion, and the intermediate portion,
in the near portion and the intermediate portion to which the transmission astigmatism is added, after the refractive power for astigmatism correction is subtracted,
when the progressive addition lens further includes a portion where the amount of horizontal refractive power is greater than the amount of vertical refractive power,
a match rate of a horizontal width of area A where the transmission average refractive power is equal to or more than half a value of near power and y=−14.0 mm is 90 to 100%, and
a match rate of a horizontal width of area B where the transmission average refractive power is equal to or more than half the value of the near power and y=−20.0 mm is 90 to 100%, and
when the progressive addition lens further includes a portion where the amount of vertical refractive power is greater than the amount of horizontal refractive power,
a match rate of a horizontal width of area a'1 where the transmission astigmatism is ADD/4 or less and y=−14.0 mm is 60 to 100%, and
a match rate of a horizontal width of area a'2 where the transmission astigmatism is ADD/4 or less and y=−20.0 mm is 60 to 100%.

The following provisions may be adopted in place of or in conjunction with that provision.

The maximum width of the vertical axis direction between the plot of the progressive addition lens and the plot of the progressive addition lens β before the addition of transmission astigmatism is 0.1 or less.

Advantageous Effects of Invention

According to an embodiment of the present invention, it is possible to provide a technique for making the wearer familiar with the replaced progressive addition lens.

BRIEF DESCRIPTION OF DRAWINGS

FIG. 1B is a diagram illustrating an example of a distribution of transmission average refractive power MP and a distribution of transmission astigmatism AS.

DESCRIPTION OF EMBODIMENTS

Figure 1A:
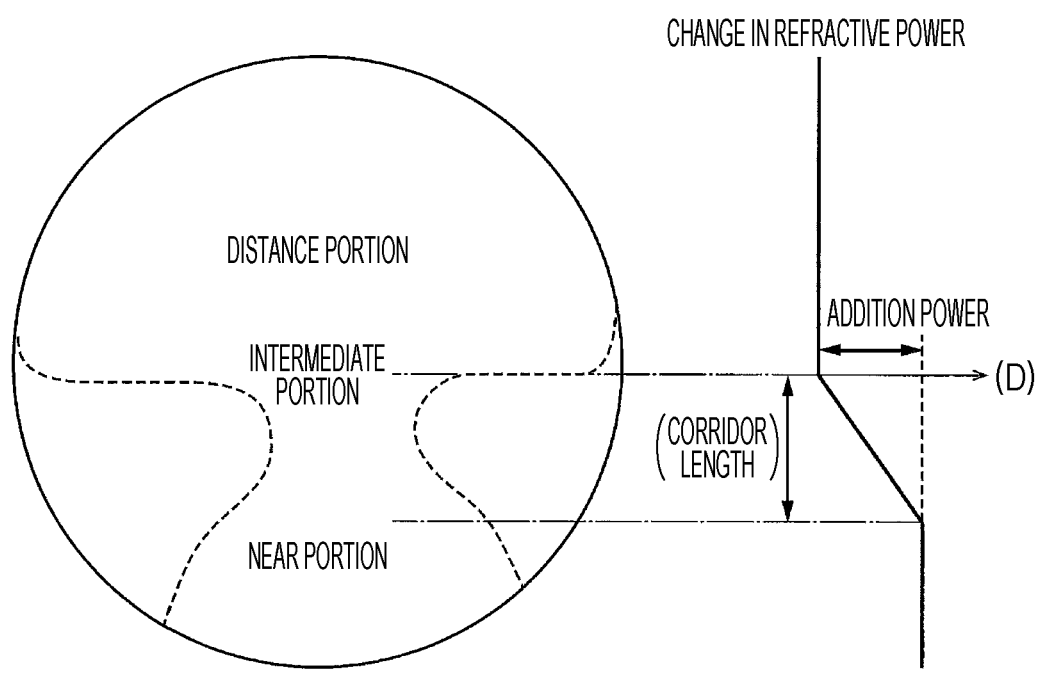
FIG. 1A is a diagram illustrating a schematic configuration of a progressive addition lens.

One aspect of the present invention will be described according to the following flow.

1. Gist of technical idea of the present invention
2. Definition
3. Transmission basic design
4. Conventional progressive addition lens
5. Design method of progressive addition lens according to Embodiment 1

5-1. Progressive addition lens handled in Embodiment 1 (horizontal refractive power >vertical refractive power)

5-2. Before and after lens change, comparison when amount of transmission astigmatism added is within predetermined range (Embodiment 1 and Embodiment 1a in which aberration amount is slightly changed) and when amount of transmission astigmatism added is not within predetermined range (reference Embodiment 1)

6. Design method of progressive addition lens of Embodiment 2

6-1. Progressive addition lens handled in Embodiment 2 (vertical refractive power >horizontal refractive power)

6-2. Before and after lens change, comparison when amount of transmission astigmatism added is within predetermined range (Embodiment 2 and Embodiment 2a in which aberration amount is slightly changed) and when amount of transmission astigmatism added is not within predetermined range (reference Embodiment 2)

7. Comparison between each embodiment and each reference embodiment from viewpoint of meridianal power on circumference 8. System configuration according to one aspect of the present invention 9. Modification example The meanings of symbols and lines in the drawings of the present application are the same. Therefore, only first codes and lines will be described, and the following may be omitted.

1. Gist of Technical Idea of the Present Invention

Prior to a description of a progressive addition lens of one aspect of the present invention and the related art, the gist of the technical idea of the present invention will be described.

One of the reasons for the creation of the technical idea of the present invention is that it overturns common sense and intentionally adds transmission astigmatism to a place where a spectacle wearer frequently passes the line of sight. The portion is an intermediate portion and a near portion. Note that transmission astigmatism is not added to a distance portion. More precisely, the transmission astigmatism is not added to a fitting point or an eye point FP existing at least in the distance portion. Then, this aspect is applied to a progressive addition lens α before replacement and a progressive addition lens β after replacement. Details will be defined in [2. Definition] below.

By adding the transmission astigmatism in this way, of course, the transmission astigmatism increases at a meridian and a measurement reference point N. However, a sharp change in transmission astigmatism is within the entire intermediate portion and near portion. As a result, a clear visual field range in which the transmission astigmatism is 0.50 D or less (after subtracting the refractive power for astigmatism correction) can be obtained.

As a result of the present inventors producing and/or simulating a large number of progressive addition lenses to which the transmission astigmatism is added in this way, even if the parameters set in the progressive addition lens change, by adjusting the amount of transmission astigmatism added by using a computer, it became clear that visual performances when the progressive addition lens is worn approach each other before and after the replacement.

The configuration conceived based on the above findings is as follows.

"A design system of a progressive addition lens including a near portion for viewing a near distance, a distance portion for viewing a distance farther than the near distance, and an intermediate portion provided between the near portion and the distance portion and having a progressive refraction function, the design system of a progressive addition lens including:

an aberration amount setting unit that sets a transmission astigmatism amount $\Delta_\beta[D]$ added to a progressive addition lens β, in such a way that when a wearer of the progressive addition lens α to which transmission astigmatism of an aberration amount $\Delta_\alpha[D]$ is added is provided with the progressive addition lens β having different parameters, visual performance when the progressive addition lens β is worn approaches visual performance when the progressive addition lens α is worn. Alternatively, a design method of a progressive addition lens that sets a transmission astigmatism amount $\Delta_\beta[D]$ in that way."

According to one aspect of the present invention, it is possible to provide a technique for making the wearer familiar with the replaced progressive addition lens.

Note that it is preferable to adopt the following aspects in consideration of data illustrated later.

It is preferable that at least one of the above different parameters is addition power. It is preferable to provide the addition power β of a different progressive addition lens $ADD_\beta[D]$ to the wearer of the progressive addition lens α of the addition power $ADD_\alpha[D]$ to which the transmission astigmatism of the aberration amount $\Delta_\alpha[D]$ is added. Note that parameters other than the addition power may be adopted. For example, a distance power S, which is a spherical power S, and a near power (S+ADD) may be adopted.

Then, in order to make it easier for the wearer to become familiar with the replaced progressive addition lens, a match rate of the distribution related to the refractive power between the progressive addition lens α and the progressive addition lens β approaches 100%. The specific aspects are listed below. Note that at least one of the following specific aspects may be applied.

(Specified in at Least One of the Distribution of the Transmission Astigmatism and the Distribution of the Transmission Average Refractive Power)

The "distribution related to the refractive power" is preferably at least one of the distribution of the transmission astigmatism in which a y axis is a vertical direction of the lens, an x axis is a horizontal direction of the lens, and an origin is a prism reference point of a lens, and the distribution of the transmission average refractive power.

If the match rate before and after the replacement of the progressive addition lens approaches 100% in at least one (preferably both) of the distribution of the transmission astigmatism and the distribution of the transmission average refractive power, it proves that the wearer is familiar with the replaced progressive addition lens. Note that the guideline for setting the aberration amount is as follows.

In the distribution of the transmission astigmatism, the aberration amount setting unit preferably sets the aberration amount $\Delta_\beta[D]$ so that a match rate of a horizontal width of area a'1 where the transmission astigmatism is ADD/4 or less and y=−14.0 mm is 97 to 103% (more preferably 98 to 102%, and still more preferably 99 to 101%), and a match rate of a horizontal width of area a'2 where the transmission astigmatism is ADD/4 or less and y=−20.0 mm is 97 to 103% (more preferably 98 to 102%, and still more preferably 99 to 101%).

According to one aspect of the present invention, it is possible to provide a technique for making the wearer familiar with the replaced progressive addition lens. In order to solve this problem, it is a technical idea of the present invention to make a distribution map of the transmission astigmatism or a distribution map of the transmission average refractive power similar before and after the replacement. Therefore, in one aspect of the present invention, instead of fixing an area where the transmission astigmatism is 0.50 D or less and conditions, attention is paid to an area where the transmission astigmatism is ADD/4 or less as a guide. In the distribution map of the transmission astigmatism of the present specification, a contour line corresponding to ADD/4 is illustrated in bold.

In the distribution of the transmission average refractive power, the aberration amount setting unit preferably sets the aberration amount $\Delta_\beta[D]$ so that a match rate of a horizontal width of area A where the transmission average refractive power is equal to or more than half a value of near power and y=−14.0 mm is 97 to 103% (more preferably 98 to 102%, and still more preferably 99 to 101%)

a match rate of a horizontal width of area B where the transmission average refractive power is equal to or more than half a value of near power and y=−20.0 mm is preferably 97 to 103% (more preferably 98 to 102%, and still more preferably 99 to 101%).

The "match rate of the distribution related to the refractive power" refers to a degree of change before and after a lens changes after a predetermined portion (for example, the horizontal width of the area where the transmission astigmatism is ADD/4 or less) of the distribution is focused, for example, when the distribution is the distribution of the transmission astigmatism. Specifically, the match rate is 100*(horizontal width after change in lens)/(horizontal width before change in lens). That is, when the horizontal width increases after the lens changes, the match rate exceeds 100%, and when the horizontal width decreases after the lens changes, the match rate becomes less than 100%.

In addition, although the expression "change rate" was used in the basic application, it is preferable that there is no change in the distribution before and after the lens changes, and the expression "match rate 100%" is more appropriate than the expression "change rate 100%", and as a result, the match rate is adopted in this specification.

(Defined by Meridianal Power on Circumference)

The human eye visually recognizes an object by rotating according to a listing's law. That is, when shifting from a front view to a side view, a downward view, or the like, the rotation direction is mainly the meridional direction. Therefore, the meridianal power is directly linked to the evaluation of the visual performance, which in turn is directly linked to the evaluation of the progressive addition lens. As a result, it is preferable to define the progressive addition lens by the meridianal power on the circumference. A specific example is as follows.

First, the x axis is the horizontal direction of the lens, the y axis is the vertical direction of the lens, and the origin is the prism reference point of the lens. Hereafter, this setting is assumed for the "distribution related to the refractive power".

Thereafter, a plot in which a rotation angle from the positive direction of the x axis passing through the origin is a horizontal axis (unit: degree), and a meridianal refractive power, normalized by the addition power, at each point corresponding to the rotation angle on a circle having a radius of 14.0 mm centered on the origin of the progressive addition lens is a vertical axis (unit: dimensionless) is prepared (for example, FIGS. 27 to 31 to be described later).

Then, in this plot, preferably, the aberration amount setting unit sets the aberration amount $\Delta_\beta[D]$ so that the maximum width in the vertical axis direction between the plot of the progressive addition lens α and the plot of the progressive addition lens β is 0.1 or less (more preferably 0.01 or less, and still more preferably 0.001 or less).

Note that in the present specification, the "normalized by the addition power" refers to dividing the meridianal refractive power at each point corresponding to the rotation angle on the circle having the radius of 14.0 mm centered on the origin of the progressive addition lens by the addition power set in the lens.

According to the above regulations, a power according to a cycloduction direction, which is directly linked to the evaluation of the progressive addition lens, is defined, and the visual performance at the time of wearing is defined. As a result, it becomes easier for the wearer to become familiar with the replaced progressive addition lens.

Other preferred embodiments are as follows.

In one aspect of the present invention, when the addition power ADD is adopted as the above parameters, it is preferable that the aberration amount $\Delta_\alpha$ is 0.07 to 0.24 times the addition power $ADD_\alpha[D]$, and the aberration amount $\Delta_\beta$ is 0.07 to 0.24 times the addition power $ADD_\beta[D]$.

As illustrated by data shown in one aspect described later, by keeping the aberration amount within the above range before and after the lens changes, the match rate of the distribution related to the refractive power is easily set within the above range.

In addition, other preferable aspects related to each of the progressive addition lenses α and β are as follows.

In one aspect of the present invention, the portions where the transmission astigmatism is intentionally added and where the spectacle wearer frequently passes the line of sight are the intermediate portion and the near portion. More precisely, the transmission astigmatism is not added to a fitting point or an eye point FP existing at least in the distance portion. Details will be defined in [2. Definition] below. However, as mentioned in [9. Modification example] to be described later, it is not excluded that the transmission astigmatism is added to the distance portion.

By adding the transmission astigmatism in this way, of course, the transmission astigmatism increases at a meridian and a measurement reference point N. However, a sharp change in transmission astigmatism is within the entire intermediate portion and near portion. As a result, a clear visual field range can be relatively wide.

The transmission astigmatism having an absolute value exceeding zero and 0.25 D or less is preferably added to the near portion and the intermediate portion. Note that as shown by the test results of the subjective evaluation described in the basic application, the addition of the transmission astigmatism of at least 0.75 D or less is permitted.

In addition, the absolute value of the value of the transmission astigmatism at the measurement reference point F of the distance portion after subtracting the refractive power for astigmatism correction is preferably 0.12 D or less. That is, since transmission astigmatism is not added to the distance portion, the absolute value of the transmission astigmatism is low, and the clear visual field range can be obtained even though the transmission astigmatism is added to the intermediate portion and the near portion.

The addition power ADD of the progressive addition lens according to one aspect of the present invention is not particularly limited. It is sufficient that the progressive addition lens α and the progressive addition lens β are set with the addition power. However, when the addition power ADD is relatively high (for example, in the range of 1.5 to 3.0 D), the transmission astigmatism also tends to increase. Therefore, even if the addition power ADD is set to be high, the progressive addition lens according to one aspect of the present invention is applied, and therefore, there is a big advantage that the clearer visual field range can be obtained than before. In view of this, the addition power ADD of at least one of the progressive addition lens α and the progressive addition lens β may be in a range of 1.5 to 3.0 D.

In the progressive addition lens, there is a trade-off relationship between an error in the average refractive power and the astigmatism regardless of the surface shape or the transmission. The relationship becomes more pronounced off the center of the progressive addition lens.

A progressive addition lens handled in a design method of a progressive addition lens of Embodiment 1 to be described later more focuses on astigmatism of an error in average refractive power and the astigmatism, that is, in order to suppress the increase in the astigmatism, as described above, the progressive addition lens is set to include a portion where the amount of horizontal refractive power after subtracting the amount of refractive power for astigmatism correction is greater than the amount of vertical refractive power.

A progressive addition lens handled in a design method of a progressive addition lens of Embodiment 2 to be described later more focuses on an error in average refractive power of the error in the average refractive power and the astigmatism, that is, in order to suppress the increase the error in the average refractive power, as described above, the progressive addition lens is set to include a portion where the amount of vertical refractive power after subtracting the amount of refractive power for astigmatism correction is greater than the amount of horizontal refractive power.

Incidentally, when viewed the lens from top to bottom, it is preferable that the amount of transmission astigmatism added is not substantially reduced after the addition of the transmission astigmatism has started. That is, the additional amount is increased up to the periphery of the lens, or is set to be a fixed additional amount after being increased to a predetermined additional amount. In other words, when viewed the lens from top to bottom, the additional amount increases monotonically after the addition of the transmission astigmatism has started, and the monotonously increased additional amount does not decrease or is 10% or less of the additional amount or is 0.12 D or less even if the monotonously increased additional amount decreases. Note that considering the possibility that the additional amount at the peripheral edge of the lens fluctuates due to the lens processing and the additional amount decreases when the fluctuation occurs, it is also preferable to specify as follows.

In the "at least from the progressive start point to the measurement reference point N (in the case of the meridian, up to the intersecting horizontal line), the additional amount increases monotonically after the addition of the transmission astigmatism has started, and the monotonously increased additional amount does not decrease or it is 10% or less of the additional amount or is 0.12 D or less even if the monotonously increased additional amount decreases."

The addition of the transmission astigmatism causes a change in transmission refractive power. The average refractive power is represented by spherical refractive power+ cylindrical power/2. For example, in the case of Embodiment 1 to be described later in which the transmission astigmatism is added by reducing the vertical refractive power, the average refractive power decreases due to a decrease in a value of cylindrical power in the above equation for the average refractive power in the vertical direction. This means that a value lower than the addition power of the prescribed value is obtained as the addition power. The change in the transmission refractive power due to the addition of the transmission astigmatism can also occur in the case of Embodiment 2 to be described later in which the transmission astigmatism is added by increasing the refractive index in the vertical direction. Therefore, in the present embodiment, the transmission refractive power (plus or minus) is added together with the transmission astigmatism so as to compensate for the change in the refractive power accompanying the addition of the transmission astigmatism and to realize the planned addition power. The additional amount of the transmission refractive power may be determined according to the difference between the refractive powers and the planned addition power.

Hereinafter, although not specified, all the distribution maps of the transmission average refractive power described in the present specification are after the addition of the transmission refractive power described above is performed.

A specific example of adding the transmission refractive power together with the transmission astigmatism is as follows. The additional amount of the transmission astigmatism may be determined in advance. A lens design that in advance considers the change in the refractive power accompanying the addition of the transmission astigmatism is prepared. By adding the predetermined transmission astigmatism to the lens design, it may be set so that a target addition power can be obtained.

As a result, in all the distribution maps of the transmission average refractive power described in the present specification, the initially set addition power can be realized even after the transmission astigmatism is added.

Note that in the progressive addition lens to which the transmission astigmatism is added, at the measurement reference point N of the near portion, if a value of distance power S+addition power ADD described on a lens bag or the like due to the change in the refractive power by the addition, that is, the deviation from the near power is partially compensated, it is considered that the addition of the transmission refractive power is performed. As an example, in the state in which the deviation is finally not present in the progressive addition lens or the state in which the deviation amount is within ±0.12 D even if the deviation is present, it is considered that the addition of the transmission refractive power is performed.

Hereinafter, the design method of a progressive addition lens according to one aspect of the present invention and the related techniques thereof will be described in detail. First, in order to understand embodiments 1 and 2, the definition of each item will be described. Hereinafter, the embodiments 1 and 2 may be collectively referred to as an embodiment or each embodiment.

2. Definition

In the present specification, generally, as a wording indicating the degree of refraction of a lens, so-called power, and the refractive power instead of power is used.

In this specification, the terms three kinds of "astigmatism" are used to clarify the difference in meaning.

The first term is "prescription astigmatism". The prescription astigmatism relates to prescription data for correcting eye defects (eye astigmatism) and corresponds to a columnar refractive power of prescription data.

The second term is "intrinsic astigmatism". The intrinsic astigmatism relates to astigmatism caused by a surface shape of an optical lens and has the same meaning as the term "astigmatism" commonly used in the optical lens design. As used herein, the intrinsic astigmatism originally refers to astigmatism that is inherently indispensable due to the surface shape of the progressive addition lens, that is, an aspherical component constituting a progressive surface.

The third term is "additional astigmatism". The additional astigmatism is the main component of the embodiment, and is the astigmatism intentionally added to the distribution of the transmission astigmatism different from the prescription astigmatism (refractive power for astigmatism correction and astigmatism power) when setting the distribution of the transmission target refractive power in the design stage of the progressive addition lens. For convenience of explanation, in this specification, the additional astigmatism is also referred to as the addition of the transmission astigmatism.

In the present specification, the transmission astigmatism added is the above-mentioned additional astigmatism. The additional astigmatism can be realized by adding the surface astigmatism to at least one of the surface on the object side and the surface on the eyeball side in the progressive addition lens. As a result, the transmission astigmatism is added as the progressive addition lens as a whole.

Note that the expression "transmission refractive power" also refers to the progressive addition lens in which the surface refractive power is added to at least one of the surface on the object side and the surface on the eyeball side.

The transmission astigmatism is the value obtained by subtracting the minimum refractive power from the maximum refractive power at a predetermined location on the progressive addition lens in the wearing state.

In the present specification, the value of the "additional amount of the transmission astigmatism" indicates the maximum value of the transmission astigmatism to be added. In other words, the fact that the additional amount of the transmission astigmatism is 0.50 D means that the maximum value is 0.50 D, and is an expression that allows an additional amount less than 0.50 D between the beginning portion of the addition of the transmission astigmatism and the arrival portion of the maximum value.

Note that an upper limit and a lower limit of the maximum value may be determined according to the above-mentioned different parameters (for example: addition power), and are not particularly limited. For example, the lower limit is preferably 0.08 D, and more preferably 0.10 D. The upper limit is preferably 0.75 D, and more preferably 0.50 D.

In the progressive addition lens, the "main line of sight" is a locus line on the lens surface where the line of sight moves when an object is viewed from the front, in the distance portion used for the distance vision, the near portion used for the near vision, and the intermediate portion located between the distance portion and the near portion.

The "meridian" is a vertical line that is orthogonal to a horizontal line connecting positions of two hidden marks provided on the progressive addition lens and passes through a midpoint of the positions of the two hidden marks. The meridian corresponds to the y axis of the distribution map illustrated in each figure of the present application.

The line of sight of the eye is closer to a nasal side (inner side) in the near vision. Therefore, the main line of sight in the intermediate portion and near portion is closer to the nasal side (medial side) with respect to the meridian. The amount of main line of sight by the nasal side with respect to such a meridian is called an inward adjustment amount. Therefore, when the inward adjustment amount is 0, the main line of sight matches the meridian. Even in the distance portion, the main line of sight matches the meridian.

In this specification, in order to make the explanation easy to understand, an example of setting the inward adjustment amount to 0 is given at the design stage of the lens. In the present specification, the design stage of the lens is also referred to as a target distribution state. On the other hand, an example is given in which the inward adjustment amount is set to a value greater than 0 for a lens obtained through the design and manufacture of the lens. In the present specification, this state is also referred to as a finally obtained lens state. However, the present invention is not limited to these examples.

The "distance portion measurement reference point" refers to giving the progressive addition lens the spherical refractive power and the columnar refractive power described in the prescription data of the wearer information. The spherical refractive power refers to the so-called spherical power S, and the columnar refractive power refers to the so-called cylindrical power C. The distance portion measurement reference point (hereinafter, also simply referred to as measurement reference point F or point F) is located on, for example, the meridian, and is located at a position 8.0 mm away from the horizontal line connecting the positions of the two hidden marks to the distance portion side.

The "fitting point or eye point (FP)" is the position through which the line of sight passes when facing right in front, when wearing the progressive addition lens. Generally, it is placed at a position few mm below the measurement reference point F. The change in the refractive power occurs below this FP. The point at which the change in the progressive power starts is also called the progressive start point. In the embodiment, a geometric center GC further below the FP and the progressive start point are matched, and the prism reference point is also matched.

The "transmission astigmatism is not added to the distance portion" described in [1. Gist of technical idea of the present invention] means that transmission astigmatism is not added to at least the FP existing in the distance portion. Since off-axis aberration occurs in the lens peripheral area of the distance portion, the aspherical correction may be applied to the lens peripheral area. Therefore, it is not necessary to bring about the state in which the transmission astigmatism is not added to the entire distance portion. Preferably, "transmission astigmatism is not added to the distance portion" means that no transmission astigmatism is added at least between the measurement reference point F and the FP (preferably the GC further down).

The "adding the transmission astigmatism to the intermediate portion and the near portion" means adding the transmission astigmatism to at least a part of the intermediate portion and adding the transmission astigmatism to at least a part of the near portion.

Figure 2:
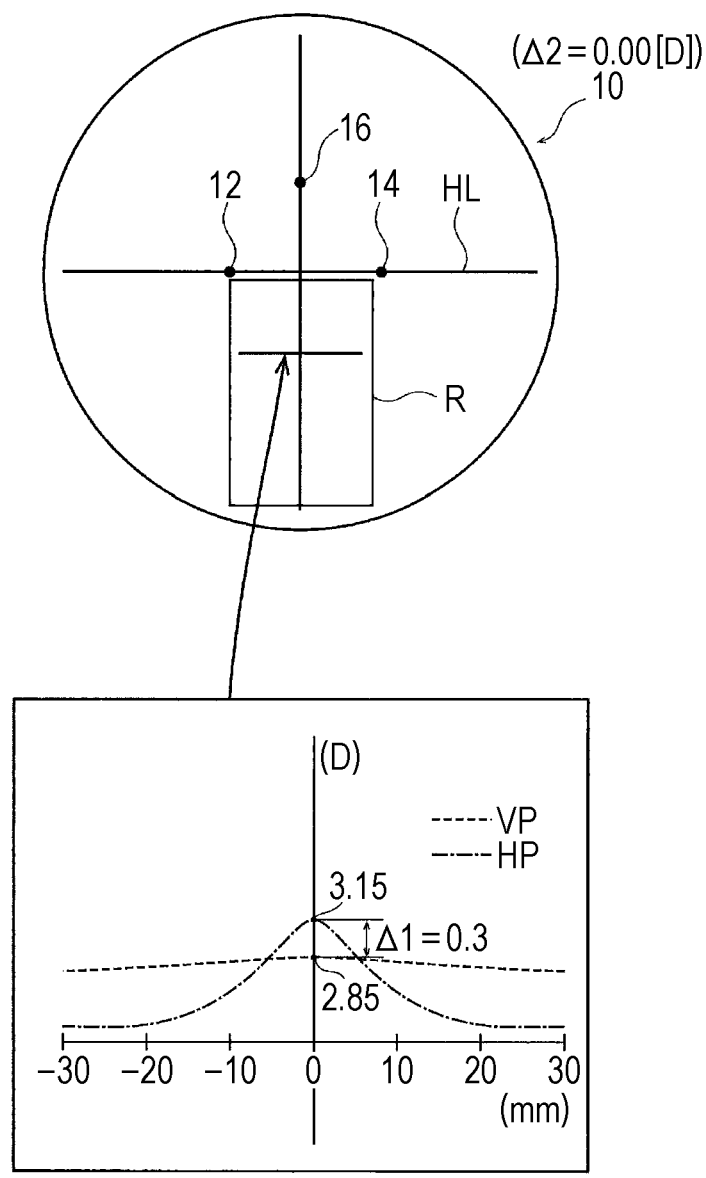
FIG. 2 is a diagram for explaining an example of a distribution of transmission refractive power in a horizontal direction and a vertical direction in a progressive addition lens.

FIG. 2 is a diagram for explaining an example of the distributions of the horizontal and vertical transmission refractive powers in the progressive addition lens.

When the additional state of the transmission astigmatism is defined as a numerical value, it indicates the state in which the value from the absolute value Δ2 of the transmission astigmatism at the measurement reference point F (reference numeral 16 in FIG. 2) of the distance portion to the absolute value Δ1 of the transmission astigmatism at any point of the intermediate portion or the near portion increases.

As shown in patterns 1 and 3 of the addition of the transmission astigmatism described in [9. Modification example] described later, the transmission astigmatism is not necessarily added to the entire area below the horizontal line passing through the progressive start point and the geometric center GC.

Further, when viewed the lens from top to bottom, it is not necessary to start the addition of the transmission astigmatism from directly below the FP, directly below the progressive start point, directly below the GC, or directly below the prism start point. It is sufficient to start the addition of the transmission astigmatism between the progressive start point and the measurement reference point N. The transmission astigmatism may not be added to the portion closer to the distance portion in the intermediate portion, and the transmission astigmatism may be added only to the portion closer to the near portion.

However, it is preferable to add the transmission astigmatism on the main line of sight (and/or meridian) passing through the intermediate portion and the near portion below the portion where the addition of the transmission astigmatism has started. At least, it is preferable to add the transmission astigmatism on the main line of sight from the portion between the progressive start point and the measurement reference point N to the measurement reference point N. In terms of the meridian, it is preferable to add at least the transmission astigmatism on the entire meridian from the portion (for example, within a radius of 5 mm from the GC, preferably within 3 mm) between the progressive start point and the measurement reference point N to the horizontal line intersecting the measurement reference point N. Since the FP and the progressive start point normally exist on the meridian (on the y axis), the horizontal line is not used, but even if the FP and the progressive start point do not exist on the meridian, by using the horizontal line, it is possible to define the above "whole meridian".

The "near portion measurement reference point" refers to a point in which the addition power ADD is added to the spherical refractive power described in the prescription data of the wearer information, and refers to point in which spherical refractive power+ADD is first realized when viewed the lens from top to bottom. The near portion measurement reference point (hereinafter, also simply referred to as measurement reference point N or point N) is also located on the meridian.

By the way, the prescription data of the wearer information is described in the lens bag of the progressive addition lens. That is, if there is the lens bag, it is possible to specify the lens object as the object of the progressive addition lens based on the prescription data of the wearer information. The progressive addition lens is usually made as the set with the lens bag. Therefore, the progressive addition lens group to which the lens bag is attached also reflects the technical idea of the present invention, and the same applies to the set group of the lens bag and the progressive addition lens.

In addition, the positions of measurement reference point F, the fitting point or the eye point FP, and the measurement reference point N can be specified by referring to a remark chart or a centration chart issued by the lens manufacturer.

In the transmission distribution of the distribution of the transmission average refractive power or the distribution of the transmission astigmatism illustrated in the following figures, the transmission average refractive power and the transmission astigmatism formed by passing light rays through each position of the progressive surface of the progressive refraction lens are shown at the position of the progressive surface through which the light rays pass.

Further, in the transmission distribution of the transmission average refractive power or the transmission astigmatism, the location on the transmission distribution corresponding to the distance portion defined on the lens surface is expressed as "the portion corresponding to the distance portion". For convenience of explanation, the "portion corresponding to the distance portion" is also simply expressed as the "distance portion". Unless otherwise specified, the "distance portion" refers to the above "portion corresponding to the distance portion".

Note that the distance portion is not particularly limited as long as it is an area for viewing a distance farther than the near distance. For example, it may be an area for viewing a predetermined distance (about 1 m) instead of infinity. Examples of a spectacle lens provided with such an area include an intermediate-near lens corresponding to an object distance of an intermediate distance (1 m to 40 cm) to a near distance (40 cm to 10 cm) and a corresponding near-near lens within the near distance.

In any of the above spectacle lenses, the intermediate portion and the near portion include an astigmatism adjustment area (area R illustrated in FIG. 2) in which the surface shapes of the near portion and the intermediate portion are adjusted. Of the distribution of the transmission astigmatism generated by light rays transmitted through this spectacle lens, the positions of the maximum refractive power in the intermediate portion and the near portion is approximately the same position in the horizontal direction. That is, the position of the maximum refractive power in the intermediate portion and the near portion has substantially the same value on the x axis in terms of coordinates.

The "position of the maximum refractive power" is a position where the horizontal refractive power and the vertical refractive power orthogonal to the horizontal direction each are the maximum refractive powers. The fact that the position of the maximum refractive power where the horizontal refractive power and the vertical refractive power are the maximum refractive power are substantially the same means that the case where the horizontal refractive power and the vertical refractive power are separated within 2 mm is included as an allowable range.

According to each embodiment described later, the difference between the maximum refractive power in the horizontal direction and the maximum refractive power in the vertical direction in the intermediate portion and the near portion is different from the difference between the horizontal refractive power and the vertical refractive power at the point corresponding to the distance portion measurement reference point. The absolute value of the difference is preferably 0.25 D or less.

Note that it is preferable that the difference in the maximum refractive power is different from the difference between the horizontal refractive power and the vertical refractive power at a point corresponding to the distance portion measurement reference point even in the location corresponding to the location along the meridian in the astigmatism adjustment area.

In Embodiment 1 described later, "in the near portion and the intermediate portion to which the transmission astigmatism is added, including the portion where the amount of horizontal refractive power is greater than the amount of vertical refractive power after subtracting the refractive power for astigmatism correction" means that in at least a part of the portion where the transmission astigmatism is added in the near portion and the intermediate portion, after subtracting the refractive power for astigmatism correction, the amount of horizontal refractive power is greater than the amount of vertical refractive power. Obviously, in the portion where the transmission astigmatism is added, the amount of horizontal refractive power may always be greater than the amount of vertical refractive power. Also, in the near portion and the intermediate portion, at least on the main line of sight (and/or meridian) (preferably at least from the progressive start point to the measurement reference point N), after subtracting the refractive power for astigmatism correction, it is preferable that the amount of horizontal refractive power is greater than the amount of vertical refractive power.

In Embodiment 2 to be describe later, "in the near portion and the intermediate portion to which the transmission astigmatism is added, after subtracting the refractive power for astigmatism correction, including the portion where the amount of vertical refractive power is greater than the amount of horizontal refractive power" is the contents in which horizontal and vertical are reversed in the contents described in this paragraph.

Further, the y direction referred to in the present specification is a direction along the meridian and is a vertical direction. The upper side of the lens in the worn state is set as a +y direction, and the lower side of the lens is set as a −y direction. The x direction is the direction orthogonal to the meridian and is the horizontal direction. When facing the wearer, the right side of the lens is set as a +x direction and the left side of the lens is set as a −x direction.

3. Transmission Basic Design

One aspect of the present invention is intended to be a system, a design method, and a lens group in which the visual performances before and after the replacement of the progressive addition lens are the same. In order to explain this gist, first, the progressive addition lens itself handled in one aspect of the present invention will be described.

Hereinafter, the distribution of the transmission astigmatism in the transmission basic design used in the embodiment will be described. The known technique (for example, the contents described in Patent Literature 1) may be adopted for the transmission basic design itself.

The transmission astigmatism can be calculated from the difference between the tangential transmission refractive power (T) in the vertical direction (y direction) and the sagittal transmission refractive power (S) in the horizontal direction (x direction). At that time, the transmission astigmatism in the case of the distance vision is calculated from T and S in the case of the distance vision, and the transmission astigmatism in the case of the near vision is also calculated from T and S in the case of the near vision.

Using the components (T and S in each of the distance vision and the near vision) of the astigmatism generated by the light rays passing through each position of the progressive addition lens, the distribution of the average refractive power MP and the distribution of the astigmatism AS can be created. This distribution is the distribution of the transmission astigmatism and the distribution of the transmission average refractive power.

The lens surface shape is adjusted so that the distribution of the transmission astigmatism and the distribution of the transmission average refractive power approach the distribution of the transmission astigmatism and the distribution of the transmission average refractive power defined in advance as a target.

At that time, it is preferable that the distribution of the transmission astigmatism and the distribution of the transmission average refractive power are the distributions calculated from the surface shape of the progressive addition lens using at least the information of a corneal-lens apex distance, an anteversion angle, and a front angle.

Once the lens surface shape has been calculated to approach the target transmission distribution (distribution of astigmatism and distribution of average refractive power), the processing machine can manufacture the lens.

Before explaining the design method of the progressive addition lens according to Embodiment 1, the conventional progressive addition lens to be compared with the progressive addition lens handled in the design method of the progressive addition lens of Embodiment 1 will be described.

As the provisions used by the aberration amount setting unit according to one aspect of the present invention, the above (the provisions of at least one of the distribution of the transmission astigmatism and the distribution of the transmission average refractive power) is mainly exemplified. Thereafter, (defined by the meridianal power on the circumference) will be collectively exemplified for each embodiment.

4. Conventional Progressive Addition Lens

FIGS. 3 and 4 are diagrams illustrating the progressive addition lens in which the conventional transmission basic design is performed. FIGS. 3A to 3D are diagrams illustrating the distribution of the transmission average refractive power and the changes in the transmission average refractive power (MP) and the astigmatism (VP and HP) along the vertical (along the meridian) and horizontal directions. Note that the vertical axis y indicates the vertical direction of the lens, the horizontal axis x indicates the horizontal direction of the lens, and the origin indicates the prism reference point of the lens.

FIGS. 4A to 4D are diagrams illustrating the distribution of the transmission astigmatism and the change in the transmission average refractive power and the transmission astigmatism along the vertical and horizontal directions.

Note that the conventional progressive addition lens mentioned in this item is a lens before the transmission astigmatism is added in the examples given in embodiments 1 and 2 to be described later, and is an original lens of the progressive addition lens of each embodiment.

The surface illustrating the transmission average refractive power and the transmission astigmatism is a virtual far point sphere on a side of an eye to which light rays passing through the lens are projected. The word "virtual" means that the surface is not the actual surface of the lens. Here, the transmission average refractive power and the transmission astigmatism are different from the surface average refractive power and the surface astigmatism refractive power (in the opposite sense of a radius of curvature of the lens surface), and are the average refractive power and the intrinsic astigmatism that are generated on the side of the eye.

Hereinafter, the conventional progressive addition lens will be described with reference to FIGS. 3 and 4.

Figure 3A:
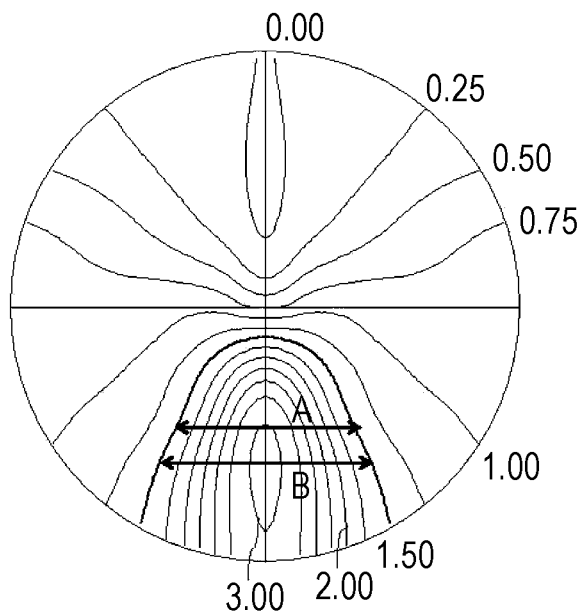
FIG. 3A is a diagram illustrating a distribution of transmission average refractive power corresponding to the conventional progressive addition lens (ADD=3.00 D).

FIG. 3A is a diagram illustrating the distribution of the transmission average refractive power corresponding to the conventional progressive addition lens (ADD=3.00 D). The conditions adopted in FIG. 3A are listed below.

Lens diameter: 60 mm
Inward adjustment amount: 0.0 mm
S (spherical refractive power at distance portion measurement reference point): +0.00 D
C (columnar refractive power): +0.00 D
ADD: 3.00 D
Corridor length: 18 mm
Arrows "A" and "B" indicate a horizontal width of an area that is equal to or more than a given refractive power (for example 1.00 D). Those indicated by the arrows "A" and "B" are also called area A and area B.

The arrow "A" corresponds to a portion of y=−14.0 mm, that is, a representative portion of the near portion.

The arrow "B" corresponds to a portion of y=−20.0 mm, that is, a representative portion representing a downward portion of the near portion. Note that y=−20.0 mm is sufficient as a lower limit value to secure the near portion when the supply conditions of the lens to the frame are taken into consideration.

When comparing the progressive addition lens according to one aspect of the present invention with the conventional progressive addition lens, the arrows "A" and "B" are used to indicate that an area equal to or more than half the value of the near power, being distance power, which is the spherical power S, +addition power/2, can be secured in the horizontal direction in the progressive addition lens according to one aspect of the present invention as compared with the conventional progressive addition lens.

On the other hand, when comparing the progressive addition lens according to one aspect of the present invention with reference Embodiment 1 described later, the arrows "A" and "B" are used as indicators of the change in the shape of the distribution of the transmission average refractive power. As an example, the horizontal width of the area equal to or more than half the value of the near power at a predetermined y position is used as the indicator of the change in the shape of the distribution of the transmission average refractive power. Reference Embodiment 1 has the characteristics of the progressive addition lens according to one aspect of the present invention, but is an example in which the conditions according to one aspect of the present invention are not satisfied when the lens is replaced (for example, when a lens with a different ADD is purchased).

Figure 3B:
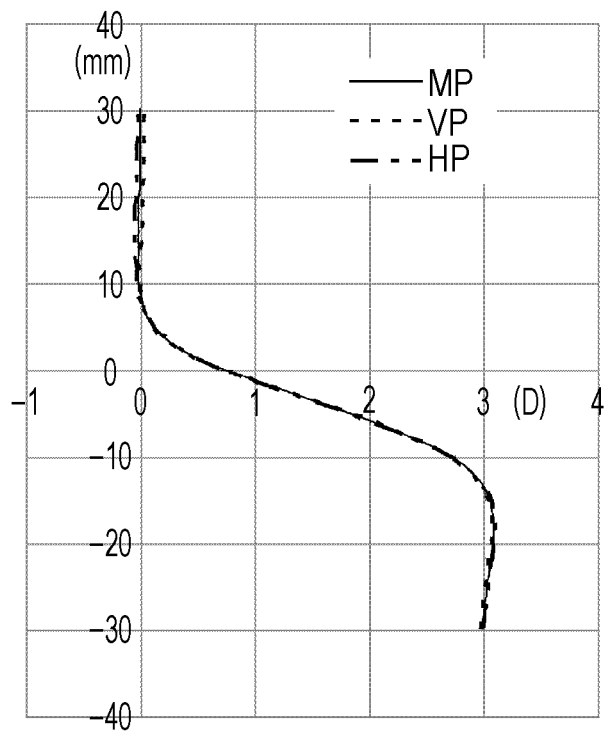
FIG. 3B is a diagram illustrating a change in transmission refractive power in a meridian direction in vertical refractive power (VP), horizontal refractive power (HP), and average refractive power (MP) corresponding to the conventional progressive addition lens (ADD=3.00 D).

FIG. 3B is a diagram illustrating the change in the transmission refractive power along the meridian corresponding to the conventional progressive addition lens (ADD=3.00 D). The vertical axis shows a position [mm] in the y direction, and the horizontal axis shows the average refractive power [D] whose value changes according to the addition power ADD [D].

In addition, in FIG. 3B, a line of the vertical refractive power (VP) is a dotted line, a line of the horizontal refractive power (HP) is a broken line, and a line of the average refractive power (MP) is a solid line. The MP is the average of the VP and HP.

According to the line of the MP illustrated in FIG. 3B, a corridor length from the progressive start point at y=4.0 mm to the progressive end point at y=−14.0 mm where the average refractive power reaches addition power (ADD) 2.00 D indicates 18 mm.

The area between the progressive start point and the progressive end point corresponds to the intermediate portion. The area above the progressive start point corresponds to the distance portion. The area below the progressive end point corresponds to the near portion.

Figure 3C:
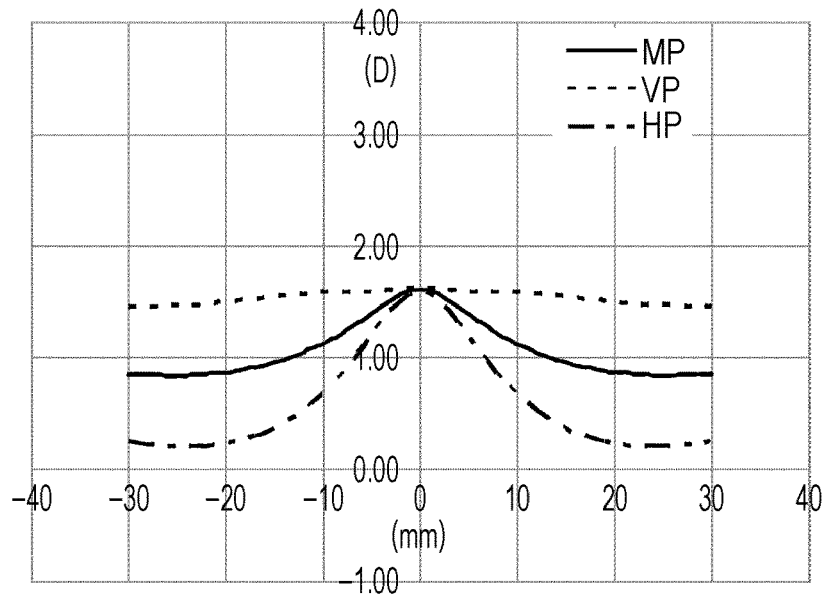
FIG. 3C is a diagram schematically illustrating changes in horizontal transmission refractive power, a vertical transmission refractive power, and a transmission average refractive power, which is an average value thereof, corresponding to the conventional progressive addition lens (ADD=3.00 D) at y=−4.0 mm.
Figure 3D:
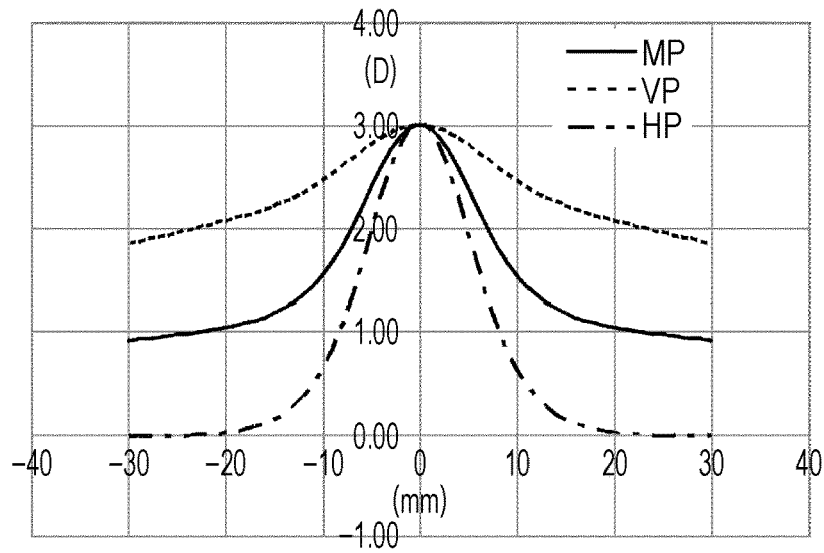
FIG. 3D is a diagram schematically illustrating the changes in the horizontal transmission refractive power, the vertical transmission refractive power, and the transmission average refractive power, which is an average value thereof, corresponding to the conventional progressive addition lens (ADD=3.00 D) at y=−14.0 mm.

FIGS. 3C and 3D are diagrams schematically illustrating the changes in the horizontal transmission refractive power, the vertical transmission refractive power, and the transmission average refractive power, which is an average value thereof, corresponding to the conventional progressive addition lens (ADD=3.00 D) at y=−4.0 mm and y=−14.0 mm. The vertical axis shows the refractive power [D], and the horizontal axis shows the position [mm] in the x direction (horizontal direction). y=−4.0 mm is set as the representative value of the intermediate portion, and y=−14.0 mm is set as the representative value of the near portion.

FIGS. 3B to 3D illustrate that there is almost no transmission astigmatism along the meridian. At least transmission astigmatism is not added. This is a major difference from the embodiment to be described later, that is, the method for adding transmission astigmatism to an intermediate portion and a near portion.

Figure 4A:
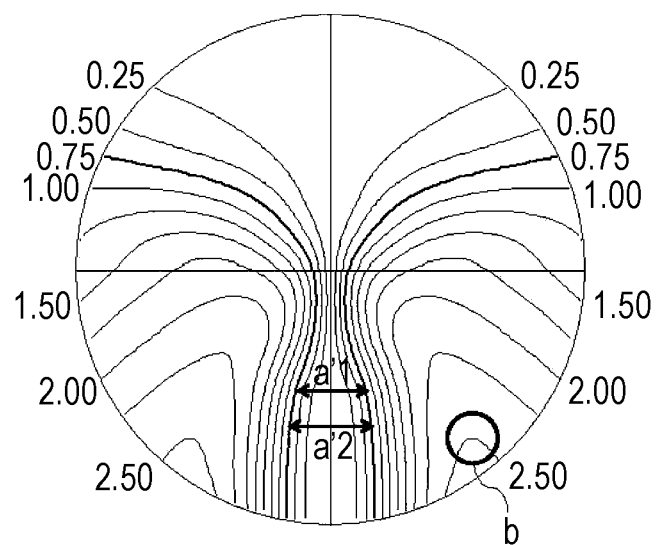
FIG. 4A is a diagram illustrating a distribution of transmission astigmatism corresponding to the conventional progressive addition lens (ADD=3.00 D).

FIG. 4A is a diagram showing the distribution of the transmission astigmatism corresponding to the conventional progressive addition lens (ADD=3.00 D) under the conditions adopted in FIG. 3A. Hereinafter, unless otherwise specified, the distribution of the transmission astigmatism corresponding to the distribution of the transmission refractive power is the distribution under the conditions adopted in the distribution of the transmission refractive power.

The area "a" is used as an indicator of the clear visual field range. The clear visual field range is the visual field range in which the wearer can clearly see through the progressive addition lens. The clear visual field range is defined as a non-occluded area sandwiched by a specific contour line of the transmission astigmatism. In this example, the value of the transmission astigmatism, which indicates the clear visual field range, is 0.50 D. This value is not limited to 0.50 D and may be, for example, 0.25 D. The value of the transmission astigmatism used as an indicator preferably does not exceed 0.50 D.

On the other hand, the area "a'" is used for the progressive addition lens according to one aspect of the present invention. The area "a'" is used as an indicator of the change in the shape of the transmission astigmatism distribution. As an example, the horizontal width of the area where the transmission astigmatism is ADD/4 or less at a predetermined y position is used as an indicator of the change in the shape of the distribution of the transmission astigmatism. Note that when the progressive addition lens according to one aspect of the present invention and the conventional progressive addition lens have the same addition power, the progressive addition lens according to one aspect of the present invention is also used as an indicator showing that the clear visual field range can be secured widely.

The two arrows in area a' are y=−14.0 mm (representative portion of the near portion: area a'1), y=−20.0 mm (representative portion representing the lower portion of the near portion: area a'2), as described with respect to FIG. 3A related to the distribution of the transmission refractive power. The area a'1 and area a'2 are also collectively referred to as the area "a'".

The area surrounded by a circle of symbol b in FIG. 4A corresponds to the area where the maximum transmission astigmatism exists, and a value of transmission astigmatism of an area b is the maximum. Note that the area "b" is an area on the side of the area "a'". The area "b" is an area with an x coordinate whose absolute value is greater than an x coordinate of the area "a'". In addition, the area "b" is also an area that includes the portion of the maximum transmission astigmatism.

Figure 4B:
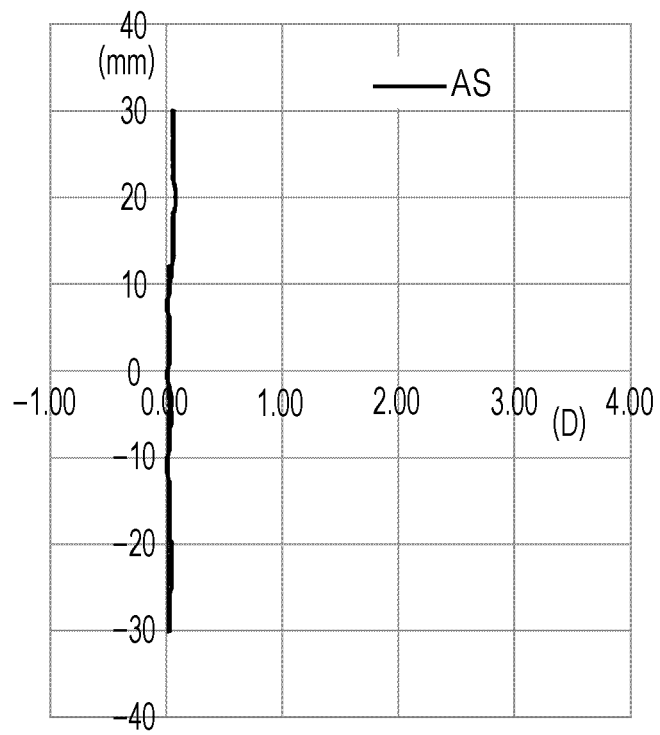
FIG. 4B is a diagram illustrating a change in transmission astigmatism along a meridian corresponding to the conventional progressive addition lens.

FIG. 4B is a diagram illustrating the change in the transmission astigmatism along the meridian corresponding to the conventional progressive addition lens (ADD=3.00 D). The vertical axis indicates the position [mm] in the y direction, and the horizontal axis indicates the transmission astigmatism D. FIG. 4B illustrates that the transmission astigmatism along the meridian is substantially zero corresponding to FIG. 3B.

Figure 4C:
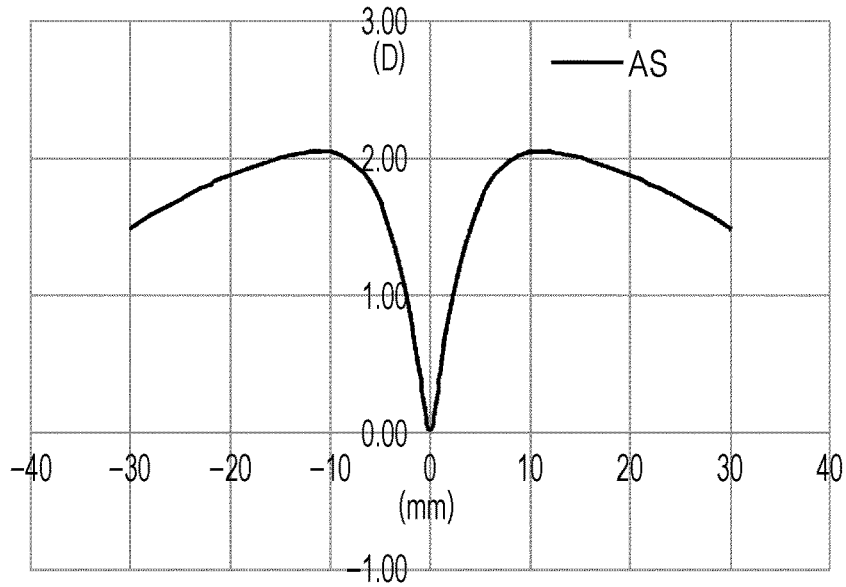
FIG. 4C is a diagram schematically illustrating a change in horizontal transmission astigmatism corresponding to the conventional progressive addition lens (ADD=3.00 D) at y=−4.0 mm.
Figure 4D:
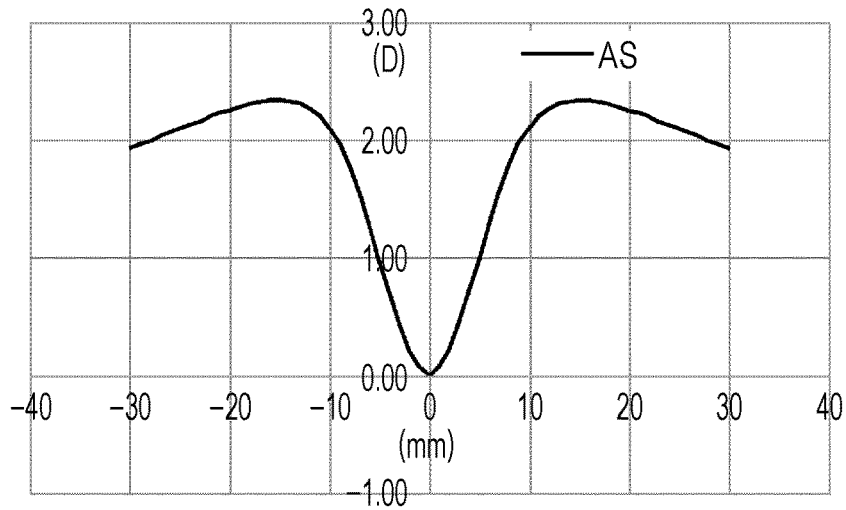
FIG. 4D is a diagram schematically illustrating a change in horizontal transmission astigmatism corresponding to the conventional progressive addition lens (ADD=3.00 D) at y=−14.0 mm.

FIGS. 4C and 4D are diagrams schematically illustrating a change in horizontal transmission astigmatism corresponding to the conventional progressive addition lens (ADD=3.00 D) at y=−4.0 mm and y=−14.0 mm. The vertical axis indicates the transmission astigmatism [D], and the horizontal axis indicates the position [mm] in the x direction.

According to FIGS. 4C and 4D, the value of the transmission astigmatism (x=0.0 mm) along the meridian is almost zero. This is a major difference from the embodiment to be described later, that is, a distribution after adding transmission astigmatism to an intermediate portion and a near portion.

For reference, example of the conventional progressive addition lens set to another addition power is illustrated.

Figure 5A:
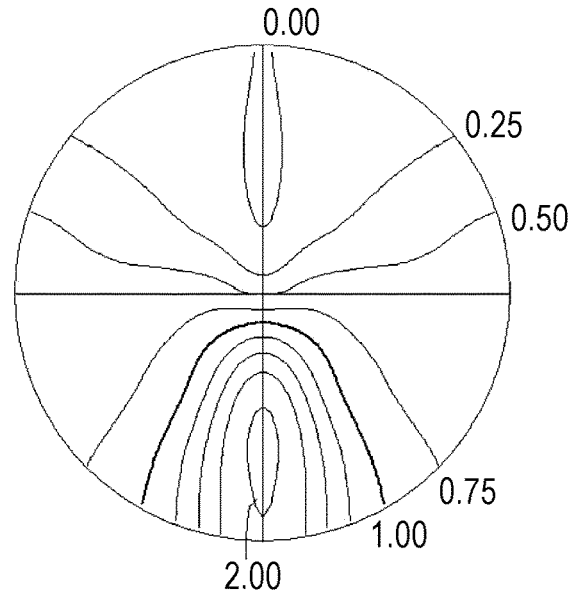
FIG. 5A is a diagram illustrating a distribution of transmission average refractive power corresponding to the conventional progressive addition lens (ADD=2.00 D).

FIG. 5A is a diagram illustrating the distribution of the transmission average refractive power corresponding to the conventional progressive addition lens (ADD=2.00 D).

Figure 5B:
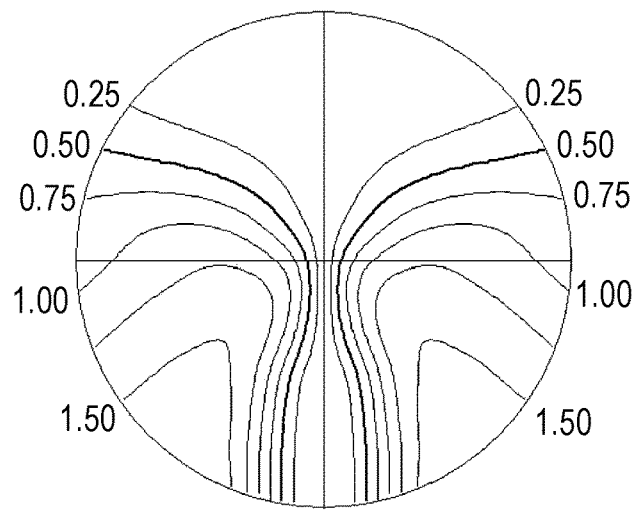
FIG. 5B is a diagram illustrating a distribution of transmission astigmatism corresponding to the conventional progressive addition lens (ADD=2.00 D).

FIG. 5B is a diagram illustrating a distribution of transmission astigmatism corresponding to the conventional progressive addition lens (ADD=2.00 D).

Figure 6A:
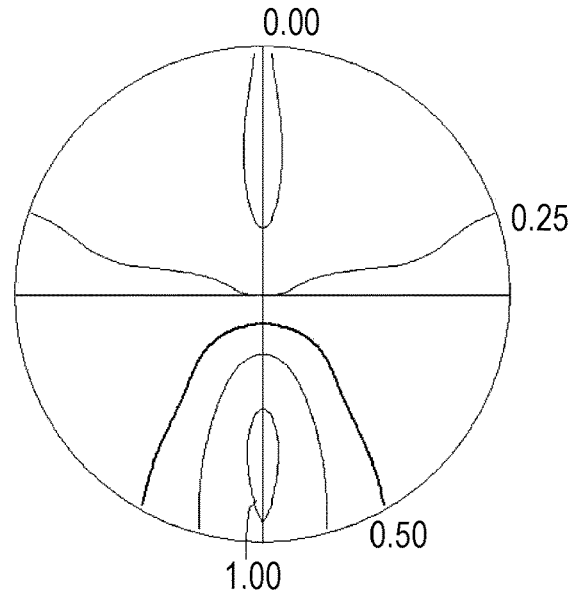
FIG. 6A is a diagram illustrating a distribution of transmission average refractive power corresponding to the conventional progressive addition lens (ADD=1.00 D).

FIG. 6A is a diagram illustrating the distribution of the transmission average refractive power corresponding to the conventional progressive addition lens (ADD=1.00 D).

Figure 6B:
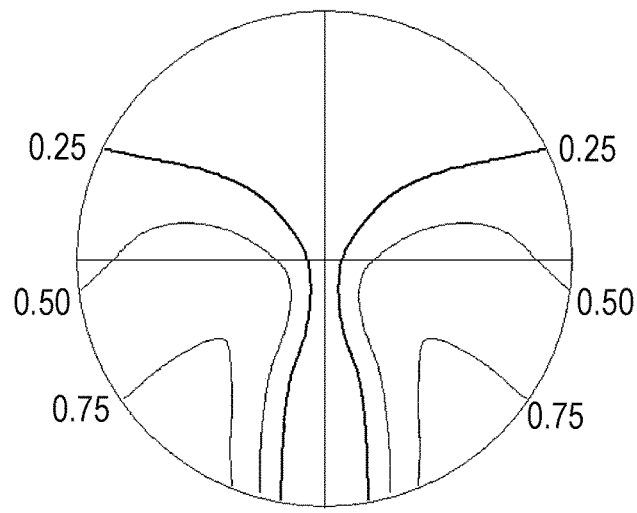
FIG. 6B is a diagram illustrating a distribution of transmission astigmatism corresponding to the conventional progressive addition lens (ADD=1.00 D).

FIG. 6B is a diagram illustrating a distribution of transmission astigmatism corresponding to the conventional progressive addition lens (ADD=1.00 D).

Hereinafter, embodiments of a progressive refractive lens 10 illustrated in FIG. 2 will be described. In the following embodiment, the transmission astigmatism is added to the meridian. Note that for convenience of explanation, contents that overlap with the contents explained in the above (conventional progressive addition lens) column will be omitted.

By the way, in Embodiment 1, as in the conventional progressive addition lens mentioned above, an example having an ADD of 3.00 D is given first. This example is also described as Embodiment 1 (ADD=3.00 D). In addition, examples in which the ADD is 2.00 D and the ADD is 1.00 D is also given, but these examples are also described as Embodiment 1 (ADD=2.00 D) and Embodiment 1 (ADD=1.00 D).

5. Design Method of Progressive Addition Lens According to Embodiment 1

5-1. Progressive Addition Lens Handled in Embodiment 1 (Horizontal Refractive Power >Vertical Refractive Power)

Hereinafter, Embodiment 1 of the present invention will be described. As described in the column of (gist of technical idea of the present invention), astigmatism is emphasized, that is, in order to suppress the increase in astigmatism, Embodiment 1 is set to include a portion where the amount of horizontal refractive power is greater than the amount of vertical refractive power after subtracting the refractive power for astigmatism correction.

FIGS. 7 and 8 are an embodiment of the progressive refractive lens 10 illustrated in FIG. 2, and are diagrams illustrating Embodiment 1 (ADD=3.00 D) in which in the distribution of the transmission astigmatism, the transmission astigmatism is added to the portion corresponding to the near portion and the intermediate portion, and the vertical refractive power is smaller than the horizontal refractive power.

FIGS. 7A to 7D are diagrams illustrating an example of the distribution of the transmission average refractive power in Embodiment 1 (ADD=3.00 D) and an example of the change in the transmission average refractive power and the transmission astigmatism along the vertical and horizontal directions.

FIGS. 8A to 8D are diagrams illustrating an example of the distribution of the transmission astigmatism in Embodiment 1 (ADD=3.00 D) and an example of the change in the transmission average refractive power and the transmission astigmatism along the vertical and horizontal directions.

This will be described below with reference to FIGS. 7 to 8.

Figure 7A:
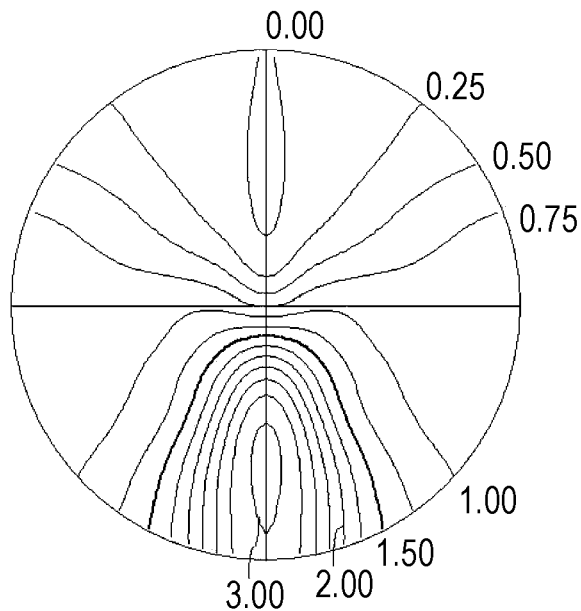
FIG. 7A is a diagram illustrating a distribution of transmission average refractive power corresponding to Embodiment 1 (ADD=3.00 D).

FIG. 7A is a diagram illustrating the distribution of the transmission average refractive power corresponding to Embodiment 1 (ADD=3.00 D). Since the conditions adopted in FIG. 7A are the same as the conditions adopted in the above (conventional progressive addition lens) column, the description will be omitted. Note that the aberration amount of the transmission astigmatism added in Embodiment 1 (ADD=3.00 D) is 0.30 D.

Figure 7B:
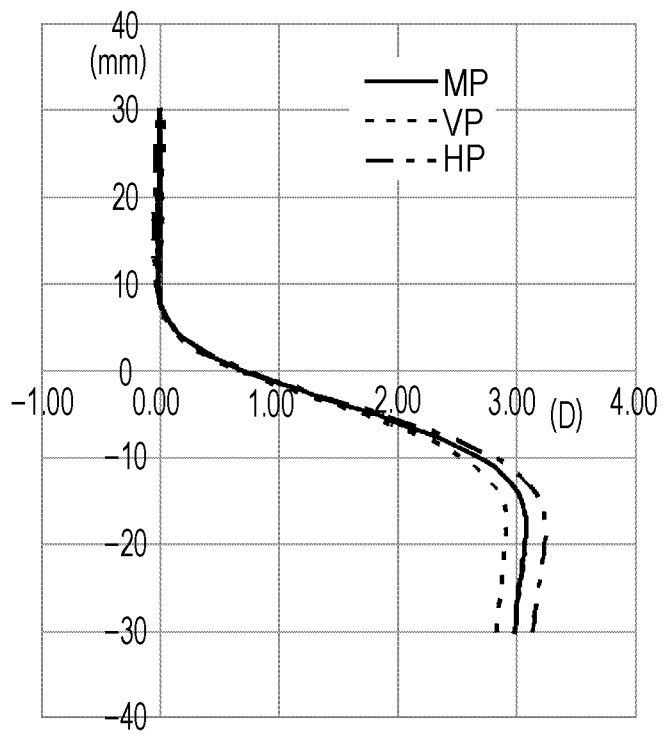
FIG. 7B is a diagram illustrating a change in transmission refractive power in a meridian direction in vertical refractive power (VP), horizontal refractive power (HP), and average refractive power (MP) corresponding to Embodiment 1 (ADD=3.00 D).

FIG. 7B is a diagram illustrating the change in the transmission refractive power along the meridian corresponding to Embodiment 1 (ADD=3.00 D). The vertical axis shows a position [mm] in the y direction, and the horizontal axis shows the average refractive power [D] whose value changes according to the addition power ADD [D].

In FIG. 7B, the average refractive power (MP) rises toward the lower side of the lens. The reason is as follows.

At y=−14.0 mm which is the progressive end point, the difference between the vertical refractive power (HP) and the horizontal refractive power (VP) is set to 0.30 D. In Embodiment 1 (ADD=3.00 D), the horizontal refractive power (VP) is set to be greater than the vertical refractive power (HP), at least on the meridian. Specifically, for the meridian below the progressive start point, the horizontal refractive power increases by 0.15 D, the vertical refractive power decreases by 0.15 D, and the transmission astigmatism is added by 0.30 D. At that time, the average refractive power (MP) increases downward, and the average refractive power is set to be the value of S+ADD (3.00 D in this case) at the measurement reference point N. This setting adds the transmission astigmatism of 0.30 D in the intermediate portion and near portion. The principle of the addition of the transmission astigmatism in Embodiment 1 is as described above even if the additional amount is changed.

Since this astigmatism works in the direction of canceling the intrinsic astigmatism that originally exists in the progressive part, the clear visual field area of the near portion is widened. The reason is as follows.

In the case of the progressive addition lens, the intrinsic astigmatism existing in the progressive portion has a relationship of vertical refractive power >horizontal refractive power because the refractive power increases toward the lower side of the lens.

On the other hand, the transmission astigmatism added in Embodiment 1 (ADD=3.00 D) has a relationship of horizontal refractive power >vertical refractive power.

As a result, the transmission astigmatism added in Embodiment 1 (ADD=3.00 D) cancels the intrinsic astigmatism existing in the progressive portion.

Figure 7C:
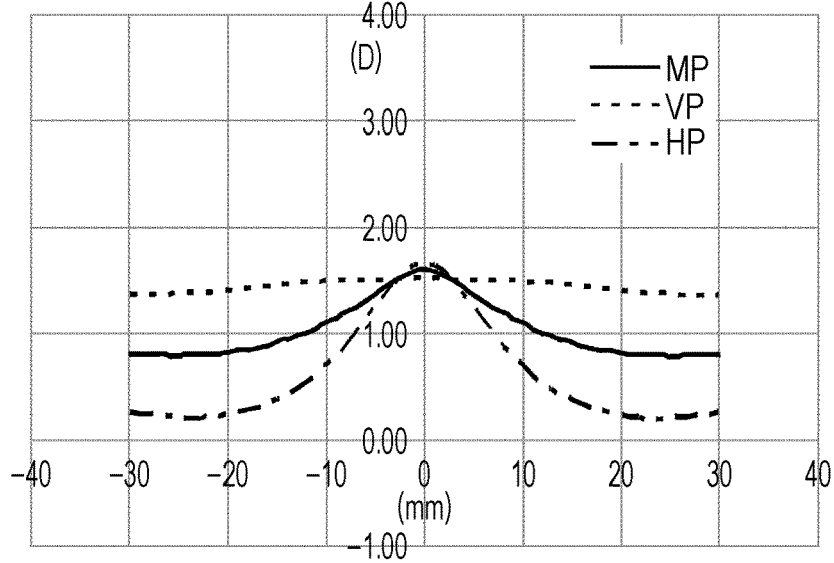
FIG. 7C is a diagram schematically illustrating the changes in the horizontal transmission refractive power, the vertical transmission refractive power, and the transmission average refractive power, which is an average value thereof, corresponding to Embodiment 1 (ADD=3.00 D) at y=−4.0 mm.
Figure 7D:
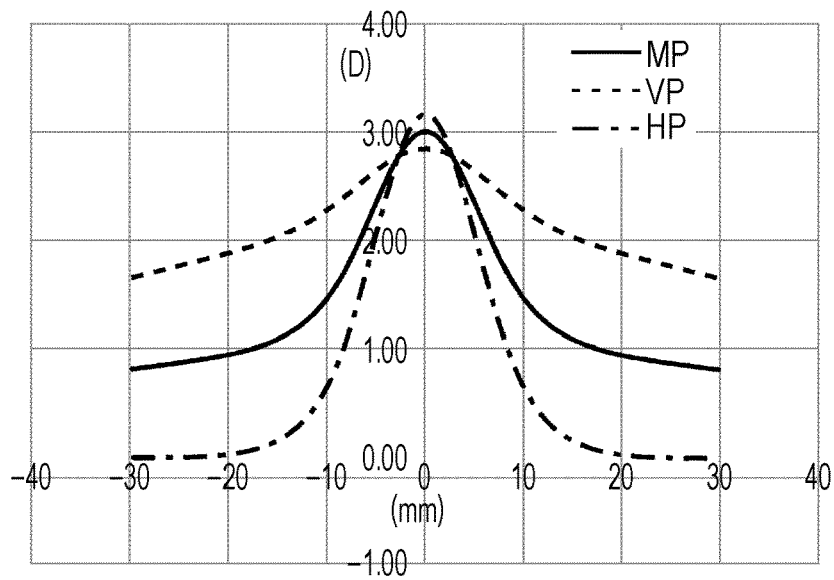
FIG. 7D is a diagram schematically illustrating the changes in the horizontal transmission refractive power, the vertical transmission refractive power, and the transmission average refractive power, which is an average value thereof, corresponding to Embodiment 1 (ADD=3.00 D) at y=−14.0 mm.

FIGS. 7C and 7D are diagrams schematically illustrating the changes in the horizontal transmission refractive power, the vertical transmission refractive power, and an average value thereof in Embodiment 1 (ADD=3.00 D) at y=−4.0 mm and y=−14.0 mm, respectively. The vertical axis shows the refractive power [D], and the horizontal axis shows the position [mm] in the x direction.

In FIGS. 7C and 7D, the vertical refractive power is smaller than the horizontal refractive power in the range from about x=−5.0 mm to x=5.0 mm near the meridian. On the other hand, in the area outside the above range, the vertical refractive power is greater than the horizontal refractive power.

In FIG. 7D, the vertical refractive power decreases toward the surrounding area, so the transmission astigmatism around the near portion decreases. The reduction in the transmission astigmatism will be described later by comparing FIGS. 4A and 8A.

In other words, the transmission astigmatism added is 0.30 D, and when viewed along the meridian in the intermediate portion and the near portion, the vertical refractive power is smaller than the horizontal refractive power. This is the direction in which the distortion peculiar to the progressive surface is eliminated.

Figure 8A:
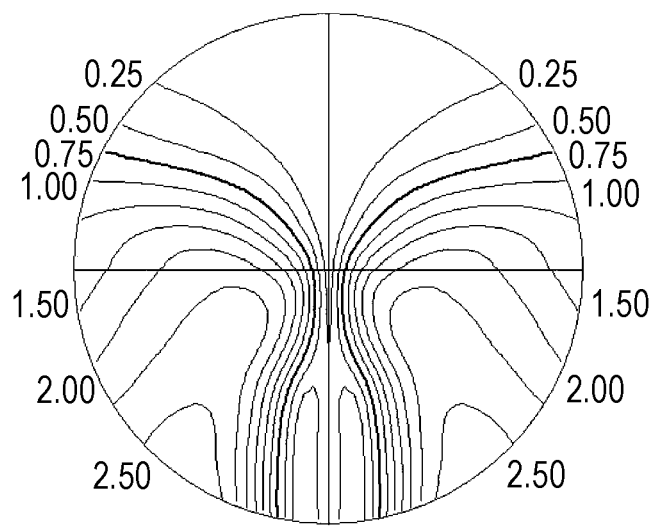
FIG. 8A is a diagram illustrating a distribution of transmission astigmatism corresponding to Embodiment 1 (ADD=3.00 D).

FIG. 8A is a diagram illustrating the distribution of the transmission astigmatism corresponding to Embodiment 1 (ADD=3.00 D).

Figure 8B:
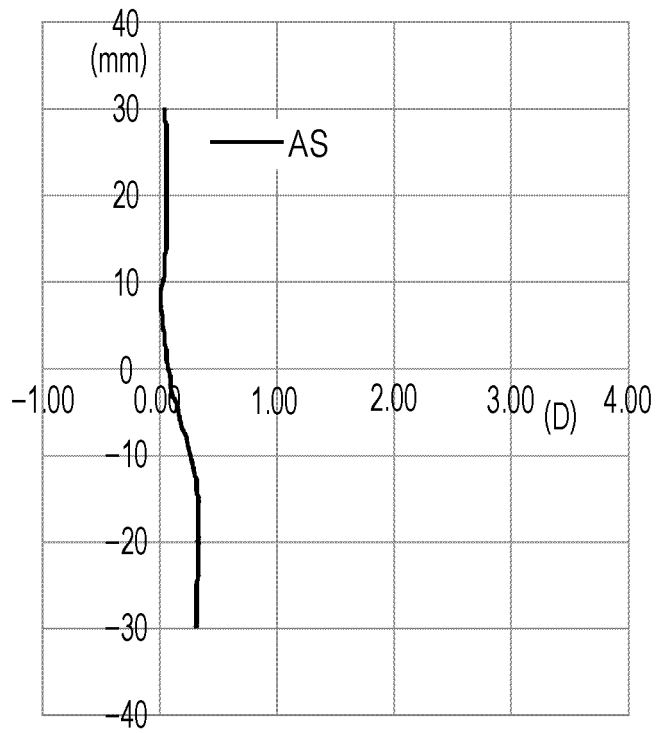
FIG. 8B is a diagram illustrating a change in transmission astigmatism along a meridian corresponding to Embodiment 1 (ADD=3.00 D).

FIG. 8B is a diagram illustrating the change in the transmission astigmatism along the meridian corresponding to Embodiment 1 (ADD=3.00 D). The vertical axis indicates the position [mm] in the y direction, and the horizontal axis indicates the transmission astigmatism (D) transmitted.

FIG. 8B illustrates that the transmission astigmatism of a predetermined amount of 0.30 D is intentionally added along the meridian in the intermediate portion and the near portion. The transmission performance parameter corresponding to the sum of the prescription astigmatism and the predetermined amount of additional astigmatism included in the prescription data is 0.30 D.

Figure 8C:
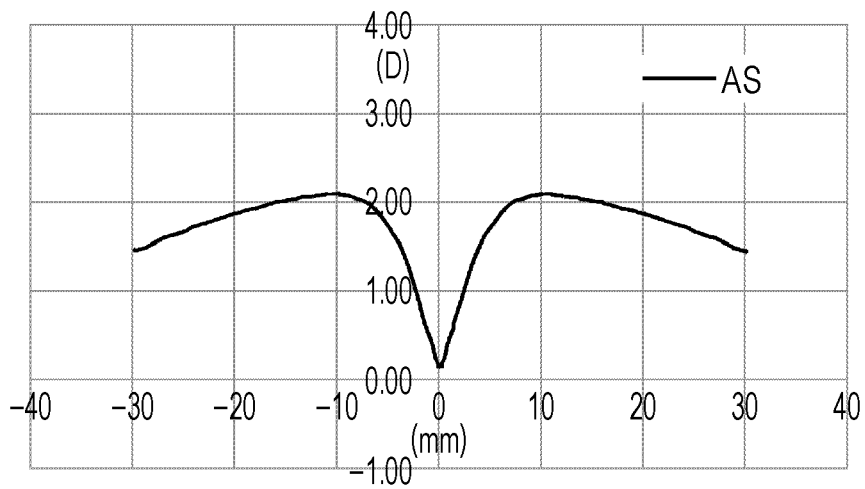
FIG. 8C is a diagram schematically illustrating the change in the transmission astigmatism corresponding to Embodiment 1 (ADD=3.00 D) at y=−4.0 mm.
Figure 8D:
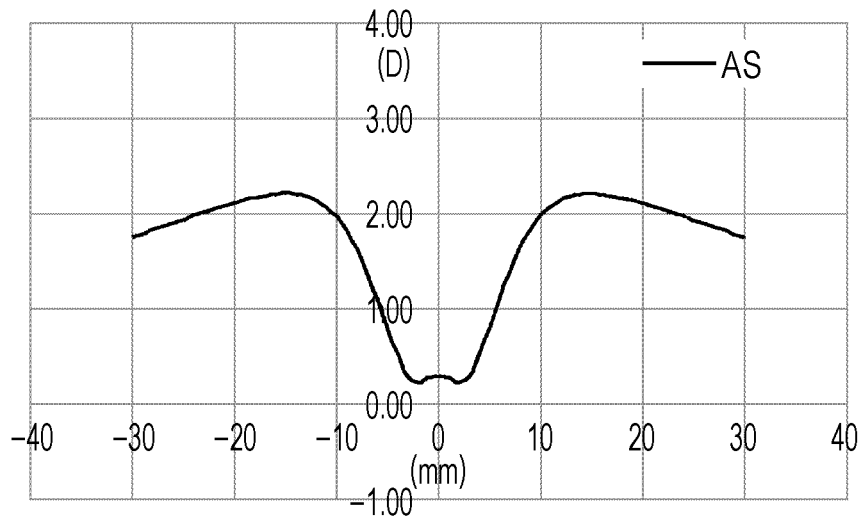
FIG. 8D is a diagram schematically illustrating the change in the transmission astigmatism corresponding to Embodiment 1 (ADD=3.00 D) at y=−14.0 mm.

FIGS. 8C and 8D are diagrams illustrating the change in the transmission astigmatism of Embodiment 1 (ADD=3.00 D) at y=−4.0 mm and y=−14.0 mm, respectively. The vertical axis is the transmission astigmatism [D], and the horizontal axis is the position [mm] in the x direction.

In FIGS. 8C and 8D, the transmission astigmatism of about 0.30 D is added along the meridian. At y=−14.0 mm, where the near portion reference point (N) of the near portion is set, the additional amount of 0.30 D of the transmission astigmatism is reached.

In Embodiment 1 (ADD=3.00 D), the transmission astigmatism is shown to be formed on the side of the eye and added to the portion corresponding to the near portion and the intermediate portion. Further, in one example, the vertical refractive power is smaller than the horizontal refractive power in the portion corresponding to one point of the near portion. In another example, in the meridian (or main line of sight) of the intermediate portion and near portion, the vertical refractive power is smaller than the horizontal refractive power. In other words, the transmission astigmatism is added so that the vertical refractive power is smaller than the horizontal refractive power, thereby providing the transmission astigmatism to the eye.

By adding the transmission astigmatism in this way, of course, the transmission astigmatism increases at a meridian and a measurement reference point N. However, a sharp change in transmission astigmatism is within the entire intermediate portion and near portion. As a result, a clear visual field range in which the transmission astigmatism is 0.50 D or less (after subtracting the refractive power for astigmatism correction) can be obtained.

The distribution of the transmission average refractive power and the distribution of the transmission astigmatism other than Embodiment 1 (ADD=3.00 D) are as follows. Next, the transmission astigmatism added is 0.20 D in Embodiment 1 (ADD=2.00 D) and 0.10 D in Embodiment 1 (ADD=1.00 D).

That is, in Embodiment 1, the additional amount of the transmission astigmatism is 0.10 times that of the ADD.

Figure 9A:
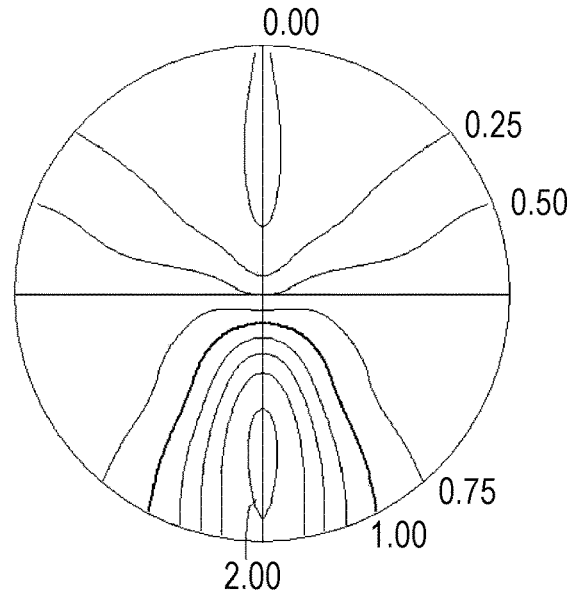
FIG. 9A is a diagram illustrating a distribution of transmission average refractive power corresponding to Embodiment 1 (ADD=2.00 D).

FIG. 9A is a diagram illustrating the distribution of the transmission average refractive power corresponding to Embodiment 1 (ADD=2.00 D).

Figure 9B:
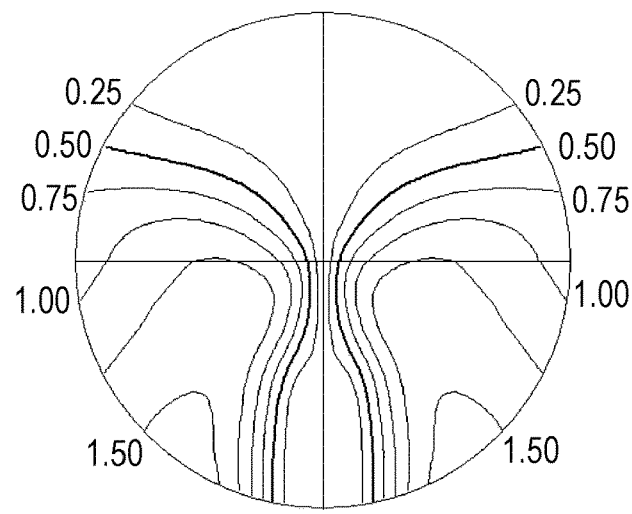
FIG. 9B is a diagram illustrating a distribution of transmission astigmatism corresponding to Embodiment 1 (ADD=2.00 D).

FIG. 9B is a diagram illustrating the distribution of the transmission astigmatism corresponding to Embodiment 1 (ADD=2.00 D).

Figure 10A:
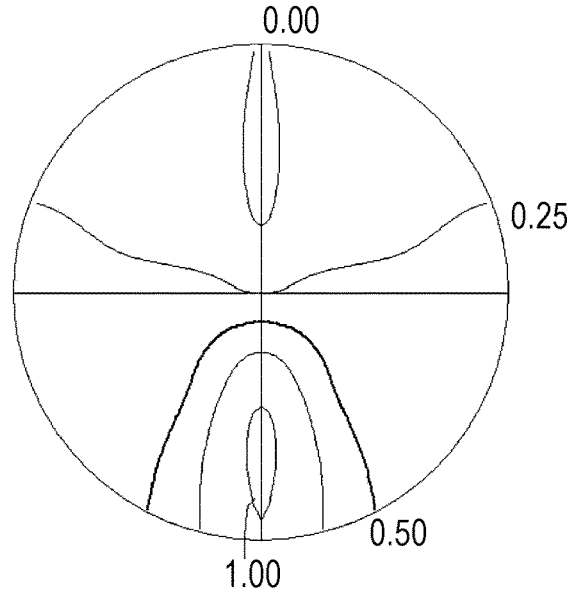
FIG. 10A is a diagram illustrating a distribution of transmission average refractive power corresponding to Embodiment 1 (ADD=1.00 D).

FIG. 10A is a diagram illustrating the distribution of the transmission average refractive power corresponding to Embodiment 1 (ADD=1.00 D).

Figure 10B:
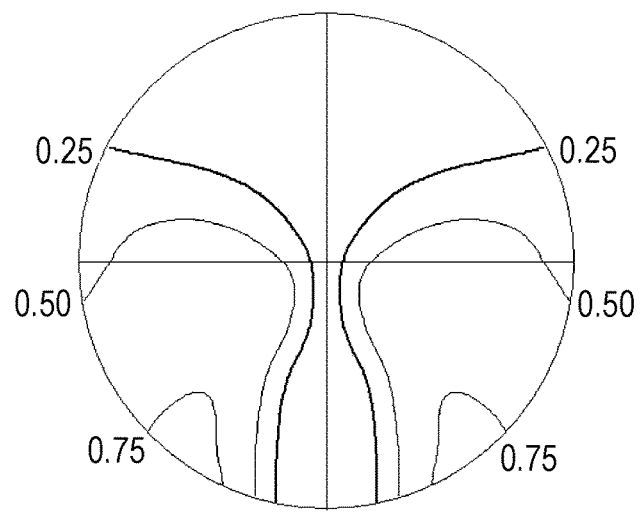
FIG. 10B is a diagram illustrating a distribution of transmission astigmatism corresponding to Embodiment 1 (ADD=1.00 D).

FIG. 10B is a diagram illustrating the distribution of the transmission astigmatism corresponding to Embodiment 1 (ADD=1.00 D).

Table 1 below shows the actual measurement results of the length of the area "a'" in the distribution of the transmission intrinsic astigmatism and the maximum value [D] of the astigmatism of the area "b", between the spectacle lens of Embodiment 1 and the conventional spectacle lens. Although the area "b" is not illustrated in FIG. 8A and the like, this area "b" is located in substantially the same portion as area "b" illustrated in FIG. 4A.

TABLE 1

| | | Conventional Example (Lens before addition of aberration) | Embodiment 1 |
|---|---|---|---|
| ADD = 3.00 D | Area a'1 Width of (y = −14.0 mm) | 8.30 mm | 9.56 mm |
| | Area a'2 Width of (y = −20.0 mm) | 9.96 mm | 11.70 mm |
| | Maximum value of area b | 2.58 D | 2.41 D |
| ADD = 2.00 D | Area a'1 Width of (y = −14.0 mm) | 8.30 mm | 9.56 mm |
| | Area a'2 Width of (y = −20.0 mm) | 10.00 mm | 11.74 mm |
| | Maximum value of area b | 1.72 D | 1.60 D |
| ADD = 1.00 D | Area a'1 Width of (y = −14.0 mm) | 8.30 mm | 9.54 mm |
| | Area a'2 Width of (y = −20.0 mm) | 10.00 mm | 11.76 mm |
| | Maximum value of area b | 0.86 D | 0.80 D |

As can be seen from Table 1, it can be seen that the length of the area "a'" of Embodiment 1 is longer than the length of the conventional example regardless of the magnitude of the addition power ADD, and Embodiment 1 has a clearer visual field range as compared with the conventional example.

Further, it can be seen that the value of the intrinsic astigmatism in the area "b" surrounded by a circle of Embodiment 1 is lower than the value of intrinsic astigmatism in the area "b" surrounded by a circle of the conventional example, regardless of the magnitude of the addition power ADD, and the intrinsic astigmatism on the side portion is suppressed.

Therefore, by adding the transmission astigmatism to the distribution of the transmission intrinsic astigmatism of the conventional example, the progressive addition lens can suppress the blurring, shaking feeling, and the like that the wearer conventionally felt.

The above are the characteristics of the progressive addition lens (Embodiment 1) handled by the design method according to one aspect of the present invention.

Then, the results when the design method according to one aspect of the present invention is applied will be described below.

5-2. Before and after Lens Change, Comparison when Amount of Transmission Astigmatism Added is within Predetermined Range (Embodiment 1 and Embodiment 1a in which Aberration Amount is Slightly Changed) and when Amount of Transmission Astigmatism Added is not within Predetermined Range (Reference Embodiment 1)

Here, Embodiment 1a in which the aberration amount (0.30 D) is slightly changed from Embodiment 1 will be described. In Embodiment 1a, the amount of transmission astigmatism added changes according to the ADD.

When the ADD is 3.00 D, the additional amount of the transmission astigmatism is 0.50 D.

When the ADD is 2.00 D, the additional amount of the transmission astigmatism is 0.33 D.

When the ADD is 1.00 D, the additional amount of the transmission astigmatism is 0.17 D.

That is, in Embodiment 1a, the additional amount of the transmission astigmatism is about ⅙ times (about 0.17 times) that of ADD.

Figure 11A:
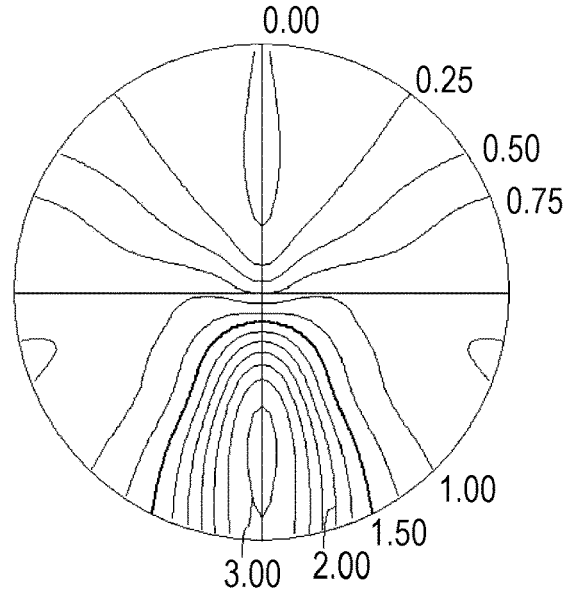
FIG. 11A is a diagram illustrating a distribution of transmission average refractive power corresponding to Embodiment 1a (ADD=3.00 D).

FIG. 11A is a diagram illustrating the distribution of the transmission average refractive power corresponding to Embodiment 1a (ADD=3.00 D).

Figure 11B:
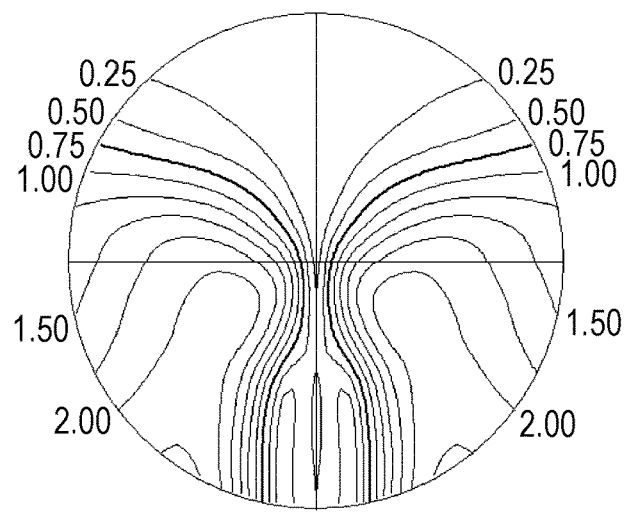
FIG. 11B is a diagram illustrating a distribution of transmission astigmatism corresponding to Embodiment 1a (ADD=3.00 D).

FIG. 11B is a diagram illustrating the distribution of the transmission astigmatism corresponding to Embodiment 1a (ADD=3.00 D).

Figure 12A:
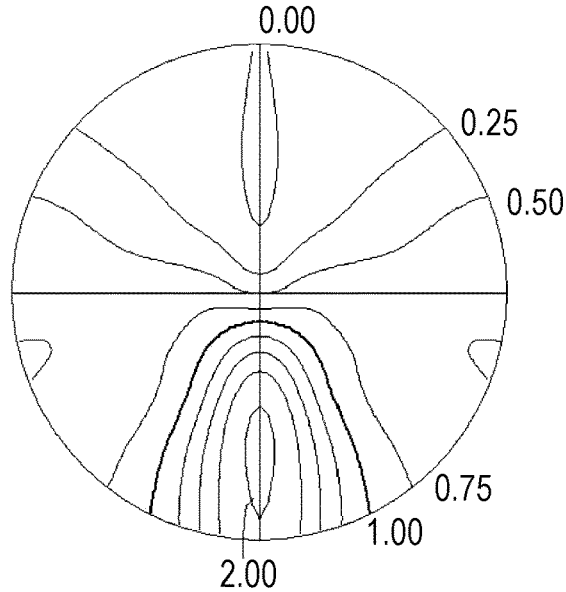
FIG. 12A is a diagram illustrating a distribution of transmission average refractive power corresponding to Embodiment 1a (ADD=2.00 D).

FIG. 12A is a diagram illustrating the distribution of the transmission average refractive power corresponding to Embodiment 1a (ADD=2.00 D).

Figure 12B:
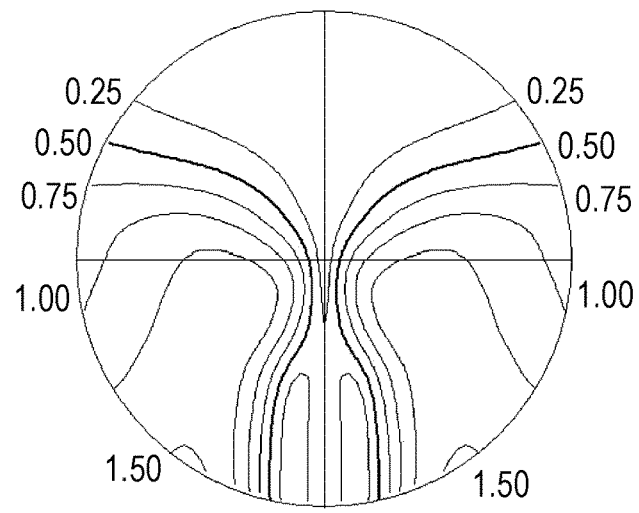
FIG. 12B is a diagram illustrating a distribution of transmission astigmatism corresponding to Embodiment 1a (ADD=2.00 D).

FIG. 12B is a diagram illustrating the distribution of the transmission astigmatism corresponding to Embodiment 1a (ADD=2.00 D).

Figure 13A:
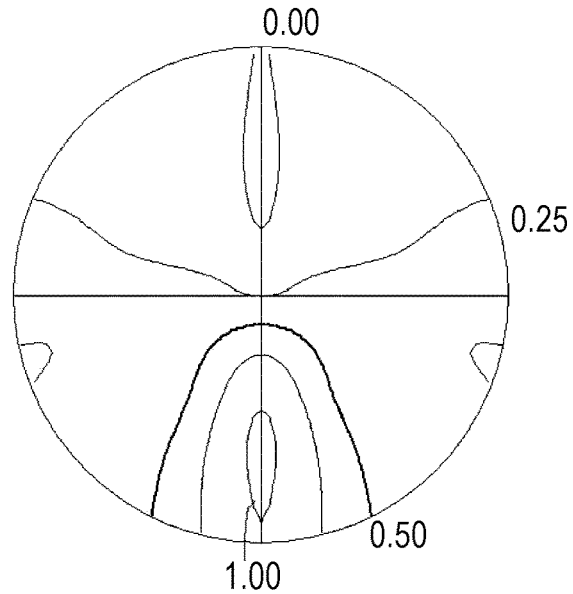
FIG. 13A is a diagram illustrating a distribution of transmission average refractive power corresponding to Embodiment 1a (ADD=1.00 D).

FIG. 13A is a diagram illustrating the distribution of the transmission average refractive power corresponding to Embodiment 1a (ADD=1.00 D).

Figure 13B:
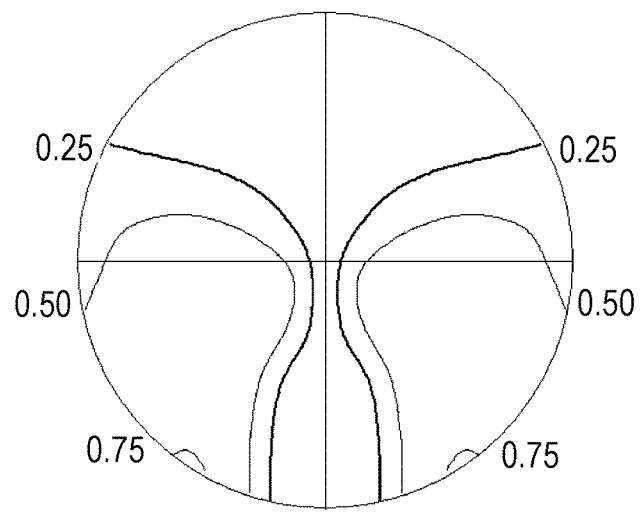
FIG. 13B is a diagram illustrating a distribution of transmission astigmatism corresponding to Embodiment 1a (ADD=1.00 D).

FIG. 13B is a diagram illustrating the distribution of the transmission astigmatism corresponding to Embodiment 1a (ADD=1.00 D).

In order to compare the case where the amount of transmission astigmatism added is within the predetermined range (Embodiment 1 and Embodiment 1a in which the aberration amount is slightly changed), the case where the amount of transmission astigmatism added is outside the predetermined range is described as reference Embodiment 1.

As described in (5-1. Progressive addition lens handled in Embodiment 1 (horizontal refractive power >vertical refractive power)), the progressive addition lens itself handled by Embodiment 1 is very characteristic and not known. Therefore, since the amount of transmission astigmatism added is out of the predetermined range while making a clear distinction from the conventional technique, this contrast example is referred to as a reference embodiment.

Figure 14A:
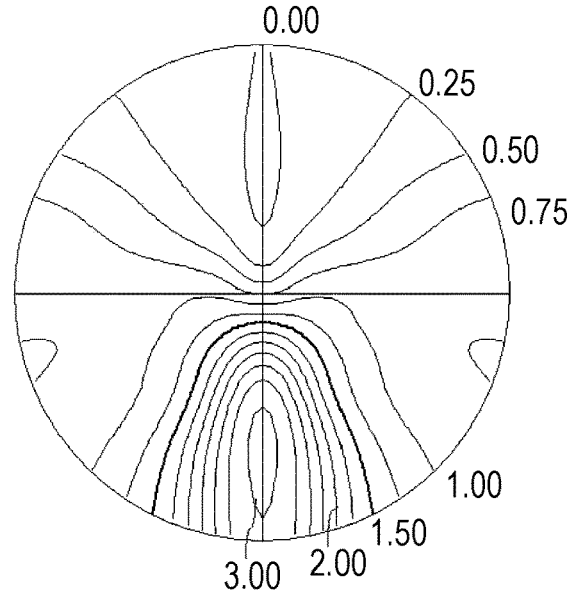
FIG. 14A is a diagram illustrating a distribution of transmission average refractive power corresponding to reference Embodiment 1 (ADD=3.00 D).

FIG. 14A is a diagram illustrating the distribution of the transmission average refractive power corresponding to reference Embodiment 1 (ADD=3.00 D).

Figure 14B:
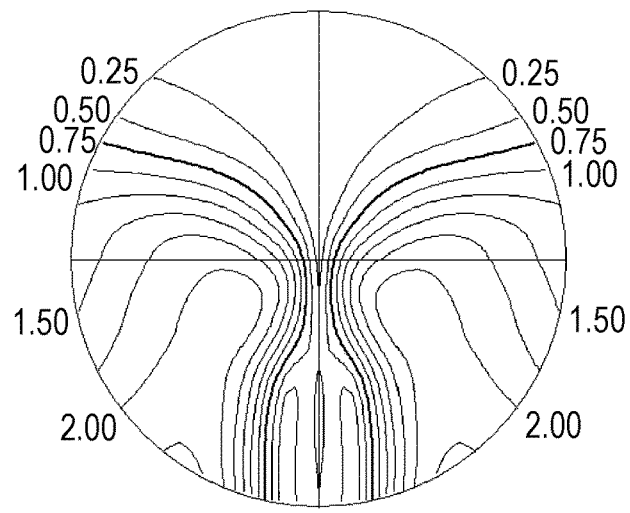
FIG. 14B is a diagram illustrating a distribution of transmission astigmatism corresponding to reference Embodiment 1 (ADD=3.00 D).

FIG. 14B is a diagram illustrating the distribution of the transmission astigmatism corresponding to reference Embodiment 1 (ADD=3.00 D).

Figure 15A:
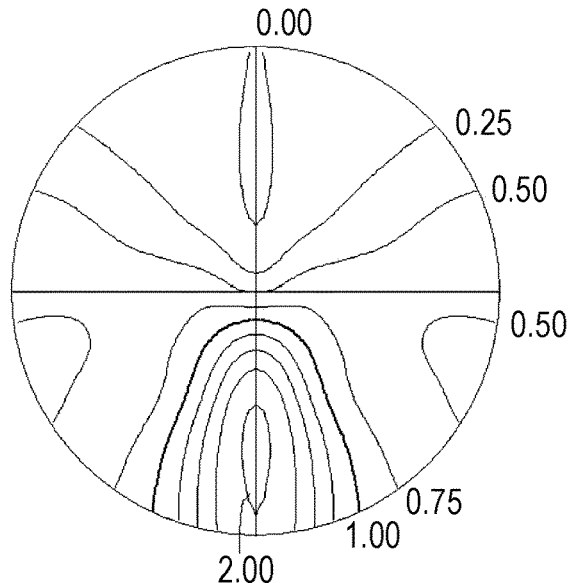
FIG. 15A is a diagram illustrating a distribution of transmission average refractive power corresponding to reference Embodiment 1 (ADD=2.00 D).

FIG. 15A is a diagram illustrating the distribution of the transmission average refractive power corresponding to reference Embodiment 1 (ADD=2.00 D).

Figure 15B:
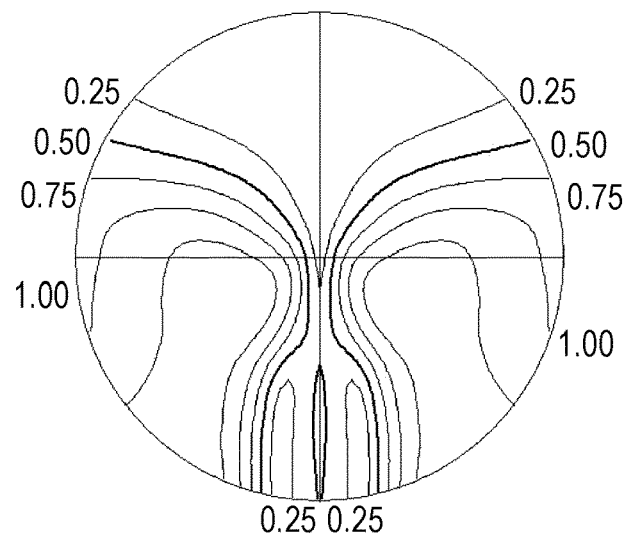
FIG. 15B is a diagram illustrating a distribution of transmission astigmatism corresponding to reference Embodiment 1 (ADD=2.00 D).

FIG. 15B is a diagram illustrating the distribution of the transmission astigmatism corresponding to reference Embodiment 1 (ADD=2.00 D).

Figure 16A:
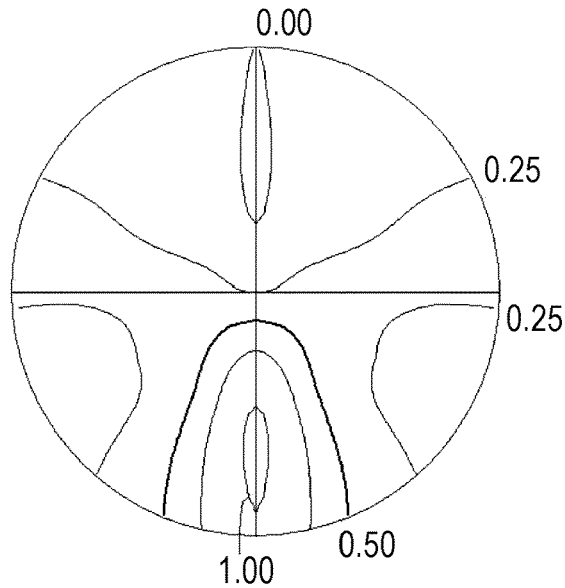
FIG. 16A is a diagram illustrating a distribution of transmission average refractive power corresponding to reference Embodiment 1 (ADD=1.00 D).

FIG. 16A is a diagram illustrating the distribution of the transmission average refractive power corresponding to reference Embodiment 1 (ADD=1.00 D).

Figure 16B:
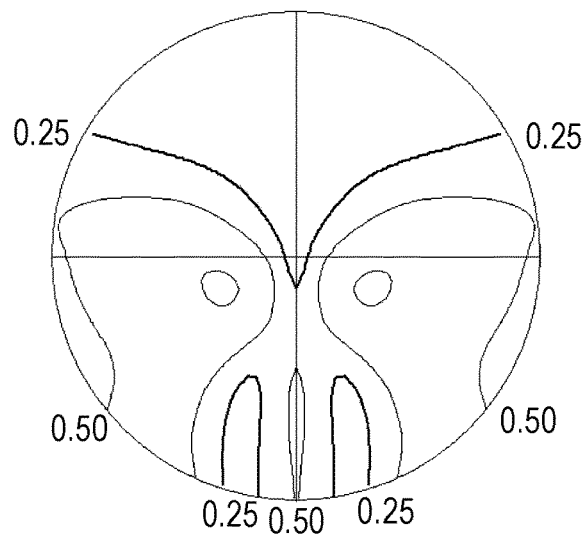
FIG. 16B is a diagram illustrating a distribution of transmission astigmatism corresponding to reference Embodiment 1 (ADD=1.00 D).

FIG. 16B is a diagram illustrating the distribution of the transmission astigmatism corresponding to reference Embodiment 1 (ADD=1.00 D).

Table 2 below summarizes the distances of the arrows "A" and "B" in each ADD in Embodiment 1, Embodiment 1a, and reference Embodiment 1.

TABLE 2

|  |  | Conventional Example (Lens before addition of aberration) | Embodiment 1 | Embodiment 1a | Reference Embodiment 1 |
|---|---|---|---|---|---|
| ADD = 3.00 D | Area A Width [mm] of (y = −14.0 mm) | 20.88 | 19.62 | 18.92 | 18.92 |
|  | Area B Width [mm] of (y = −20.0 mm) | 26.34 | 24.70 | 23.78 | 23.78 |
| ADD = 2.00 D | Area A Width [mm] of (y = −14.0 mm) | 20.92 | 19.66 | 18.94 | 18.18 |
|  | Area B Width [mm] of (y = −20.0 mm) | 26.38 | 24.72 | 23.80 | 22.78 |
| ADD = 1.00 D | Area A Width [mm] of (y = −14.0 mm) | 20.94 | 19.66 | 18.96 | 16.36 |
|  | Area B Width [mm] of (y = −20.0 mm) | 26.40 | 24.72 | 23.78 | 20.46 |

Then, it was investigated how much the distance changed from the distance of the arrow "A" when the ADD was 3.00 D to the distance of the arrow "A" when the ADD was 2.00 D. In other words, it was investigated how much the distance of the arrow "A" when ADD is 3.00 D and the arrow "A" when ADD is 2.00 D match. The same contents were also investigated for the arrow "B". Table 3 below summarizes these results.

TABLE 3

|  |  | Embodiment 1 | Embodiment 1a | Reference Embodiment 1 |
|---|---|---|---|---|
| ADD 3.00 D → 2.00 D | Area A Match rate [%] of (y = −14.0 mm) | 100.20 | 100.11 | 96.09 |
|  | Area B Match rate [%] of (y = −20.0 mm) | 100.08 | 100.08 | 95.79 |
| ADD 2.00 D → 1.00 D | Area A Match rate [%] of (y = −14.0 mm) | 100.00 | 100.11 | 89.99 |
|  | Area B Match rate [%] of (y = −20.0 mm) | 100.00 | 99.92 | 89.82 |
| ADD 3.00 D → 1.00 D | Area A Match rate [%] of (y = −14.0 mm) | 100.20 | 100.21 | 86.47 |
|  | Area B Match rate [%] of (y = −20.0 mm) | 100.08 | 100.00 | 86.04 |

As shown in Table 3, in Embodiment 1 and Embodiment 1a, it can be seen that the aberration amount $\Delta_\beta[D]$ is set so that a match rate of a horizontal width of area A where the transmission average refractive power is equal to or more than half a value of near power and y=−14.0 mm is 97 to 103% (specifically, 99 to 101%), and a match rate of a horizontal width of area B where the transmission average refractive power is equal to or more than half the value of the near power and y=−20.0 mm is 97 to 103% (specifically, 99 to 101%).

Table 4 below summarizes the distances of the areas "a'1" and "a'2" in each ADD in Embodiment 1, Embodiment 1a, and reference Embodiment 1.

TABLE 4

|  |  | Conventional Example (Lens before addition of aberration) | Embodiment 1 | Embodiment 1a | Reference Embodiment 1 |
|---|---|---|---|---|---|
| ADD = 3.00 D | Area a'1 Width [mm] of (y = −14.0 mm) | 8.30 | 9.56 | 10.20 | 10.20 |
|  | Area a'2 Width [mm] of (y = −20.0 mm) | 9.96 | 11.70 | 12.74 | 12.74 |
| ADD = 2.00 D | Area a'1 Width [mm] of (y = −14.0 mm) | 8.30 | 9.56 | 10.20 | 10.80 |
|  | Area a'2 Width [mm] of (y = −20.0 mm) | 10.00 | 11.74 | 12.78 | 14.00 |
| ADD = 1.00 D | Area a'1 Width [mm] of (y = −14.0 mm) | 8.30 | 9.54 | 10.20 | No measurement |
|  | Area a'2 Width [mm] of (y = −20.0 mm) | 10.00 | 11.76 | 12.82 | 17.38 |

Then, it was investigated how much the distance changed from the distance of the area "a'1" when the ADD was 3.00 D to the distance of the area "a'1" when the ADD was 2.00 D. In other words, it was investigated how much the distance of the area "a'1" when ADD is 3.00 D and the area "a'1" when ADD is 2.00 D match. In addition, the same contents were also investigated for the area "a'2". Table 5 below summarizes these results.

TABLE 5

|  |  | Embodiment 1 | Embodiment 1a | Reference Embodiment 1 |
|---|---|---|---|---|
| ADD 3.00 D → 2.00 D | Area a'1 Match rate [%] of (y = −14.0 mm) | 100.00 | 100.00 | 105.88 |
|  | Area a'2 Match rate [%] of (y = −20.0 mm) | 100.34 | 100.31 | 109.89 |
| ADD 2.00 D → 1.00 D | Area a'1 Match rate [%] of (y = −14.0 mm) | 99.79 | 100.00 | No measurement |
|  | Area a'2 Match rate [%] of (y = −20.0 mm) | 100.17 | 100.31 | 124.14 |
| ADD 3.00 D → 1.00 D | Area a'1 Match rate [%] of (y = −14.0 mm) | 99.79 | 100.00 | No measurement |
|  | Area a'2 Match rate [%] of (y = −20.0 mm) | 100.51 | 100.63 | 136.42 |

As shown in Table 5, in Embodiment 1 and Embodiment 1a,

It can be seen that the aberration amount $\Delta_\beta[D]$ is set so that a match rate of a horizontal width of area a'1 where the transmission astigmatism is ADD/4 or less and y=−14.0 mm is 97 to 103% (specifically, 99 to 101%), and a match rate of a horizontal width of area a'2 where the transmission astigmatism is ADD/4 or less and y=−20.0 mm is 97 to 103% (specifically, 99 to 101%).

As described above, in the design method of a progressive addition lens according to one aspect of the present invention, the change in the transmission distribution with respect to the change in the ADD is smaller than that in reference Embodiment 1. For this reason, it is possible to make it difficult to feel the change in blurring, shaking, distortion, and the like due to the change in the spectacle lens accompanying the change in parameters represented by the ADD.

6. Design Method of Progressive Addition Lens of Embodiment 2

6-1. Progressive Addition Lens Handled in Embodiment 2 (Vertical Refractive Power >Horizontal Refractive Power)

Hereinafter, a progressive addition lens handled in Embodiment 2 of the present invention will be described. As described in the column of (gist of technical idea of the present invention), in Embodiment 2, an error in average refractive power is emphasized, that is, in order to suppress an increase in an error in average refractive power, Embodiment 2 is set to include a portion where an amount of vertical refractive power is greater than an amount of horizontal refractive power after subtracting refractive power for astigmatism correction.

Hereinafter, for convenience of explanation, the description of the same contents as [5. Design method of progressive addition lens according to Embodiment 1] will be omitted.

Note that an aberration amount of transmission astigmatism added in Embodiment 2 (ADD=3.00 D) is −0.375 D.

In the figure related to Embodiment 2, the additional amount of the transmission astigmatism is described as a minus, but this is because a vertical-horizontal relationship between maximum astigmatism and minimum astigmatism, which is the basis of the transmission astigmatism added in Embodiment 1, is reversed. However, since the transmission astigmatism is expressed by the maximum astigmatism-minimum astigmatism, the value is described herein as an absolute value.

In Embodiment 2 (ADD=3.00 D), in contrast to Embodiment 1, the vertical refractive power (HP) is set to be greater than the horizontal refractive power (VP), at least on the meridian. Specifically, for the meridian below the progressive start point, the vertical refractive power increases by 0.188 D, the horizontal refractive power decreases by 0.188 D, and the transmission astigmatism is added by 0.375 D. At that time, the average refractive power (MP) increases downward, and the average refractive power is set to be the value of S+ADD (3.00 D in this case) at the measurement reference point N. This setting adds the transmission astigmatism of 0.375 D in the intermediate portion and near portion. The principle of the addition of the transmission astigmatism in Embodiment 2 is as described above even if the additional amount is changed.

FIGS. 17 and 18 are an embodiment of the progressive refractive lens 10 illustrated in FIG. 2, and are diagrams illustrating Embodiment 2 (ADD=3.00 D) in which in the distribution of the transmission astigmatism, the transmission astigmatism is added to the portion corresponding to the near portion and the intermediate portion, and the horizontal refractive power is smaller than the vertical refractive power.

FIGS. 17A to 17D are diagrams illustrating an example of the distribution of the transmission average refractive power in Embodiment 2 (ADD=3.00 D) and an example of the change in the transmission average refractive power and the transmission astigmatism along the vertical and horizontal directions.

FIGS. 18A to 18D are diagrams illustrating an example of the distribution of the transmission astigmatism in Embodiment 2 (ADD=3.00 D) and an example of the change in the transmission average refractive power and the transmission astigmatism along the vertical and horizontal directions.

This will be described below with reference to FIGS. 17 to 18.

Figure 17A:
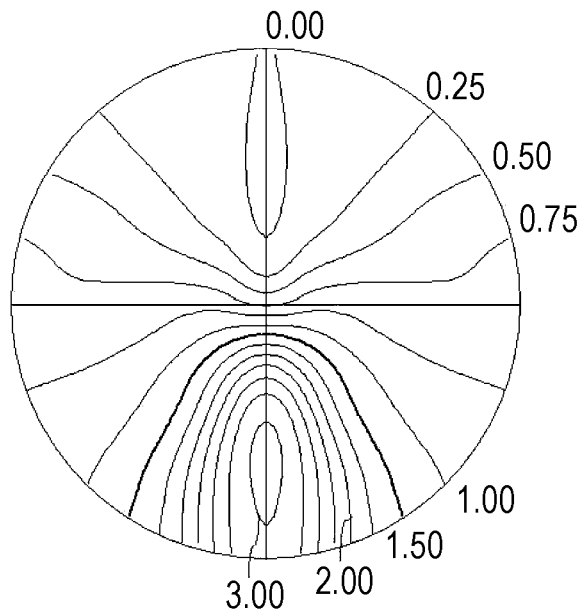
FIG. 17A is a diagram illustrating a distribution of transmission average refractive power corresponding to Embodiment 2 (ADD=3.00 D).

FIG. 17A is a diagram illustrating the distribution of the transmission average refractive power corresponding to Embodiment 2 (ADD=3.00 D). Since the conditions adopted in FIG. 17A are the same as the conditions adopted in the above (conventional progressive addition lens) column, the description will be omitted.

Figure 17B:
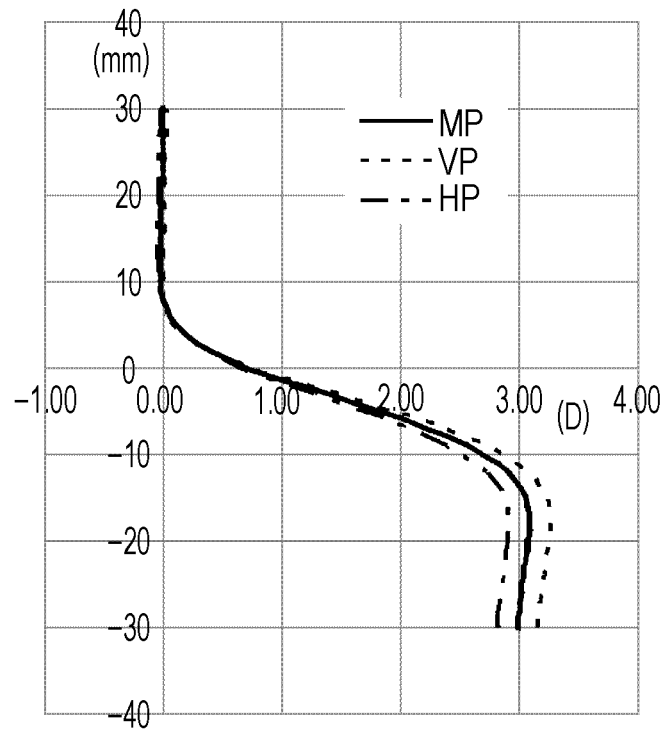
FIG. 17B is a diagram illustrating a change in transmission refractive power in a meridian direction in vertical refractive power (VP), horizontal refractive power (HP), and average refractive power (MP) corresponding to Embodiment 2 (ADD=3.00 D).

FIG. 17B is a diagram illustrating the change in the transmission refractive power along the meridian corresponding to Embodiment 2 (ADD=3.00 D). FIG. 17B is a diagram illustrating that the vertical axis shows a position [mm] in the y direction, and the horizontal axis shows the average refractive power [D] whose value changes according to the addition power ADD [D].

Figure 17C:
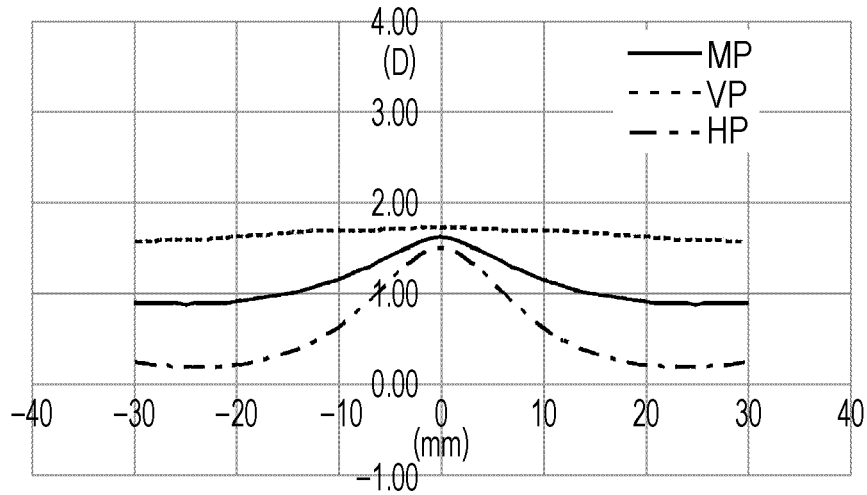
FIG. 17C is a diagram schematically illustrating the changes in the horizontal transmission refractive power, the vertical transmission refractive power, and the transmission average refractive power, which is an average value thereof, corresponding to Embodiment 2 (ADD=3.00 D) at y=−4.0 mm.
Figure 17D:
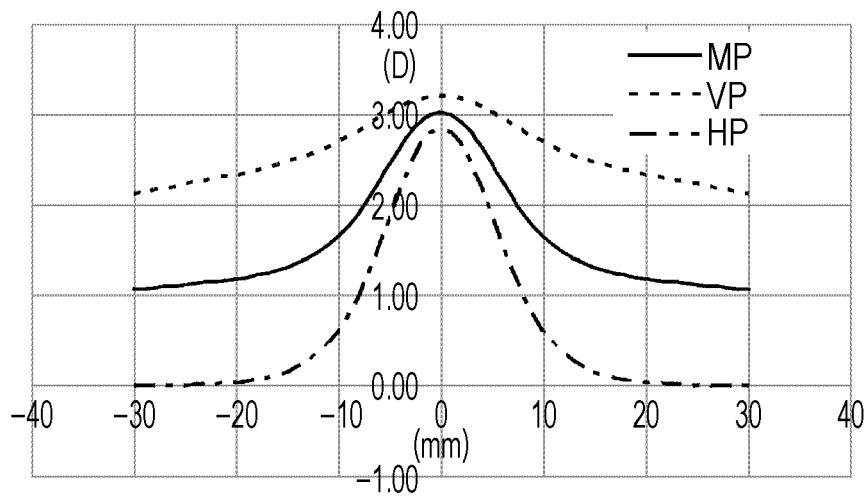
FIG. 17D is a diagram schematically illustrating the changes in the horizontal transmission refractive power, the vertical transmission refractive power, and the transmission average refractive power, which is an average value thereof, corresponding to Embodiment 2 (ADD=3.00 D) at y=−14.0 mm.

FIGS. 17C and 17D are diagrams schematically illustrating the changes in the horizontal transmission refractive power, the vertical transmission refractive power, and the transmission average refractive power, which is an average value thereof, at y=−4.0 mm and y=−14.0 mm, respectively. The vertical axis shows the refractive power [D], and the horizontal axis shows the position [mm] in the x direction.

Figure 18A:
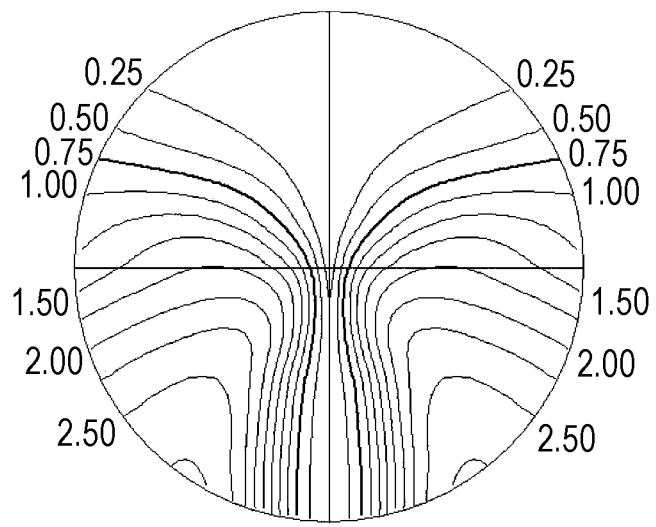
FIG. 18A is a diagram illustrating a distribution of transmission astigmatism corresponding to Embodiment 2 (ADD=3.00 D).

FIG. 18A is a diagram illustrating the distribution of the transmission astigmatism corresponding to Embodiment 2 (ADD=3.00 D).

Figure 18B:
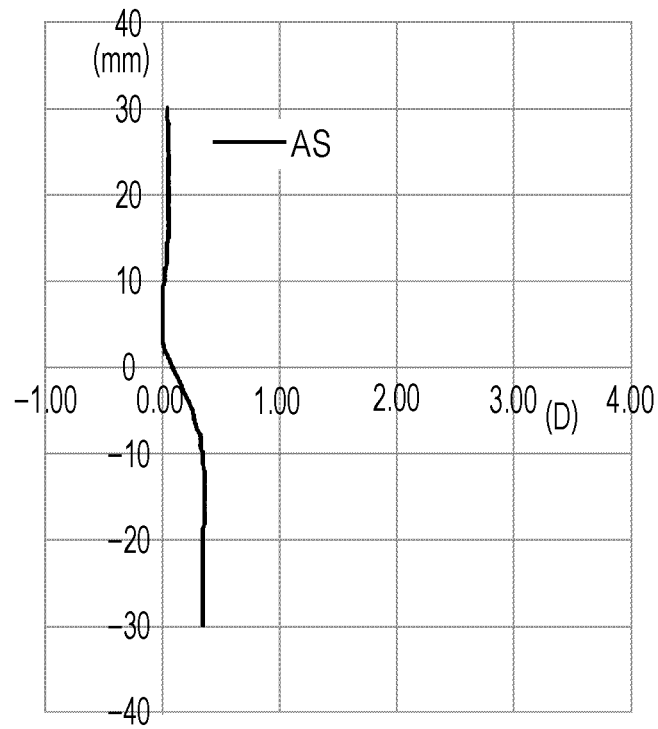
FIG. 18B is a diagram illustrating a change in transmission astigmatism along a meridian corresponding to Embodiment 2 (ADD=3.00 D).

FIG. 18B is a diagram illustrating the change in the transmission astigmatism along the meridian corresponding to Embodiment 2 (ADD=3.00 D). The vertical axis indicates the position [mm] in the y direction, and the horizontal axis indicates the transmission astigmatism (D) transmitted.

Figure 18C:
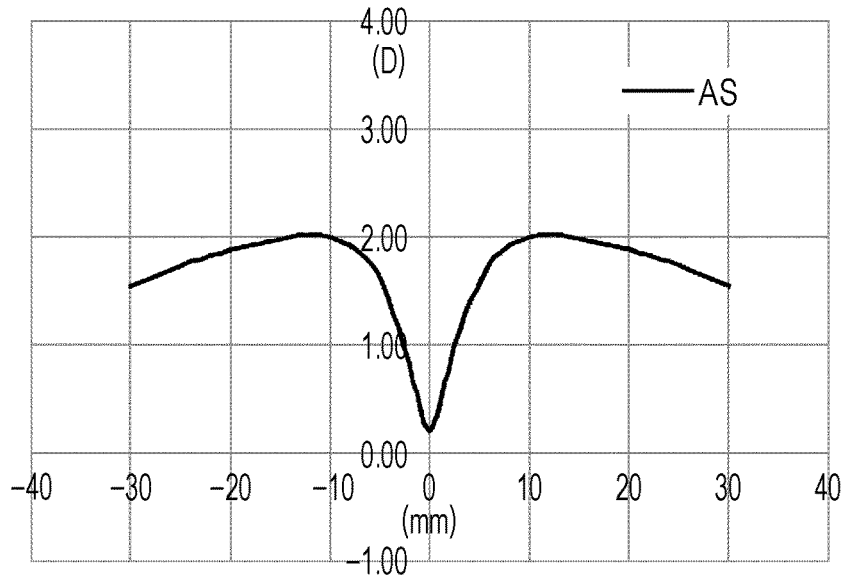
FIG. 18C is a diagram schematically illustrating the change in the transmission astigmatism corresponding to Embodiment 2 (ADD=3.00 D) at y=−4.0 mm.
Figure 18D:
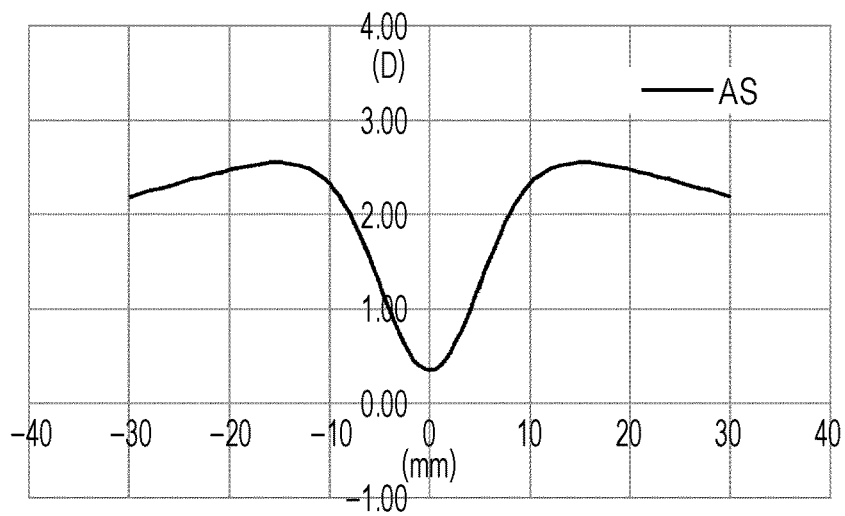
FIG. 18D is a diagram schematically illustrating the change in the transmission astigmatism corresponding to Embodiment 2 (ADD=3.00 D) at y=−14.0 mm.

FIGS. 18C and 18D are diagrams schematically illustrating the change in the transmission astigmatism at y=−4.0 mm and y=−14.0 mm, respectively. The vertical axis is the transmission astigmatism [D], and the horizontal axis is the position [mm] in the x direction.

The distribution of the transmission average refractive power and the distribution of the transmission astigmatism other than Embodiment 2 (ADD=3.00 D) are as follows. Next, the transmission astigmatism added is −0.25 D in Embodiment 2 (ADD=2.00 D) and −0.125 D in Embodiment 2 (ADD=1.00 D).

That is, in Embodiment 2, the additional amount of the transmission astigmatism is ⅛ (=0.125) times that of the ADD.

Figure 19A:
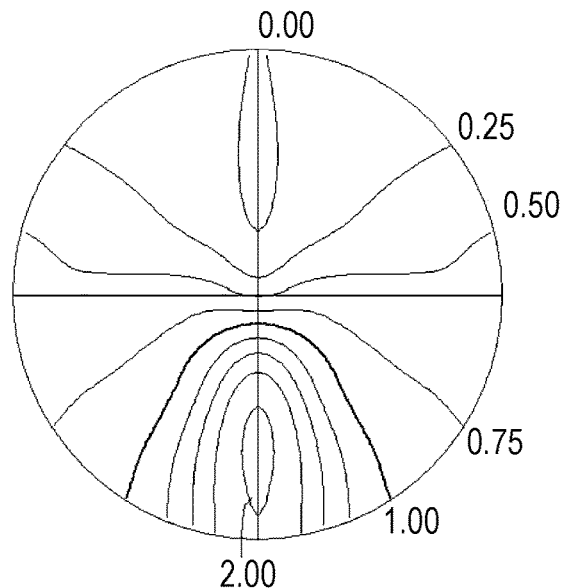
FIG. 19A is a diagram illustrating a distribution of transmission average refractive power corresponding to Embodiment 2 (ADD=2.00 D).

FIG. 19A is a diagram illustrating the distribution of the transmission average refractive power corresponding to Embodiment 2 (ADD=2.00 D).

Figure 19B:
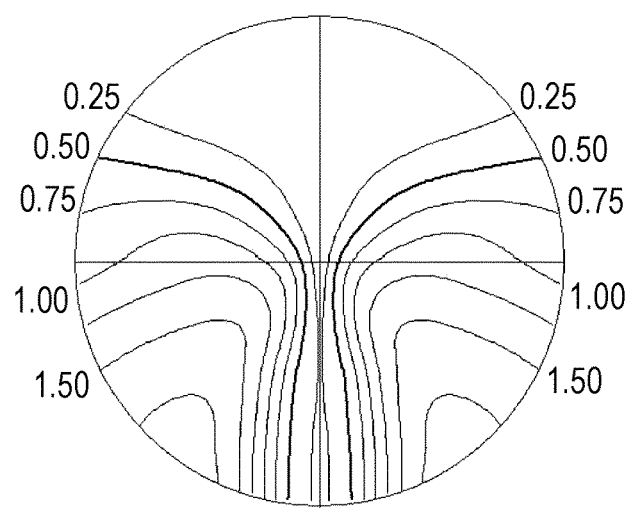
FIG. 19B is a diagram illustrating a distribution of transmission astigmatism corresponding to Embodiment 2 (ADD=2.00 D).

FIG. 19B is a diagram illustrating the distribution of the transmission astigmatism corresponding to Embodiment 2 (ADD=2.00 D).

Figure 20A:
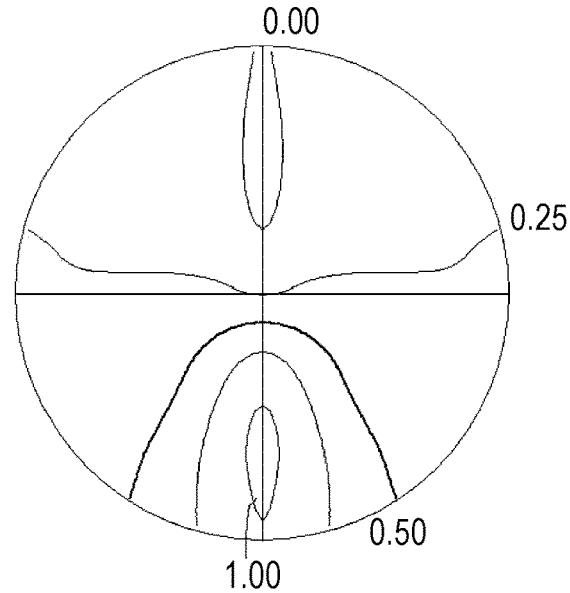
FIG. 20A is a diagram illustrating a distribution of transmission average refractive power corresponding to Embodiment 2 (ADD=1.00 D).

FIG. 20A is a diagram illustrating the distribution of the transmission average refractive power corresponding to Embodiment 2 (ADD=1.00 D).

Figure 20B:
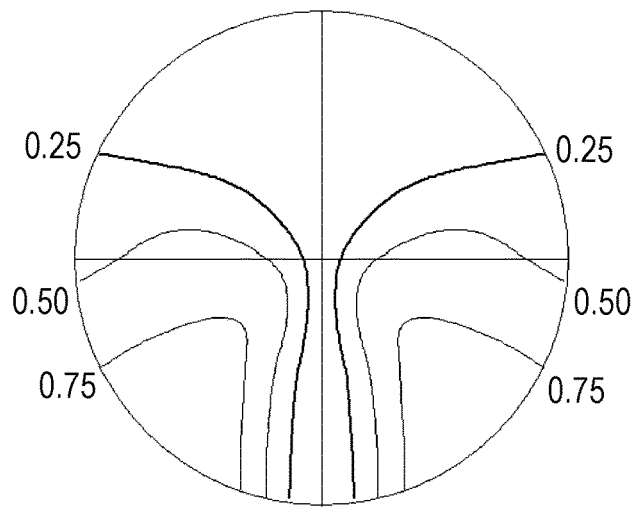
FIG. 20B is a diagram illustrating a distribution of transmission astigmatism corresponding to Embodiment 2 (ADD=1.00 D).

FIG. 20B is a diagram illustrating the distribution of the transmission astigmatism corresponding to Embodiment 2 (ADD=1.00 D).

Table 6 below shows actual measurement results of lengths of areas "A" and "B" in the distribution of the transmission average refractive power between the spectacle lens of Embodiment 2 and the conventional spectacle lens.

TABLE 6

|  |  | Conventional Example (Lens before addition of aberration) | Embodiment 2 |
|---|---|---|---|
| ADD = 3.00 D | Area A Width [mm] of (y = −14.0 mm) | 20.88 | 22.94 |
|  | Area B Width [mm] of (y = −20.0 mm) | 26.34 | 29.06 |
| ADD = 2.00 D | Area A Width [mm] of (y = −14.0 mm) | 20.92 | 23.00 |
|  | Area B Width [mm] of (y = −20.0 mm) | 26.38 | 29.16 |

TABLE 6-continued

| | | Conventional Example (Lens before addition of aberration) | Embodiment 2 |
|---|---|---|---|
| ADD = 1.00 D | Area A Width [mm] of (y = −14.0 mm) | 20.94 | 23.06 |
| | Area B Width [mm] of (y = −20.0 mm) | 26.40 | 29.22 |

When viewing Table 6, it can be seen that the near portion of Embodiment 2 is wider than before.

In the progressive addition lens handled in Embodiment 2, the transmission astigmatism is shown to be formed on the side of the eye and added to the portion corresponding to the near portion and the intermediate portion. Further, in one example, the horizontal refractive power is smaller than the vertical refractive power in the portion corresponding to one point of the near portion. In another example, in the meridian (or main line of sight) of the intermediate portion and near portion, the horizontal refractive power is smaller than the vertical refractive power. In other words, the transmission astigmatism is added so that the horizontal refractive power is smaller than the vertical refractive power, thereby providing the transmission astigmatism to the eye.

As described in [5. Design method of progressive addition lens according to Embodiment 1], in the progressive addition lens, intrinsic astigmatism existing in the progressive portion has a relationship of vertical refractive power >horizontal refractive power because the refractive power increases toward the lower side of the lens.

As described above, by adding the transmission astigmatism having the relationship of vertical refractive power >horizontal refractive power, the astigmatism is further added to the intrinsic astigmatism. Therefore, it is usually difficult to obtain a clear visual field where the horizontal width is transmission astigmatism of 0.50 D or less in the near portion as compared with the conventional example. On the other hand, in order to smoothly connect the distance portion and the corridor, the value of the horizontal refractive power of the peripheral area of the progressive addition lens is maintained even after the addition of the astigmatism. As a result, the change in the refractive power in the near portion becomes gentle overall. Accordingly, the horizontal width of the area equal to or more than half the value of the near power increases.

As a result, by adding the transmission astigmatism in the near portion, it is possible to widen the horizontal width of the area equal to or more than half the value of the near power, and it becomes easier to visually recognize an object at a predetermined near distance.

The above are the characteristics of the progressive addition lens (Embodiment 2) handled by the design method according to one aspect of the present invention.

Then, the results when the design method according to one aspect of the present invention is applied will be described below.

6-2. Before and after Lens Change, Comparison when Amount of Transmission Astigmatism Added is within Predetermined Range (Embodiment 2 and Embodiment 2a in which Aberration Amount is Slightly Changed) and when Amount of Transmission Astigmatism Added is not within Predetermined Range (Reference Embodiment 2)

Here, Embodiment 2a in which the aberration amount (0.30 D) is slightly changed from Embodiment 2 will be described. In Embodiment 2a, the amount of transmission astigmatism added changes according to the ADD.

When the ADD is 3.00 D, the additional amount of the transmission astigmatism is 0.50 D.

When the ADD is 2.00 D, the additional amount of the transmission astigmatism is 0.33 D.

When the ADD is 1.00 D, the additional amount of the transmission astigmatism is 0.17 D.

That is, in Embodiment 2a, the additional amount of the transmission astigmatism is about ⅙ times (about 0.17 times) that of ADD.

Figure 21A:
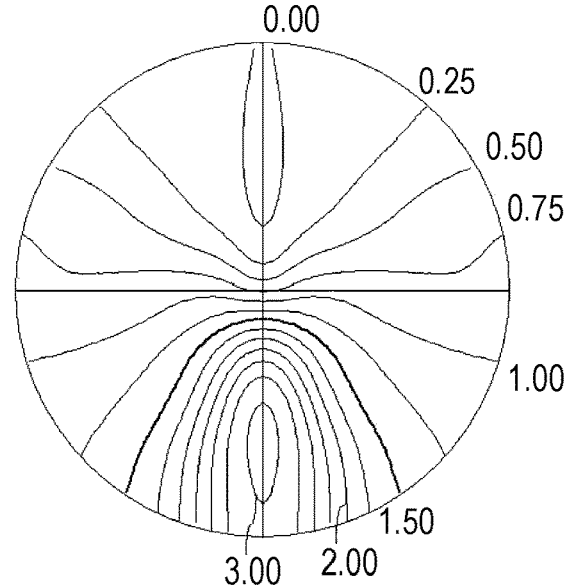
FIG. 21A is a diagram illustrating a distribution of transmission average refractive power corresponding to Embodiment 2a (ADD=3.00 D).

FIG. 21A is a diagram illustrating the distribution of the transmission average refractive power corresponding to Embodiment 2a (ADD=3.00 D).

Figure 21B:
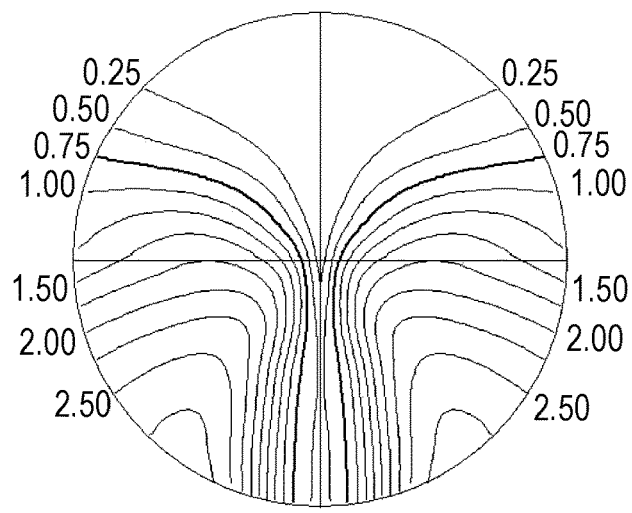
FIG. 21B is a diagram illustrating a distribution of transmission astigmatism corresponding to Embodiment 2a (ADD=3.00 D).

FIG. 21B is a diagram illustrating the distribution of the transmission astigmatism corresponding to Embodiment 2a (ADD=3.00 D).

Figure 22A:
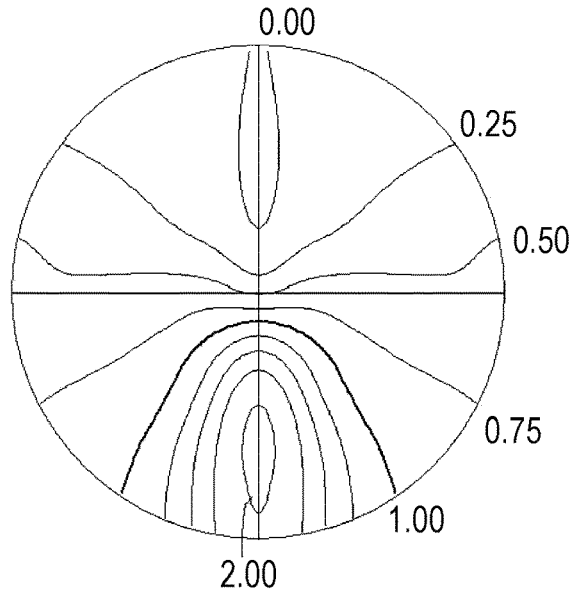
FIG. 22A is a diagram illustrating a distribution of transmission average refractive power corresponding to Embodiment 2a (ADD=2.00 D).

FIG. 22A is a diagram illustrating the distribution of the transmission average refractive power corresponding to Embodiment 2a (ADD=2.00 D).

Figure 22B:
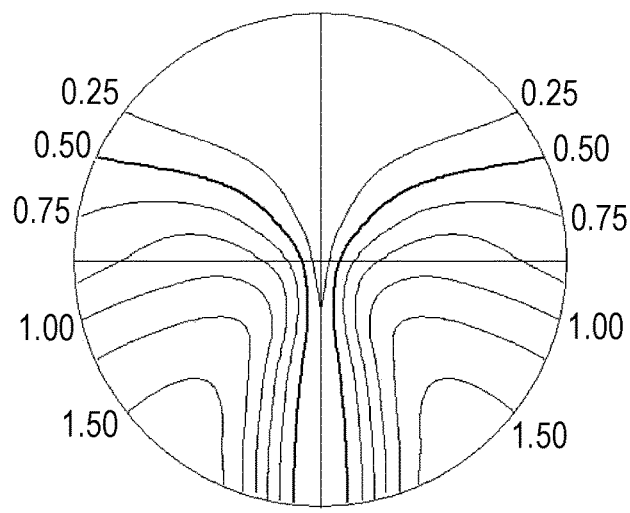
FIG. 22B is a diagram illustrating a distribution of transmission astigmatism corresponding to Embodiment 2a (ADD=2.00 D).

FIG. 22B is a diagram illustrating the distribution of the transmission astigmatism corresponding to Embodiment 2a (ADD=2.00 D).

Figure 23A:
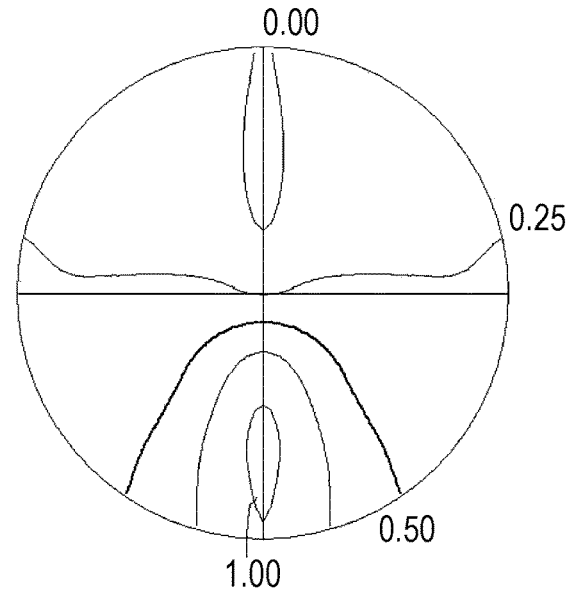
FIG. 23A is a diagram illustrating a distribution of transmission average refractive power corresponding to Embodiment 2a (ADD=1.00 D).

FIG. 23A is a diagram illustrating the distribution of the transmission average refractive power corresponding to Embodiment 2a (ADD=1.00 D).

Figure 23B:
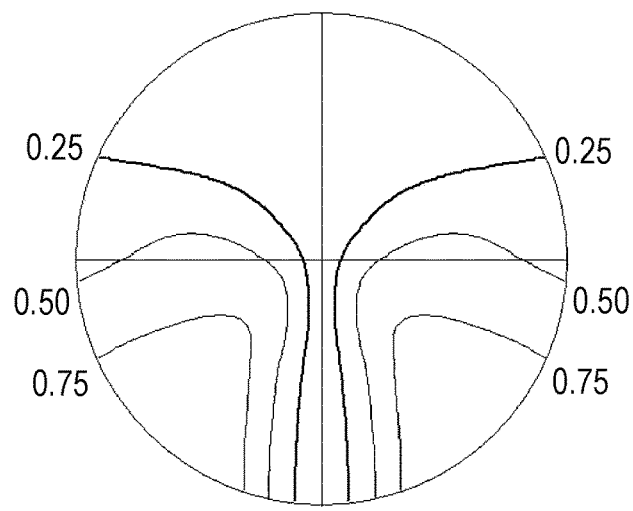
FIG. 23B is a diagram illustrating a distribution of transmission astigmatism corresponding to Embodiment 2a (ADD=1.00 D).

FIG. 23B is a diagram illustrating the distribution of the transmission astigmatism corresponding to Embodiment 2a (ADD=1.00 D).

In order to compare the case where the amount of transmission astigmatism added is within the predetermined range (Embodiment 2 and Embodiment 2a in which the aberration amount is slightly changed), the case where the amount of transmission astigmatism added is outside the predetermined range is described as reference Embodiment 2.

Figure 24A:
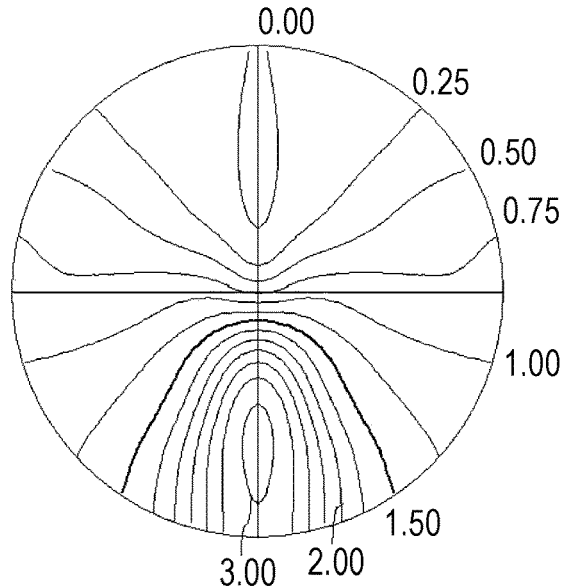
FIG. 24A is a diagram illustrating a distribution of transmission average refractive power corresponding to reference Embodiment 2 (ADD=3.00 D).

FIG. 24A is a diagram illustrating the distribution of the transmission average refractive power corresponding to reference Embodiment 2 (ADD=3.00 D).

Figure 24B:
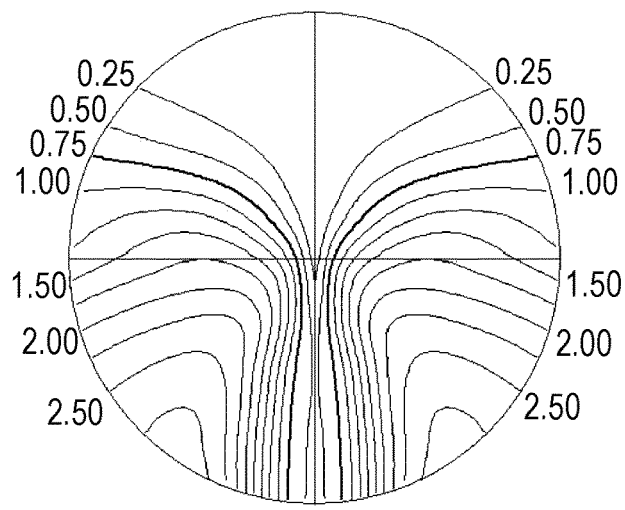
FIG. 24B is a diagram illustrating a distribution of transmission astigmatism corresponding to reference Embodiment 2 (ADD=3.00 D).

FIG. 24B is a diagram illustrating the distribution of the transmission astigmatism corresponding to reference Embodiment 2 (ADD=3.00 D).

Figure 25A:
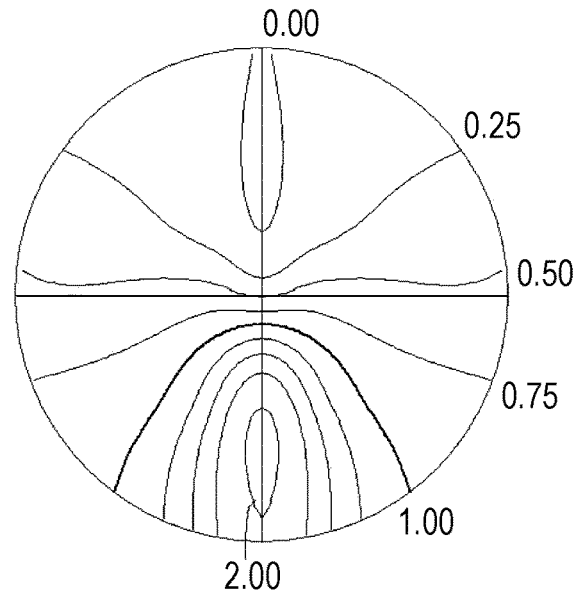
FIG. 25A is a diagram illustrating a distribution of transmission average refractive power corresponding to reference Embodiment 2 (ADD=2.00 D).

FIG. 25A is a diagram illustrating the distribution of the transmission average refractive power corresponding to reference Embodiment 2 (ADD=2.00 D).

Figure 25B:
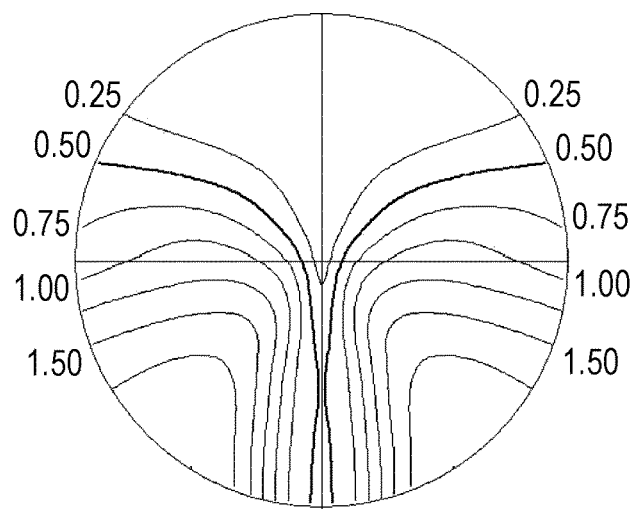
FIG. 25B is a diagram illustrating a distribution of transmission astigmatism corresponding to reference Embodiment 2 (ADD=2.00 D).

FIG. 25B is a diagram illustrating the distribution of the transmission astigmatism corresponding to reference Embodiment 2 (ADD=2.00 D).

Figure 26A:
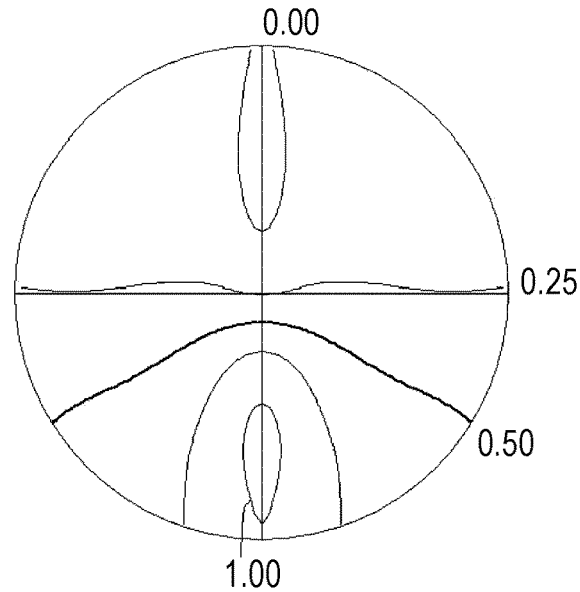
FIG. 26A is a diagram illustrating a distribution of transmission average refractive power corresponding to reference Embodiment 2 (ADD=1.00 D).

FIG. 26A is a diagram illustrating the distribution of the transmission average refractive power corresponding to reference Embodiment 2 (ADD=1.00 D).

Figure 26B:
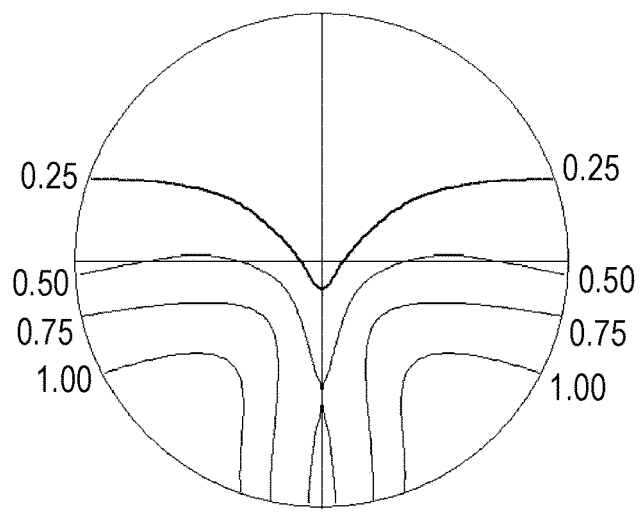
FIG. 26B is a diagram illustrating a distribution of transmission astigmatism corresponding to reference Embodiment 2 (ADD=1.00 D).

FIG. 26B is a diagram illustrating the distribution of the transmission astigmatism corresponding to reference Embodiment 2 (ADD=1.00 D).

Table 7 below summarizes the distances of the arrows "A" and "B" in each ADD in Embodiment 2, Embodiment 2a, and reference Embodiment 2.

TABLE 7

|  |  | Conventional Example (Lens before addition of aberration) | Embodiment 2 | Embodiment 2a | Reference Embodiment 2 |
|---|---|---|---|---|---|
| ADD = 3.00 D | Area A Width [mm] of (y = −14.0 mm) | 20.88 | 22.94 | 23.82 | 23.82 |
|  | Area B Width of (y = −20.0 mm) | 26.34 | 29.06 | 30.20 | 30.20 |
| ADD = 2.00 D | Area A Width [mm] of (y = −14.0 mm) | 20.92 | 23.00 | 23.90 | 26.12 |
|  | Area B Width of (y = −20.0 mm) | 26.38 | 29.16 | 30.34 | 33.22 |
| ADD = 1.00 D | Area A Width [mm] of (y = −14.0 mm) | 20.94 | 23.06 | 23.96 | 46.32 |
|  | Area B Width of (y = −20.0 mm) | 26.40 | 29.22 | 30.42 | No measurement |

Then, it was investigated how much the distance changed from the distance of the arrow "A" when the ADD was 3.00 D to the distance of the arrow "A" when the ADD was 2.00 D. In other words, it was investigated how much the distance of the arrow "A" when ADD is 3.00 D and the arrow "A" when ADD is 2.00 D match. The same contents were also investigated for the arrow "B". Table 8 below summarizes these results.

TABLE 8

|  |  | Embodiment 2 | Embodiment 2a | Reference Embodiment 2 |
|---|---|---|---|---|
| ADD 3.00 D → 2.00 D | Area A Match rate [%] of (y = −14.0 mm) | 100.26 | 100.34 | 109.66 |
|  | Area B Match rate [%] of (y = −20.0 mm) | 100.34 | 100.46 | 110.00 |
| ADD 2.00 D → 1.00 D | Area A Match rate [%] of (y = −14.0 mm) | 100.26 | 100.25 | 177.34 |
|  | Area B Match rate [%] of (y = −20.0 mm) | 100.21 | 100.26 | No measurement |
| ADD 3.00 D → 1.00 D | Area A Match rate [%] of (y = −14.0 mm) | 100.52 | 100.59 | 194.46 |
|  | Area B Match rate [%] of (y = −20.0 mm) | 100.55 | 100.73 | No measurement |

As shown in Table 8, in Embodiment 2 and Embodiment 2a,
- it can be seen that aberration amount $\Delta_\beta[D]$ is set so that a match rate of a horizontal width of area A where the transmission average refractive power is equal to or more than half a value of near power and y=−14.0 mm is 99 to 101%, and
- a match rate of a horizontal width of area B where the transmission average refractive power is equal to or more than half the value of the near power and y=−20.0 mm is 99 to 101%.

Table 9 below summarizes the distances of the areas "a'1" and "a'2" in each ADD in Embodiment 2, Embodiment 2a, and reference Embodiment 2.

TABLE 9

|  |  | Conventional Example (Lens before addition of aberration) | Embodiment 2 | Embodiment 2a | Reference Embodiment 2 |
|---|---|---|---|---|---|
| ADD = 3.00 D | Area a'1 Width [mm] of (y = −14.0 mm) | 8.30 | 6.10 | 5.08 | 5.08 |
|  | Area a'2 Width [mm] of (y = −20.0 mm) | 9.96 | 7.24 | 6.04 | 6.04 |
| ADD = 2.00 D | Area a'1 Width [mm] of (y = −14.0 mm) | 8.30 | 6.08 | 5.06 | 1.36 |
|  | Area a'2 Width [mm] of (y = −20.0 mm) | 10.00 | 7.24 | 6.04 | 1.86 |
| ADD = 1.00 D | Area a'1 Width [mm] of (y = −14.0 mm) | 8.30 | 6.06 | 5.04 | No measurement |
|  | Area a'2 Width [mm] of (y = −20.0 mm) | 10.00 | 7.24 | 6.00 | No measurement |

Then, it was investigated how much the distance changed from the distance of the area "a'1" when the ADD was 3.00 D to the distance of the area "a'1" when the ADD was 2.00 D. In other words, it was investigated how much the distance of the area "a'1" when ADD is 3.00 D and the area "a'1" when ADD is 2.00 D match. In addition, the same contents were also investigated for the area "a'2". Table 10 below summarizes these results.

TABLE 10

|  |  | Embodiment 2 | Embodiment 2a | Reference Embodiment 2 |
|---|---|---|---|---|
| ADD 3.00 D → 2.00 D | Area a'1 Match rate [%] of (y = −14.0 mm) | 100.00 | 99.61 | 26.77 |
|  | Area a'2 Match rate [%] of (y = −20.0 mm) | 100.34 | 100.00 | 30.79 |
| ADD 2.00 D → 1.00 D | Area a'1 Match rate [%] of (y = −14.0 mm) | 99.79 | 99.60 | No measurement |
|  | Area a'2 Match rate [%] of (y = −20.0 mm) | 100.17 | 99.34 | No measurement |
| ADD 3.00 D → 1.00 D | Area a'1 Match rate [%] of (y = −14.0 mm) | 99.79 | 99.21 | No measurement |
|  | Area a'2 Match rate [%] of (y = −20.0 mm) | 100.51 | 99.34 | No measurement |

As shown in Table 10, in Embodiment 2 and Embodiment 2a,
  it can be seen that the aberration amount $\Delta_\beta[D]$ is set so that a match rate of a horizontal width of area a'1 where the transmission astigmatism is ADD/4 or less and y=−14.0 mm is 97 to 103% (specifically, 99 to 101%), and
  a match rate of a horizontal width of area a'2 where the transmission astigmatism is ADD/4 or less and y=−20.0 mm is 97 to 103% (specifically, 99 to 101%).

As described above, in the design method of a progressive addition lens according to one aspect of the present invention, the change in the transmission distribution with respect to the change in the ADD is smaller than that in reference Embodiment 2. For this reason, it is possible to make it difficult to feel the change in blurring, shaking, distortion, and the like due to the change in the spectacle lens accompanying the change in parameters represented by the ADD.

7. Comparison Between Each Embodiment and Each Reference Embodiment from Viewpoint of Meridianal Power on Circumference FIG. 27 is a diagram illustrating a plot when a rotation angle from a positive direction of an x axis passing through an origin is a horizontal axis (unit: degree), and meridianal refractive power, normalized by addition power, at each point corresponding to a rotation angle on a circle having a radius of 14.0 mm centered on the origin of a progressive addition lens is a vertical axis (unit: dimensionless), a plot before the transmission astigmatism is added, and a plot when the ADD is 1.00 D, 2.00 D, and 3.00 D.

Figure 27:
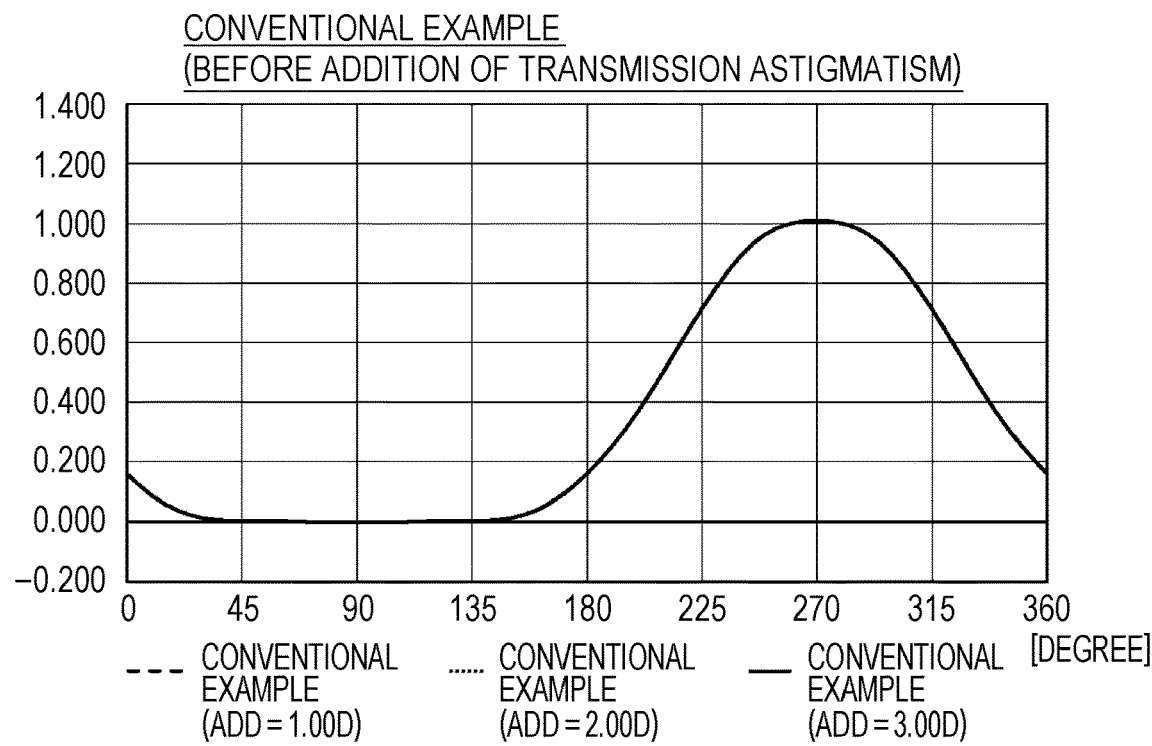
FIG. 27 is a diagram illustrating a plot when a rotation angle from a positive direction of an x axis passing through an origin is a horizontal axis (unit: degree), and a meridianal refractive power, normalized by the addition power, at each point corresponding to a rotation angle on a circle having a radius of 14.0 mm centered on the origin of a progressive addition lens is a vertical axis (unit: dimensionless), a plot before the transmission astigmatism is added, and a plot when the ADD is 1.00 D, 2.00 D, and 3.00 D.

FIG. 27 is a diagram illustrating a plot prepared because the above (defined by the meridianal power on the circumference) is significant. As illustrated in FIG. 27, as the original design of the progressive addition lens before the transmission astigmatism is added, by performing the normalizing with the addition power even if the addition power is different, a design that matches the plot even if the addition power is different is used. Note that in the examples given in the embodiments 1 and 2, a distribution map of the transmission astigmatism and a distribution map of the transmission average refractive power are produced based on the original design.

Figure 28:
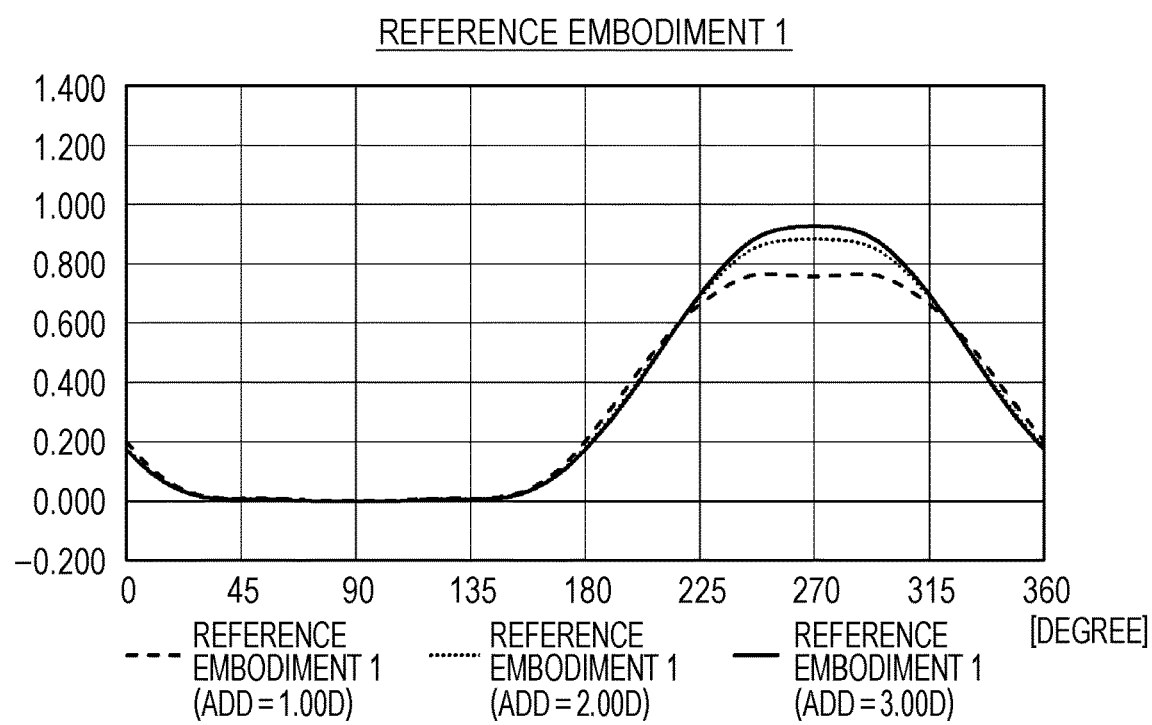
FIG. 28 is a diagram illustrating a plot having the same contents as that of FIG. 27, a plot of reference Embodiment 1, and a plot when the ADD is 1.00 D, 2.00 D, and 3.00 D (all of which are added aberration amount 0.50 D).

FIG. 28 is a diagram illustrating a plot having the same contents as that of FIG. 27, a plot of reference Embodiment 1, and a plot when the ADD is 1.00 D, 2.00 D, and 3.00 D (all of which are added aberration amount 0.50 D).

Figure 29:
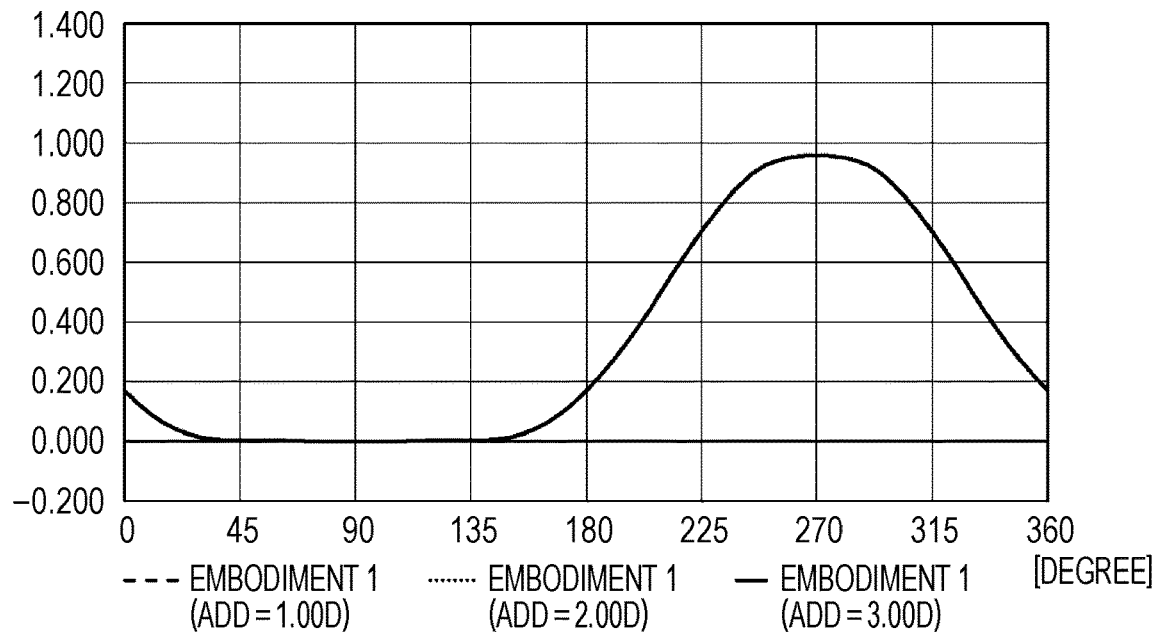
FIG. 29 is a diagram illustrating a plot having the same contents as that of FIG. 27, a plot of Embodiment 1, and a plot when the ADD is 1.00 D (added aberration amount 0.10 D), 2.00 D (added aberration amount 0.20 D), and 3.00 D (added aberration amount 0.30 D).

FIG. 29 is a diagram illustrating a plot having the same contents as that of FIG. 27, a plot of Embodiment 1, and a plot when the ADD is 1.00 D (added aberration amount 0.10 D), 2.00 D (added aberration amount 0.20 D), and 3.00 D (added aberration amount 0.30 D).

Figure 30:
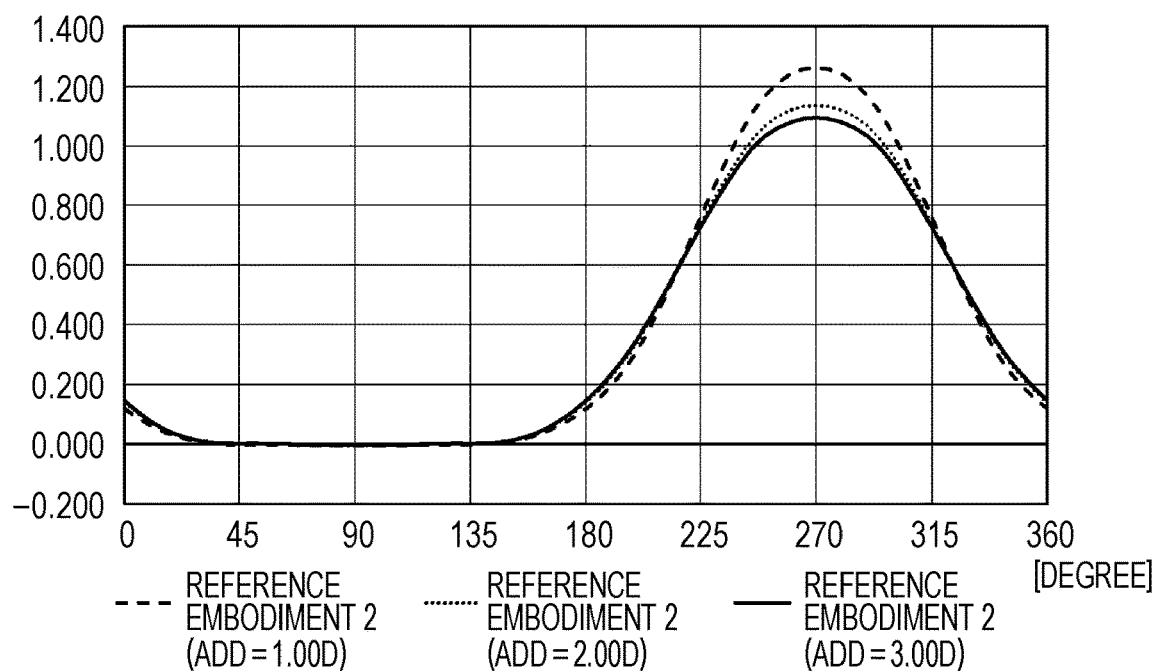
FIG. 30 is a diagram illustrating a plot having the same contents as that of FIG. 27, a plot of reference Embodiment 2, and a plot when the ADD is 1.00 D, 2.00 D, and 3.00 D (all of which are added aberration amount 0.50 D).

FIG. 30 is a diagram illustrating a plot having the same contents as that of FIG. 27, a plot of reference Embodiment 2, and a plot when the ADD is 1.00 D, 2.00 D, and 3.00 D (all of which are added aberration amount 0.50 D).

Figure 31:
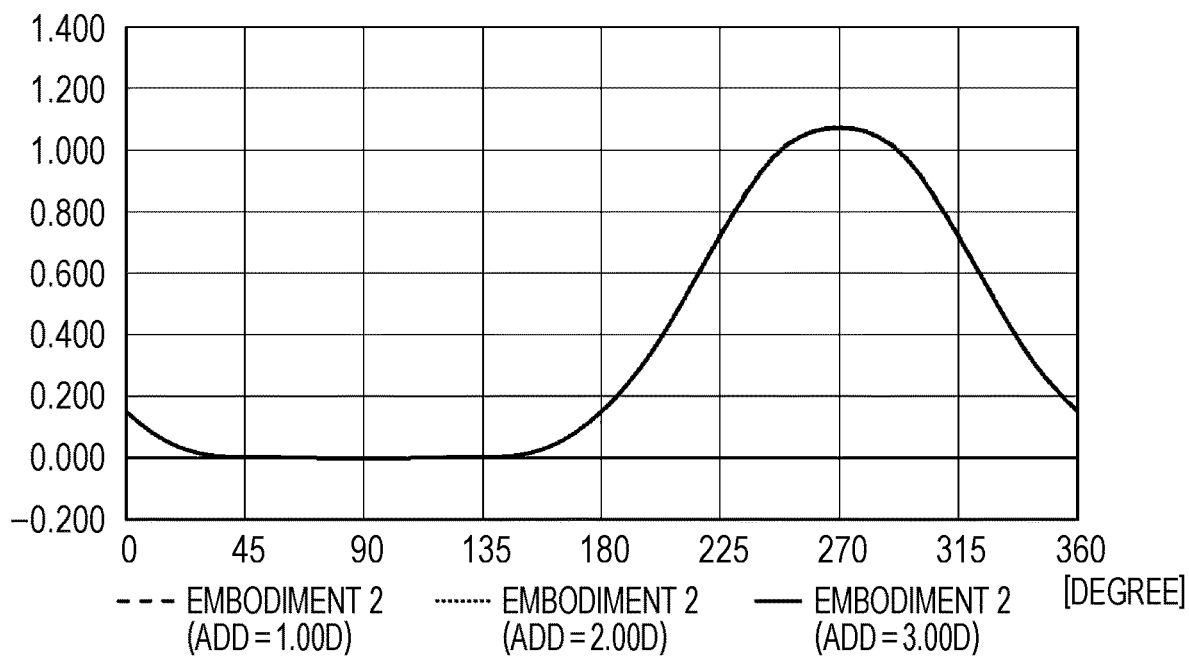
FIG. 31 is a diagram illustrating a plot having the same contents as that of FIG. 27, a plot of Embodiment 2, and a plot when the ADD is 1.00 D (added aberration amount 0.125 D), 2.00 D (added aberration amount 0.25 D), and 3.00 D (added aberration amount 0.375 D).

FIG. 31 is a diagram illustrating a plot having the same contents as that of FIG. 27, a plot of Embodiment 2, and a plot when the ADD is 1.00 D (added aberration amount 0.125 D), 2.00 D (added aberration amount 0.25 D), and 3.00 D (added aberration amount 0.375 D).

As illustrated in FIG. 28, in reference Embodiment 1, the difference in the vertical axis direction in each progressive addition lens becomes large in the vicinity of the near portion measurement reference point (rotation angle 270°).

On the other hand, as illustrated in FIG. 29, in Embodiment 1, the maximum width of the vertical axis directions between the plots was 0.1 or less (specifically, 0.001 or less). Note that in FIG. 29, since the maximum width is extremely small, the plots overlap each other.

Similarly, as illustrated in FIG. 30, in reference Embodiment 2, the difference in the vertical axis direction in each progressive addition lens becomes large in the vicinity of the near portion measurement reference point (rotation angle 270°).

On the other hand, as illustrated in FIG. 31, in Embodiment 2, the maximum width of the vertical axis directions between the plots was 0.1 or less (specifically, 0.001 or less). Note that in FIG. 31, since the maximum width is extremely small, the plots overlap each other.

That is, according to each embodiment, the maximum width of the vertical axis direction between the plot of the progressive addition lens α before the replacement and the plot of the progressive addition lens β after the replacement is 0.1 or less. As a result, it becomes easier for the wearer to become familiar with the replaced progressive addition lens.

8. System Configuration According to One Aspect of the Present Invention

Figure 32:
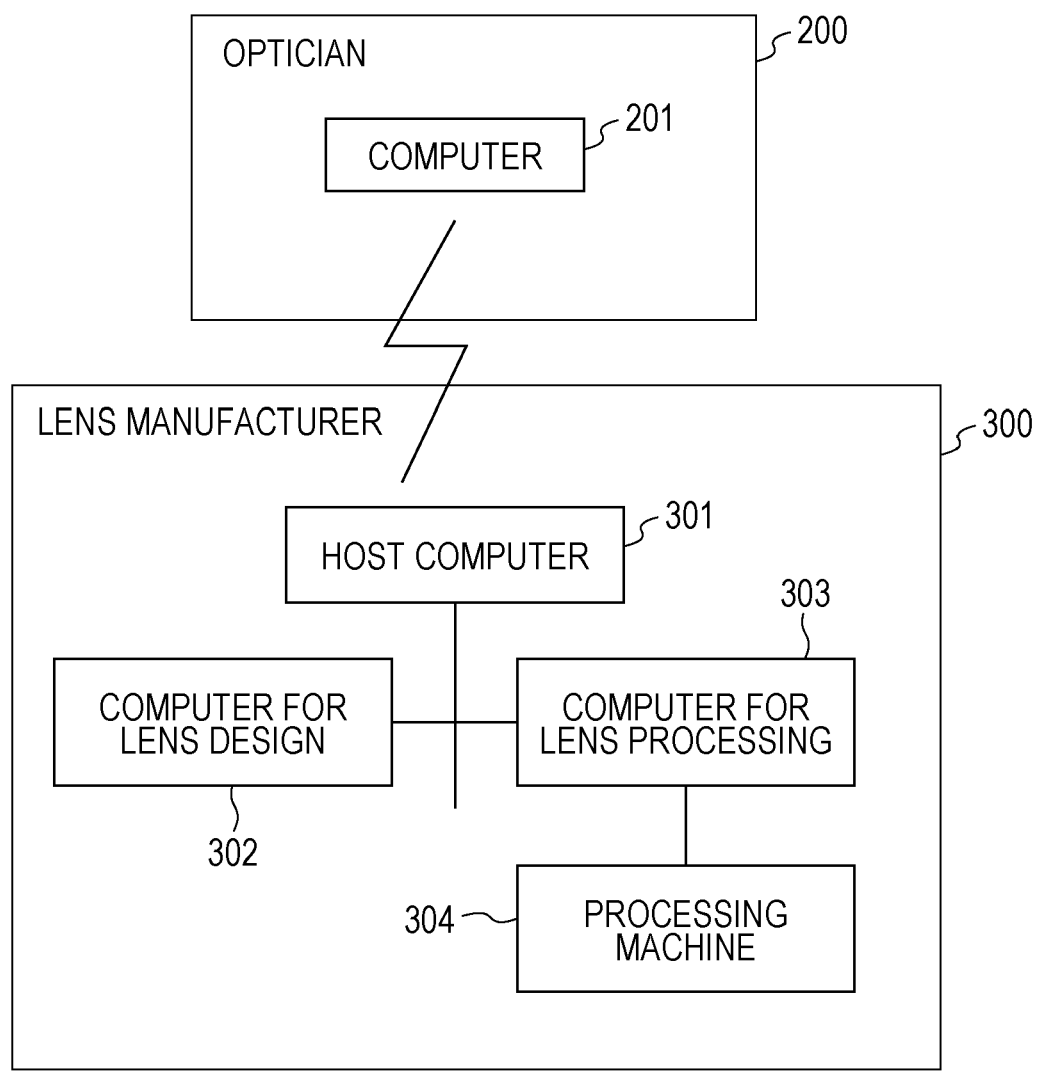
FIG. 32 is a block diagram for explaining an example of a configuration of a system for producing a spectacle lens for carrying out a method for manufacturing spectacle lens of embodiments 1 and 2.

FIG. 32 is a block diagram for explaining an example of a configuration of a system for manufacturing a progressive addition lens for carrying out a design method for a progressive addition lens of the embodiment Note that in order to execute this system, the computer shown below is used (computer-assisted), and in particular, this system is controlled by a control unit in the computer.

Note that a double-sided composite progressive lens is used as a surface structure of the finally obtained lens. Other various conditions are as follows.

Inward adjustment amount: 2.5 mm
Refractive index: 1.60
Corneal-lens apex distance (CVD): 12.0 mm
Distance from apex of corneal to center of cycloduction: 13.0 mm
Interpupillary distance (PD): 64.0 mm
Anteversion angle: 10.0°
Front angle (JIS B7281:2003): 0.0°

Hereinafter, unless otherwise specified, various conditions for the finally obtained lens are the same. However, the present invention is not limited to these conditions.

As illustrated in FIG. 32, the design system of a progressive addition lens includes an optician 200 for ordering a spectacle lens based on prescription data of a client (prescription expected person) and a lens manufacturer 300 for manufacturing the spectacle lens in response to the order from the optician 200.

The order to the lens manufacturer 300 is performed by transmitting data via a specific network such as the Internet or fax. Ophthalmologists and consumers are included in the same ordering party as the optician 200.

(Optician 200)

A computer 201 is installed in the optician 200. The computer 201 is, for example, a general personal computer, and software for ordering a spectacle lens from a lens manufacturer 300 is installed. Order data is input to the computer 201 by operating a mouse, a keyboard, or the like with the optician 200 or the like.

The order data includes at least wearer information. The wearer information includes at least lens data and frame data for the wearer. In addition, the wearer information may also include supplementary data such as a spectacle wearing style in some cases.

Lens data includes, for example, prescription data (including spherical refractive power, columnar refractive power, columnar axis, prism power, prism base direction, addition power, interpupillary distance (PD), base curve, and the like), information on lens type (including information on spherical single focus lens, aspherical single focus lens, bifocal lens, progressive addition lens, and the like), information on coating to be added (information on presence or absence of color, hard coat, antireflection film, UV cut, and the like), layout data according to a request of a wearer who is a client, and the like.

The frame data includes shape data of the frame selected by the client. The frame data is managed by, for example, a bar code tag, and can be used by reading the bar code tag attached to the frame with a bar code reader. The computer 201 transmits the order data (lens data and frame data) to the lens manufacturer 300, for example, via the Internet.

(Lens Manufacturer 300)

In the lens manufacturer 300, a local area network (LAN) centered on a host computer 301 is constructed. A plurality of terminal devices such as computer for lens design 302 and computer for lens processing 303 are connected to the host computer 301. The computer for lens design 302 and the computer for lens processing 303 are general personal computers, and a program for designing a spectacle lens or a program for processing a spectacle lens are installed respectively.

The order data transmitted from the computer 201 via the Internet is input to the host computer 301. The host computer 301 transmits the input order data to the computer for lens design 302.

After receiving the order data, the lens manufacturer 300 designs and processes both a convex surface (object side) and a concave surface (eyeball side) on an unprocessed block so as to satisfy the prescription of the wearer.

Note that in the lens manufacturer 300, in order to improve the productivity, the refractive power of the lens in the entire production range may be divided into a plurality of groups. Thereafter, a semi-finished blank spectacle lens having a convex curve shape (spherical shape or aspherical shape) and a lens diameter corresponding to the power range of each group may be prepared in advance according to the order of the spectacle lens.

In this case, the lens manufacturer 300 can manufacture the spectacle lens based on the wearer's prescription data by performing concave surface processing (and lens shape processing) or uneven processing (and lens shape processing).

The computer for lens design 302 has a program for an order or designing a spectacle lens according to the order, creates lens design data based on the order data, and creates lens shape processing data based on the order data (frame data).

The design of the spectacle lens by the computer for lens design 302 will be described later. The computer for lens design 302 transmits the created lens design data and lens shape processing data to the computer for lens processing 303.

An operator sets a block that is a material of the spectacle lens in a processing machine 304 such as a curve generator, and inputs a processing start instruction to the computer for lens processing 303. The computer for lens processing 303 reads the lens design data and the lens shape processing data transmitted from the computer for lens design 302, and drives and controls the processing machine 304.

A processing machine 304 produces the convex and concave shapes of the spectacle lens by grinding/polishing both surfaces of the block based on the lens design data. Further, the processing machine 304 processes the outer peripheral surface of the uncut lens into a circumferential shape corresponding to the lens shape (performs the lens shape processing) after producing the convex shape and the concave shape.

The spectacle lens subjected to the lens shape processing is subjected to various coatings such as dyeing, hard coating, antireflection film, and UV cutting. This completes the spectacle lens and delivers the completed spectacle lens to the optician 200.

According to another embodiment of the present invention, there is provided a computer program that includes a code produced to perform the design of the spectacle lens of the present embodiment. When this program is executed, the code instructs the processing resource to execute the design of the spectacle lens of this embodiment. Any computer is suitable for performing this method. For example, a computer is a processor, a memory (memory for storing a code and/or data required to operate the code), an interface for exchanging data with an operator, and an interface for exchanging data with other devices, and the like. These are collectively called a control unit.

According to still another embodiment of the present invention, the system for designing a spectacle lens includes a first determination means (or processor) that determines performance parameters of transmission astigmatism corresponding to a total sum of prescription astigmatism included in prescription data and a predetermined amount of additional astigmatism, and a second determination means (or the same processor) that is configured to determine lens surface data corresponding to the determined transmission performance parameters.

The above system can be realized by any combination of hardware and/or software. For example, a client/server architecture, a cloud computing system, and the like are used. In addition, the hardware and/or software can also be distributed and centralized on a single device.

Figure 33:
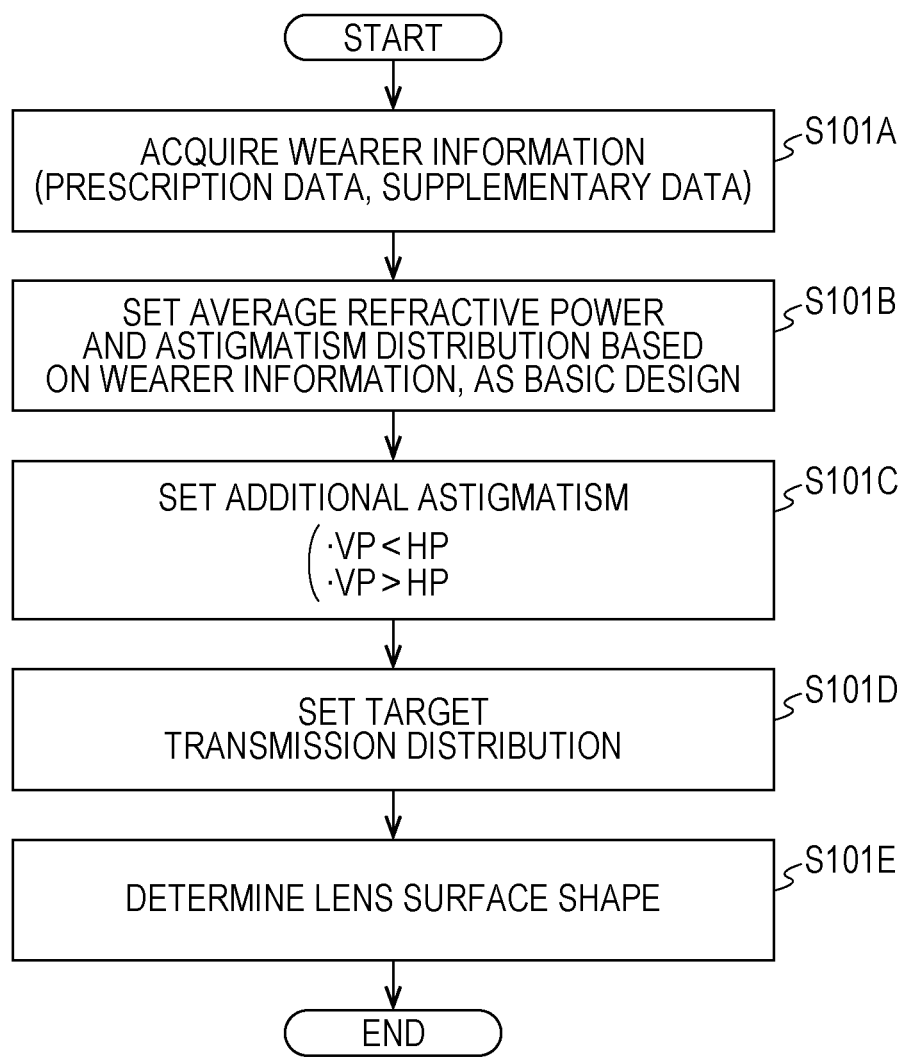
FIG. 33 is a flowchart illustrating a design method of a spectacle lens according to each embodiment.

FIG. 33 is a flowchart illustrating the design method of a progressive addition lens according to an embodiment.

According to an embodiment, the spectacle lens, which is the progressive addition lens, can be applied to a progressive addition lens such as a single-sided progressive type (inner or outer surface) and a double-sided progressive type including a type in which both sides are integrated.

Thereafter, the design method by this design system is executed by using the computer for lens design 302 (computer-assisted). Furthermore, in order for the computer for lens design 302 to exhibit the function for the control unit (not illustrated) in the computer for lens design 302 to process the information necessary for the design method described below, the computer program including the code produced to execute the design of the spectacle lens of the present embodiment is executed.

First, the computer for lens design 302 acquires the wearer information from the computer 201 installed in the optician 200 or a recording unit provided in the computer for lens design 302 (step S101A). The wearer information includes the prescription data and/or the supplementary data.

The supplementary data includes preferred data such as a wearing style and a frame shape. Further, the supplementary data may include the lens information before the change. Examples of the lens information before the change include the distribution of the transmission astigmatism, the distribution of the transmission average refractive power, and the absolute value of the change amount $\Delta_\alpha[D]$. In one aspect of the present invention, this change amount $\Delta_\alpha$ is 0.07 to 0.24 times that of the addition power $ADD_\alpha[D]$ even before the lens is changed. In addition, the supplementary data includes the frame data.

The frame data includes parameters used for the calculation of the transmission, such as the corneal-lens apex distance (CVD), the distance from the corneal apex to the center of cycloduction, the anteversion angle, the interpupillary distance (PD), the front angle, and the like. If there is no frame data, or if the contents of the frame data are unknown, a default value is used to calculate the transmission.

The supplementary data may include the information on the wearer's preference, such as wearing style, "close to near vision", or "distribution of horizontally stable refractive power". When the optician 200 sets the wearing style and the amount of transmission astigmatism, the supplementary data including this information will be obtained in S101A. When the information on the wearing style and/or the amount of transmission astigmatism is not provided by the optician, the computer for lens design 302 may set this information itself. The information on the supplementary data is not limited to the above contents. The supplementary data may include physiological parameters.

After the target distribution is determined, the outer and inner surfaces of the lens are designed so that the target distribution of the transmission is actually obtained.

Here, the design process will be described with reference to FIG. 33.

First, the specifications of the spectacles to be manufactured and the parameters suitable for the wearer are acquired. For example, the wearer prescription information including the prescription data is acquired (see step S101A in FIG. 33). The prescription data are used similarly in both the conventional example and embodiment, such as S+0.00 D ADD 2.00 D.

Next, the basic design of the lens is performed, and the distribution of the average refractive power and the distribution of the astigmatism in the basic design are set (see step S101B in FIG. 33). It is possible to select whether to perform the basic design on a new design line or on any existing design line of the progressive addition lens. Here, sample design A, which is the existing design line, is used as a base design. The corridor length of the sample design A is 18 mm as the lens design, and in the inner surface progressive additional lens as the surface structure, the inward adjustment amount is 2.5 mm, and the refractive index is equal to 1.60. The base design A can be used in common with both the conventional example and the embodiment of the present invention.

Next, the transmission astigmatism is set (see step S101C in FIG. 33) and the target distribution is set (see step S101D in FIG. 33). In the embodiment, the amount of transmission astigmatism along the meridian is set to be 0.50 [D]. For the meridian, an option in which the vertical refractive power is smaller than the horizontal refractive power is selected. The amount of transmission astigmatism and the relationship between the vertical refractive power and the horizontal refractive power can preferably be set by the lens manufacturer, but may be preset by an ophthalmologist in step S101A. The target distribution of the conventional design is the same as that of the base design A because there is no transmission astigmatism.

Then, the shapes of the outer and inner surfaces of the lens are designed so that the distribution of the transmission (average refractive power and astigmatism) based on light rays after passing through these two surfaces matches the target distribution (average refractive power and astigmatism) of the transmission (see step S101E in FIG. 33). In the embodiment, the inner surface of the lens is the progressive surface, and this inner surface is optimally designed (so-called aspherical correction is performed, but similar results can be obtained by other methods).

The outer and inner surfaces of the lens are designed so that the target distribution of transmission is actually obtained. In other words, the target distribution corresponds to the determined transmission performance parameters.

The distribution of the refractive power of the transmission astigmatism, the distribution of the refractive power of the transmission astigmatism is calculated from the surface shape of the progressive addition lens using at least the information of the corneal-lens apex distance, the anteversion angle, and the front angle.

Examples of numerical values of these parameters are used in the transmission basic design described above. Further, as long as the transmission astigmatism is intentionally added to provide the transmission astigmatism, the method for producing a progressive addition lens is not limited to the above design method, but similar results can be obtained by other methods.

Next, the computer for lens design 302 sets the distribution of the average refractive power and the distribution of the astigmatism as the basic design based on the wearer information (step S101B). The basic design provides the basic optical performance and the design features of the progressive addition lens. These optical performance and design features include the distribution of the average refractive power and the distribution of the intrinsic astigmatism. The distribution is represented by a flat surface with no curvature. The curvature of the finally obtained progressive addition lens with respect to the actual surface is provided in S101E. The basic design may be newly designed or may be selected from any existing design line of the progressive addition lenses.

Next, the aberration amount setting unit (not illustrated) in the computer for lens design 302 (for example, the first determination means of [0228]) sets the transmission astigmatism (step S101C). The amount of transmission astigmatism may or may not be included in the wearer information. When it is not included in the wearer information, the computer for lens design 302 can be set using the information such as the wearing style or using the default value.

Note that the method of giving transmission astigmatism has the options of patterns 1 to 3 described in [8. Modification example] described later. The selection information regarding these options may be included in the wearer information, and the computer for lens design 302 itself can be selected using the information such as the wearing style or using the default value.

When the transmission astigmatism is set in this way, the computer for lens design 302 sets, as a target transmission distribution (a target distribution of average refractive power, a target astigmatism distribution), the distribution of the average refractive power set in step S101B and the distribution in which the transmission astigmatism set in step S101C is added to the distribution of the astigmatism (step S101D). That is, the target astigmatism distribution obtained by adding the set distribution of the transmission astigmatism to the distribution of the astigmatism corresponding to the wearer information and the target distribution of the average refractive power corresponding to the wearer information are set.

The computer for lens design 302 determines the lens surface shape that realizes the target transmission distribution set in this way, for example, by the second determination means of [0228] (step S101E).

Figure 34:
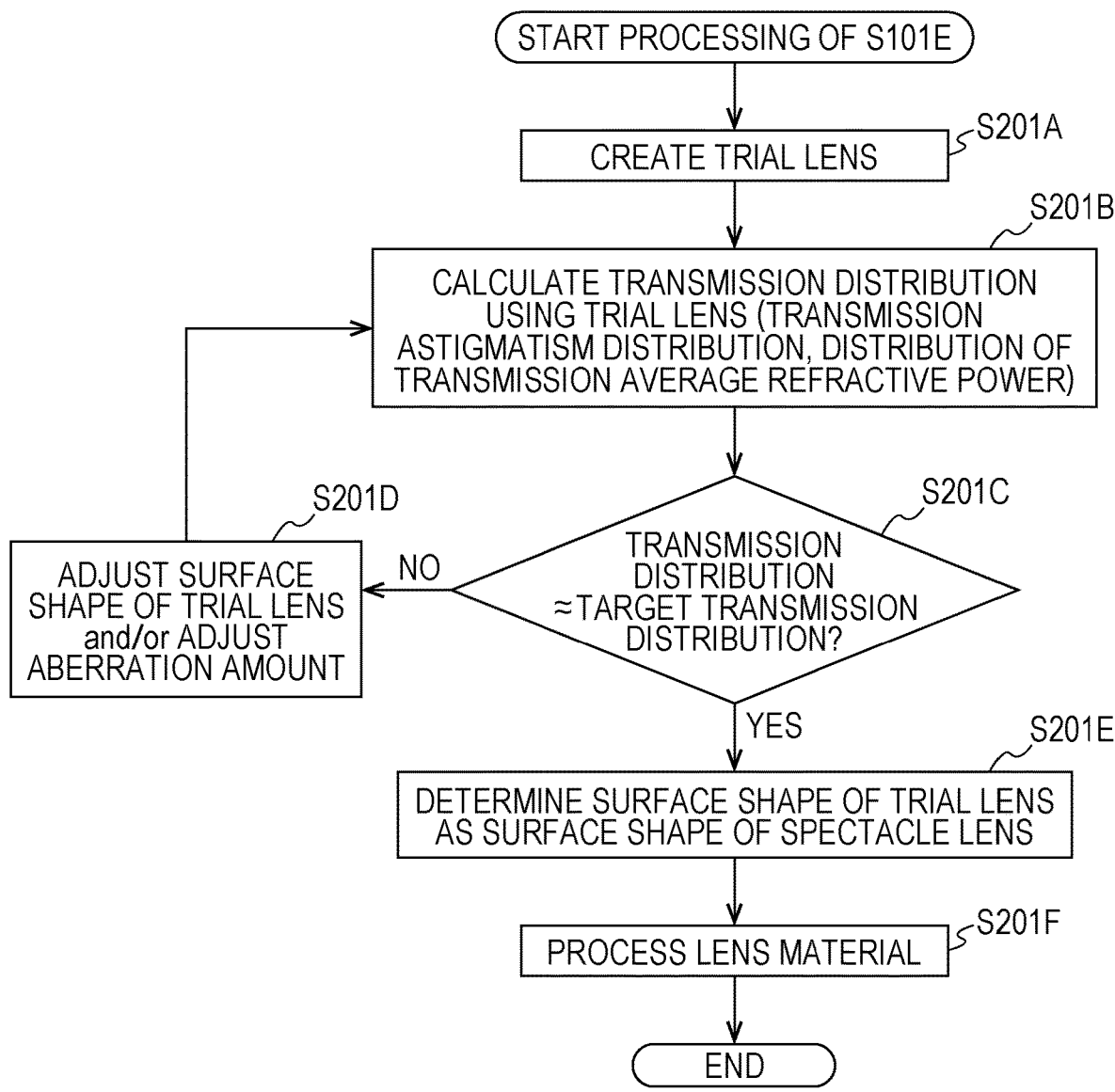
FIG. 34 is a flowchart illustrating a flow of a method of manufacturing a spectacle lens having a lens surface shape having a target transmission distribution as a transmission distribution in each embodiment.

FIG. 34 is a flowchart illustrating a flow of a method of manufacturing a spectacle lens having a lens surface shape having a target transmission distribution as a transmission distribution in an embodiment.

The computer for lens design 302 sets the distribution of the initial plane astigmatism and the distribution of the initial plane average refractive power, and creates a trial lens that realizes these distributions (step S201A). This trial lens is a lens having a curved shape.

The computer for lens design 302 uses this trial lens to calculate the distribution of the transmission average refractive power and the distribution of the transmission astigmatism in the trial lens from the distribution of the initial plane astigmatism and the distribution of the initial plane average refractive power, which is calculated as the transmission design distribution (step S201B). In the calculation of the transmission, the distribution of the transmission average refractive power and the distribution of the transmission astigmatism are obtained using the parameters for transmission calculation included in the wearer information.

The determination unit (not illustrated) in the computer for lens design 302 determines whether the obtained transmission design distribution (the distribution of the transmission average refractive power and the distribution of the transmission astigmatism) of the trial lens approaches the target transmission distribution (the target distribution of the average refractive power and the target astigmatism distribution) set in step S101D (step S201C).

That is, the determination unit in the computer for lens design 302 determines that the second determination means adjusts the surface shape of the trial lens so that at least the distribution of the transmission astigmatism in the transmission design distribution approaches the target astigmatism distribution, and determines whether the distribution of the transmission astigmatism is within the allowable range of the target astigmatism distribution. If this determination is negative, the computer for lens design 302 adjusts the surface shape of the trial lens by the second determination means and/or changes the aberration amount $\Delta_\beta[D]$ by the aberration amount setting unit (first determination means) (step S201D).

In this way, the surface shape of the trial lens is adjusted or the aberration amount setting unit changes the aberration amount $\Delta_\beta[D]$ so that the error between the distribution of the transmission astigmatism and the target astigmatism distribution is small until the transmission distribution of the trial lens approaches the target transmission distribution.

Note that the determination unit may determine whether or not the match rate of the distribution of the transmission astigmatism in the progressive addition lens β and the distribution of the transmission astigmatism in the progressive addition lens α is within the predetermined threshold value. Further, the determination unit may determine whether or not the absolute value of the above aberration amount $\Delta_\beta[D]$ is within 0.07 to 0.24 times the addition power ADD[D]. This determination unit may be provided in the computer for lens design on the lens manufacturer side, which will be described later. The control unit (not illustrated) in the computer for lens design issues a command to the determination unit to perform the determination of the above contents. Then, when the determination unit determines to be OK, a value of transmission astigmatism to be added as a determination target by the determination unit is set, and the control unit controls the aberration amount setting unit to set the aberration amount $\Delta_\beta$.

Note that upon the above determination, the distribution of the transmission astigmatism, the distribution of the transmission average refractive power, the absolute value of the change amount $\Delta_\alpha[D]$, and the like among the lens information before the change as the supplementary data may be called from the computer 201 installed in the optician 200 or the recording unit installed in the computer for lens design 302.

When the determination in step S201D is positive, the computer for lens design 302 determines the surface shape of the finally adjusted trial lens as the surface shape of the spectacle lens to be produced (step S201E). That is, the computer for lens design 302 defines, as the surface shape of the spectacle lens to be produced, the surface shape of the trial lens when the distribution of the transmission astigmatism is within the allowable range of the target astigmatism distribution.

Based on the determined surface shape of the lens, the processing machine 304 processes the lens material, which is a material of the spectacle lens, such as a semi-finished blank spectacle lens or unprocessed block (step S201F). In this way, the spectacle lens having the determined surface shape of the lens and having the transmission distribution approaching the target transmission distribution is produced.

In this way, the surface shape of the trial lens is adjusted so that at least the distribution of the transmission astigmatism of the transmission design distribution approaches the target astigmatism distribution, it is determined whether the distribution of the transmission astigmatism is within the allowable range of the target astigmatism distribution, and since the surface shape of the trial lens is defined as the surface shape of the spectacle lens when the distribution of transmission astigmatism is within the allowable range of the target astigmatism distribution, in the spectacle lens, the distribution of the transmission astigmatism can be substantially the same as the target astigmatism distribution.

Also, when the distribution of the transmission astigmatism is not within the allowable range of the target astigmatism distribution, the transmission design distribution is calculated again using, as the trial lens, a lens with a surface shape adjusted for the trial lens, and since the above determination is performed, the distribution of the transmission astigmatism can accurately match the target astigmatism distribution.

9. Modification Example

The progressive addition lens and the design method thereof according to one aspect of the present invention have been described in detail above, but the progressive addition lens of the present invention and the design method thereof are not limited to the above embodiments and may be variously improved and changed without departing from the gist of the present invention.

For example, a technical idea of the present invention is also reflected to a method for manufacturing a progressive addition lens including a design step which is the design method described so far, and a manufacturing step for manufacturing a progressive addition lens based on the design step.

The technical idea of the present invention is also reflected to a progressive addition lens group including a near portion for viewing a near distance, a distance portion for viewing a distance farther than the near distance, and an intermediate portion provided between the near portion and the distance portion and having a progressive refraction function, in which transmission astigmatism is added to all progressive addition lenses, and visual performances when worn are similar to each other.

It goes without saying that the preferred examples described in the present specification may be applied to each of these aspects. For example, the numerical range of the following provisions that embody "visual performances when worn is similar to each other" in the above provisions of the progressive addition lens group is preferably applied:

The maximum width in the vertical axis direction between the plot of the progressive addition lens α and the plot of the progressive addition lens β is 0.1 or less.

A match rate of a horizontal width of area a'1 where the transmission astigmatism is ADD/4 or less and y=−14.0 mm is 97 to 103%, and a match rate of a horizontal width of area a'2 where the transmission astigmatism is ADD/4 or less and y=−20.0 mm is 97 to 103%.

A match rate of a horizontal width of area A where the transmission average refractive power is equal to or more than half a value of near power and y=−14.0 mm is 97 to 103%, and a match rate of a horizontal width of area B where the transmission average refractive power is equal to or more than half the value of the near power and y=−20.0 mm is 97 to 103%.

When the progressive addition lens α and the progressive addition lens β, which are any two of the progressive addition lens groups, are set with different addition powers, and the rotation angle from the positive direction of the x axis passing through the origin is the horizontal axis (unit: degree), and the meridianal refractive power, normalized by the addition power, at each point corresponding to a rotation angle on a circle having a radius of 14.0 mm centered on the origin of the progressive addition lens is the vertical axis (unit: dimensionless), a maximum width in a vertical axis direction between a plot of the progressive addition lens α and a plot of the progressive addition lens β is 0.1 or less.

The transmission astigmatism added to each progressive addition lens is 0.07 to 0.24 times the amount of addition power $ADD_\alpha[D]$ in each progressive addition lens.

In this case, "the maximum width in the vertical axis direction is 0.1 or less" means that even if any combination of the progressive addition lens α and the progressive addition lens in which the width in the vertical axis direction is maximum, among the progressive addition lens groups is 0.1 or less.

In addition, there is no limitation on the addition mode of the transmission astigmatism. The transmission astigmatism may be added along the meridian and/or the main line of sight. The transmission astigmatism may also be expanded to at least a part of the design surface, centered on the meridian and/or main line of sight. For example, a part of the design surface may have a pattern (pattern 1 in the basic application) in which an astigmatism adjustment area R (see FIG. 2) of the progressive addition lens is located below the horizontal line HL (see FIG. 2) and is a fan-shaped area extending downward.

Further, a part of the design surface may have a pattern (pattern 2 in the basic application) in which the astigmatism adjustment area R of the progressive addition lens is located below the horizontal line HL.

Further, a part of the design surface may have a case (pattern 3 in the basic application) in which the astigmatism adjustment area R of the progressive addition lens is located below the horizontal line HL and includes an area having a certain width in the horizontal direction.

Then, when the progressive addition lens is replaced, the transmission astigmatism addition pattern before the replacement and the transmission astigmatism addition pattern after the replacement may be the same or different. However, considering that the visual performances before and after the replacement approach, it is preferable that the pattern is the same before and after the replacement.

In each embodiment of the present invention, an example in which the transmission astigmatism is added to the intermediate portion and the near portion is given. On the other hand, a point of the present invention is to make the visual performances approach each other before and after the replacement of the progressive addition lens to which the transmission astigmatism is added. Therefore, the present invention is not limited to this example.

For example, the fact that the transmission astigmatism is added to the distance portion before and after the replacement is also included in the technical scope. On the other hand, as described in [1. Gist of the technical idea of the present invention], a special effect can be obtained by intentionally adding the transmission astigmatism to the location where the spectacle wearer frequently passes the line of sight. Therefore, each embodiment of the present invention remains preferred.

The progressive addition lens itself handled in each embodiment of the present invention is novel and has great technical features. Therefore, the system for designing this progressive addition lens alone has a great technical feature, instead of the system for the replacement of the lens described in each embodiment. The technical features can be summarized as follows.

"A design system of a progressive addition lens including a near portion for viewing a near distance, a distance portion for viewing a distance farther than the near distance, and an intermediate portion provided between the near portion and the distance portion and having a progressive refraction function, in which the transmission astigmatism is added to the near portion and the intermediate portion of the distance portion, the near portion, and the intermediate portion, in the near portion and the intermediate portion to which the transmission astigmatism is added, after the refractive power for astigmatism correction is subtracted, the progressive addition lens further includes a portion where the amount of horizontal refractive power is greater than the amount of vertical refractive power, or a portion where the amount of vertical refractive power is greater than the amount of horizontal refractive power."

In addition, to make the visual performances when wearing the original lens (conventional progressive addition lens) which is the progressive addition lens before the addition of transmission astigmatism approach each other, the amount of transmission astigmatism $\Delta_\beta[D]$ added to the progressive addition lens β may be set by the aberration amount setting unit, the progressive addition lens β may be designed, and the progressive addition lens group may be prepared. At that time, the conditions may be set as follows.

"Between the progressive addition lens and the progressive addition lens β before the addition of transmission astigmatism, the addition power of the progressive addition lens β is less than 3.00 [D] (preferably 2.00 [D] or less), in the progressive addition lens α and the progressive addition lens β, the transmission astigmatism is added to the near portion and the intermediate portion of the distance portion, the near portion, and the intermediate portion, in the near portion and the intermediate portion to which the transmission astigmatism is added, after the refractive power for astigmatism correction is subtracted, when the progressive addition lens further includes a portion where the amount of horizontal refractive power is greater than the amount of vertical refractive power, a match rate of a horizontal width of area A where the transmission average refractive power is equal to or more than half a value of near power and y=−14.0 mm is 90 to 100%, and a match rate of a horizontal width of area B where the transmission average refractive power is equal to or more than half the value of the near power and y=−20.0 mm is 90 to 100%, and when the progressive addition lens further includes a portion where the amount of vertical refractive power is greater than the amount of horizontal refractive power, a match rate of a horizontal width of area a'1 where the transmission astigmatism is ADD/4 or less and y=−14.0 mm is 60 to 100%, and a match rate of a horizontal width of area a'2 where the transmission astigmatism is ADD/4 or less and y=−20.0 mm is 60 to 100%."

Note that each of the above numerical ranges is obtained from the comparison between the data of the conventional example (lens before the addition of the aberration) and the data of the embodiments 1 and 2, and the comparison between the data of the conventional example (lens before the addition of the aberration) and the data of the reference embodiments 1 and 2. The meaning of the numerical specification is that, for example, when the transmission astigmatism added is horizontal >vertical, the distribution of the transmission average refractive power becomes narrower instead of expanding the low aberration area of the transmission astigmatism, but becomes narrower in Embodiment 1 than in reference Embodiment 1. The case of vertical >horizontal is the opposite thereto.

Further, as in the above, as a provision for approaching the visual performances when wearing the original lens (conventional progressive addition lens), the following provision may be adopted in place of or in addition to the above provision.

"When the x axis is the horizontal direction of the lens, the y axis is the vertical direction of the lens, the origin is the prism reference point of the lens, and then a rotation angle from a positive direction of the x axis passing through the origin is the horizontal axis (unit: degree), and the meridianal refractive power, normalized by the addition power, at each point corresponding to the rotation angle on a circle having a radius of 14.0 mm centered on the origin of the progressive addition lens is the vertical axis (unit: dimensionless), a maximum width in a vertical axis direction between the plot of the original lens and the plot of the progressive addition lens β is 0.1 or less."

SUMMARY

The following is a summary of the "design system of a progressive addition lens, design method of a progressive addition lens, and progressive addition lens group" of the present disclosure.

An embodiment of the present disclosure is as follows.

"A design system of a progressive addition lens including a near portion for viewing a near distance, a distance portion for viewing a distance farther than the near distance, and an intermediate portion provided between the near portion and the distance portion and having a progressive refraction function, the design system of a progressive addition lens including:

an aberration amount setting unit that sets an amount of transmission astigmatism Δβ[D] added to a progressive addition lens β, in such a way that when a wearer of the progressive addition lens α to which transmission astigmatism of an aberration amount Δα[D] is added is provided with the progressive addition lens β having different parameters, visual performance when the progressive addition lens β is worn approaches visual performance when the progressive addition lens α is worn."

REFERENCE SIGNS LIST

MP Average refractive power
AS Transmission astigmatism
VP Vertical refractive power
HP Horizontal refractive power
ADD Addition power
F Distance portion measurement reference point
FP Fitting point
N Near portion measurement reference point
200 Optician
201 Computer
300 Lens manufacturer
301 Host computer for lens manufacturing
302 Computer for lens design
303 Computer for lens processing
304 Processing machine

The invention claimed is:

1. A design system of progressive addition lenses, each progressive addition lens including: a near portion for viewing a near distance, a distance portion for viewing a distance farther than the near distance, and an intermediate portion provided between the near portion and the distance portion and each having a progressive refraction function, the design system of the progressive addition lenses, comprising:

an aberration amount setting unit that sets an amount of transmission astigmatism $\Delta_\beta$[D] added to a progressive addition lens β, in such a way that when a wearer of a progressive addition lens α to which transmission astigmatism of an aberration amount $\Delta_\alpha$[D] is added is provided with the progressive addition lens β having different parameters, a match rate of a distribution related to a refractive power between the progressive addition lens α and the progressive addition lens β is 97 to 103%, wherein:

at least one of the different parameters is an addition power, the distribution related to the refractive power is at least one of a distribution of transmission astigmatism in which a vertical axis y is a vertical direction of the lens, a horizontal axis x is a horizontal direction of the lens, and an origin is a prism reference point of the lens, and a distribution of transmission average refractive power, in the distribution of the transmission astigmatism, the aberration amount setting unit sets the amount of transmission astigmatism $\Delta_\beta$[D]

so that a match rate of a horizontal width of area a'1 where the transmission astigmatism is ADD/4 or less and y=−14.0 mm is 97 to 103%, and a match rate of a horizontal width of area a'2 where the transmission astigmatism is ADD/4 or less and y=−20.0 mm is 97 to 103%, and in the distribution of the transmission average refractive power, the aberration amount setting unit sets the amount of transmission astigmatism $A_\beta$[D]

so that a match rate of a horizontal width of area A where the transmission average refractive power is equal to or more than half a value of near power, being distance power which is a spherical power S+addition power/2, and y=−14.0 mm is 97 to 103%, and a match rate of a horizontal width of area B where the transmission average refractive power is equal to or more than half the value of the near power, being distance power which is the spherical power S+addition power/2, and y=−20.0 mm is 97 to 103%.

2. The design system of the progressive addition lenses according to claim 1, wherein at least one of the different parameters is an addition power, when the x axis is the horizontal direction of the lens, the y axis is the vertical direction of the lens, the origin is the prism reference point of the lens, and then a rotation angle from a positive direction of the x axis passing through the origin is the horizontal axis (unit: degree), and a meridianal refractive power, normalized by the addition power, at each point corresponding to a rotation angle on a circle having a radius of 14.0 mm centered on the origin of the progressive addition lens is the vertical axis (unit: dimensionless), the aberration amount setting unit sets an aberration amount $\Delta_\beta[D]$ so that a maximum width in a vertical axis direction between a plot of the progressive addition lens α and a plot of the progressive addition lens β is 0.1 or less.

3. The design system of the progressive addition lenses according to claim 1, wherein
the aberration amount $\Delta_\alpha$ is 0.07 to 0.24 times an addition power ADD_[D], and
an aberration amount $A_\alpha$ is 0.07 to 0.24 times an addition power $ADD_\beta[D]$.

4. The design system of the progressive addition lenses according to claim 1, wherein
in the progressive addition lens α and the progressive addition lens β, the transmission astigmatism is added to the near portion and the intermediate portion,
in the near portion and the intermediate portion to which the transmission astigmatism is added, after the refractive power for astigmatism correction is subtracted,
the progressive addition lens further includes a portion where an amount of horizontal refractive power is greater than an amount of vertical refractive power, or
a portion where the amount of vertical refractive power is greater than the amount of horizontal refractive power.

5. A design method of progressive addition lenses, each progressive addition lens including a near portion for viewing a near distance, a distance portion for viewing a distance farther than the near distance, and an intermediate portion provided between the near portion and the distance portion and each having a progressive refraction function, the design method of the progressive addition lenses, comprising:
setting an amount of transmission astigmatism $\Delta_\beta[D]$ added to a progressive addition lens β, in such a way that when a wearer of a progressive addition lens α to which transmission astigmatism of an aberration amount $\Delta_\alpha[D]$ is added is provided with the progressive addition lens β having different parameters, a match rate of a distribution related to a refractive power between the progressive addition lens α and the progressive addition lens β is 97 to 103%,
wherein:
at least one of the different parameters is an addition power,
the distribution related to the refractive power is at least one of a distribution of transmission astigmatism in which a vertical axis y is a vertical direction of the lens, a horizontal axis x is a horizontal direction of the lens, and an origin is a prism reference point of the lens, and a distribution of transmission average refractive power,
in the distribution of the transmission astigmatism, the aberration amount setting unit sets the amount of transmission astigmatism $\Delta_\beta[D]$
so that a match rate of a horizontal width of area a'1 where the transmission astigmatism is ADD/4 or less and y=−14.0 mm is 97 to 103%, and a match rate of a horizontal width of area a'2 where the transmission astigmatism is ADD/4 or less and y=−20.0 mm is 97 to 103%, and
in the distribution of the transmission average refractive power, the aberration amount setting unit sets the amount of transmission astigmatism $\Delta_\beta[D]$
so that a match rate of a horizontal width of area A where the transmission average refractive power is equal to or more than half a value of near power, being distance power which is a spherical power S+addition power/2, and y=−14.0 mm is 97 to 103%, and
a match rate of a horizontal width of area B where the transmission average refractive power is equal to or more than half the value of the near power, being distance power which is the spherical power S+addition power/2, and y=−20.0 mm is 97 to 103%.

6. A progressive addition lenses group, each progressive addition lens comprising: a near portion for viewing a near distance; a distance portion for viewing a distance farther than the near distance; and an intermediate portion provided between the near portion and the distance portion and each having a progressive refraction function,
wherein:
transmission astigmatism is added to all progressive addition lenses,
a progressive addition lens α and a progressive addition lens, which are any two of the progressive addition lenses groups, are set with different addition powers,
an amount of transmission astigmatism $\Delta_\beta[D]$ added to the progressive addition lens β is set so that a match rate of a distribution related to a refractive power between the progressive addition lens α and the progressive addition lens β is 97 to 103%,
the distribution related to the refractive power is at least one of a distribution of transmission astigmatism in which a vertical axis y is a vertical direction of the lens, a horizontal axis x is a horizontal direction of the lens, and an origin is a prism reference point of the lens, and a distribution of transmission average refractive power,
in the distribution of the transmission astigmatism,
a match rate of a horizontal width of area a'1 where the transmission astigmatism is ADD/4 or less and y=−14.0 mm is 97 to 103%, and
a match rate of a horizontal width of area a'2 where the transmission astigmatism is ADD/4 or less and y=−20.0 mm is 97 to 103%, and
in the distribution of the transmission average refractive power,
a match rate of a horizontal width of area A where the transmission average refractive power is equal to or more than half a value of near power, being distance power which is a spherical power S+addition power/2, and y=−14.0 mm is 97 to 103%, and
a match rate of a horizontal width of area B where the transmission average refractive power is equal to or more than half the value of the near power, being distance power which is the spherical power S+addition power/2, and y=−20.0 mm is 97 to 103%.

7. The progressive addition lenses group according to claim 6, wherein
the progressive addition lens α and the progressive addition lens β, which are any two of the progressive addition lenses groups, are set with different addition powers,
when the x axis is the horizontal direction of the lens, the y axis is the vertical direction of the lens, the origin is the prism reference point of the lens, and then a rotation angle from a positive direction of the x axis passing through the origin is the horizontal axis (unit: degree), and a meridianal refractive power, normalized by the addition power, at each point corresponding to the rotation angle on a circle having a radius of 14.0 mm centered on the origin of the progressive addition lens is the vertical axis (unit: dimensionless), a maximum width in a vertical axis direction between a plot of the progressive addition lens $\alpha$ and a plot of the progressive addition lens $\beta$ is 0.1 or less.

8. The progressive addition lenses group according to claim 6, wherein
the transmission astigmatism added to each progressive addition lens is 0.07 to 0.24 times an amount of addition power $ADD_\alpha[D]$ in each progressive addition lens.

9. The progressive addition lenses group according to claim 6, wherein
the transmission astigmatism is added to the near portion and the intermediate portion,
in the near portion and the intermediate portion to which the transmission astigmatism is added, after the refractive power for astigmatism correction is subtracted,
the progressive addition lens further includes a portion where an amount of horizontal refractive power is greater than an amount of vertical refractive power, or
a portion where the amount of vertical refractive power is greater than the amount of horizontal refractive power.

* * * * *